(12) United States Patent
Papageorge et al.

(10) Patent No.: US 10,761,046 B2
(45) Date of Patent: Sep. 1, 2020

(54) ELECTROCHEMICAL SENSORS AND PACKAGING AND RELATED METHODS

(71) Applicant: Spec Sensors, LLC, Newark, CA (US)

(72) Inventors: Marc Papageorge, Pleasanton, CA (US); Joseph R. Stetter, Hayward, CA (US); Vinay Patel, Fremont, CA (US); William Escobar, San Jose, CA (US)

(73) Assignee: SENSIRION AG, Staefa ZH (CH)

(*) Notice: Subject to any disclaimer, the term of this patent is extended or adjusted under 35 U.S.C. 154(b) by 481 days.

(21) Appl. No.: 15/412,675

(22) Filed: Jan. 23, 2017

(65) Prior Publication Data

US 2017/0131230 A1  May 11, 2017

Related U.S. Application Data

(63) Continuation-in-part of application No. PCT/US2015/042135, filed on Jul. 24, 2015, and a
(Continued)

(51) Int. Cl.
*G01N 27/407* (2006.01)
*G01N 27/404* (2006.01)

(52) U.S. Cl.
CPC .................. *G01N 27/4045* (2013.01)

(58) Field of Classification Search
CPC ............ G01N 27/413; G01N 27/404; G01N 27/4045; Y10T 29/49002; Y10T 29/49155;
(Continued)

(56) References Cited

U.S. PATENT DOCUMENTS 4,210,511 A * 7/1980 Campbell ............... C25B 9/206
204/256
5,314,605 A 5/1994 Matthiessen
(Continued)

FOREIGN PATENT DOCUMENTS

CN 103630595 A 3/2014
EP 1179731 B1 4/2006

OTHER PUBLICATIONS

International Search Report and Written Opinion issued in corresponding PCT International Application No. PCT/US2015/042135, dated Dec. 10, 2015.
(Continued)

*Primary Examiner* — Gurpreet Kaur
(74) *Attorney, Agent, or Firm* — Dinsmore & Shohl LLP

(57) ABSTRACT

Some embodiments include an electrochemical sensor. The electrochemical sensor has a lid element comprising a substrate, multiple electrodes, multiple interior contacts electrically coupled to the multiple electrodes, a base element configured to be coupled to the lid element, and an electrolyte element. The base element includes a sensor cavity, multiple exterior contacts located at an exterior surface of the base element, and multiple signal communication channels comprising multiple signal communication lines, and the electrolyte element is located in the sensor cavity. When the lid element is coupled to the base element, the multiple electrodes are located in the sensor cavity, the multiple electrodes are in electrolytic communication with the electrolyte element, the multiple interior contacts are located in the sensor cavity, and the multiple interior contacts are electrically coupled to the multiple exterior contacts by the multiple signal communication lines. Other embodiments of related sensors and methods are also disclosed.

23 Claims, 14 Drawing Sheets

Related U.S. Application Data continuation-in-part of application No. PCT/US2015/042136, filed on Jul. 24, 2015, and a continuation of application No. PCT/US2015/042137, filed on Jul. 24, 2015.

(60) Provisional application No. 62/028,543, filed on Jul. 24, 2014.

(58) Field of Classification Search
CPC ......... Y10T 29/49114; Y10T 29/49128; Y10T 29/4921; Y10T 29/49126; Y10T 29/49794
See application file for complete search history.

(56) References Cited

U.S. PATENT DOCUMENTS

| | | | |
|---|---|---|---|
| 5,450,039 A | | 9/1995 | Takeda et al. |
| 5,738,773 A | * | 4/1998 | Criddle .............. G01N 27/4045 |
| | | | 204/411 |
| 6,248,224 B1 | | 6/2001 | Kitzelmann |
| 6,501,286 B1 | * | 12/2002 | Balfanz ................. G01N 17/02 |
| | | | 204/404 |
| 7,022,213 B1 | | 4/2006 | Austen et al. |
| 8,771,490 B2 | | 7/2014 | Bordo et al. |
| 2005/0230767 A1 | | 10/2005 | Park et al. |
| 2006/0096871 A1 | | 5/2006 | Manoukian et al. |
| 2007/0138027 A1 | * | 6/2007 | Dinsmoor .......... G01N 27/4035 |
| | | | 205/787.5 |
| 2008/0250847 A1 | | 10/2008 | Kitani et al. |
| 2010/0083755 A1 | | 4/2010 | Morii |
| 2010/0170795 A1 | | 7/2010 | Cowbum et al. |
| 2010/0236924 A1 | * | 9/2010 | Chapples ............. G01N 27/404 |
| | | | 204/412 |
| 2010/0276287 A1 | * | 11/2010 | Manoukian .......... G01N 27/404 |
| | | | 204/412 |
| 2013/0186776 A1 | | 7/2013 | Scheffler et al. |
| 2015/0346138 A1 | * | 12/2015 | Allen ................... G01N 27/404 |
| | | | 204/406 |

OTHER PUBLICATIONS

International Search Report and Written Opinion issued in corresponding PCT International Application No. PCT/US2015/042136, dated Mar. 20, 2016.

International Search Report and Written Opinion issued in corresponding PCT International Application No. PCT/US2015/042137, dated Dec. 9, 2015.

Office Action dated Dec. 4, 2018 pertaining to Chinese Patent Application No. 201580048620.5.

Office Action dated Dec. 9, 2019 pertaining to Chinese Patent Application No. 201580048620.5.

* cited by examiner

FIG. 20A         2000

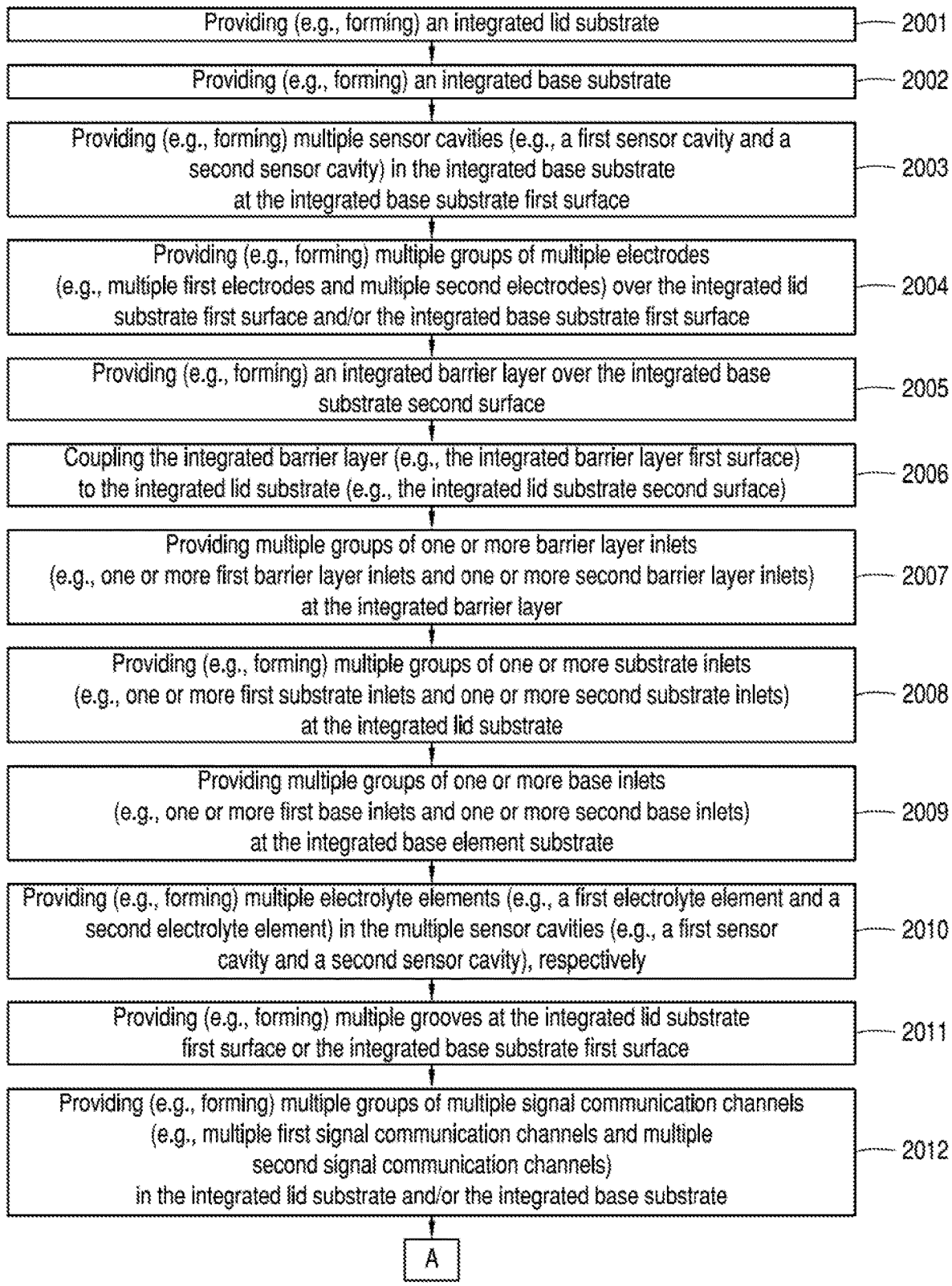

- 2001 — Providing (e.g., forming) an integrated lid substrate
- 2002 — Providing (e.g., forming) an integrated base substrate
- 2003 — Providing (e.g., forming) multiple sensor cavities (e.g., a first sensor cavity and a second sensor cavity) in the integrated base substrate at the integrated base substrate first surface
- 2004 — Providing (e.g., forming) multiple groups of multiple electrodes (e.g., multiple first electrodes and multiple second electrodes) over the integrated lid substrate first surface and/or the integrated base substrate first surface
- 2005 — Providing (e.g., forming) an integrated barrier layer over the integrated base substrate second surface
- 2006 — Coupling the integrated barrier layer (e.g., the integrated barrier layer first surface) to the integrated lid substrate (e.g., the integrated lid substrate second surface)
- 2007 — Providing multiple groups of one or more barrier layer inlets (e.g., one or more first barrier layer inlets and one or more second barrier layer inlets) at the integrated barrier layer
- 2008 — Providing (e.g., forming) multiple groups of one or more substrate inlets (e.g., one or more first substrate inlets and one or more second substrate inlets) at the integrated lid substrate
- 2009 — Providing multiple groups of one or more base inlets (e.g., one or more first base inlets and one or more second base inlets) at the integrated base element substrate
- 2010 — Providing (e.g., forming) multiple electrolyte elements (e.g., a first electrolyte element and a second electrolyte element) in the multiple sensor cavities (e.g., a first sensor cavity and a second sensor cavity), respectively
- 2011 — Providing (e.g., forming) multiple grooves at the integrated lid substrate first surface or the integrated base substrate first surface
- 2012 — Providing (e.g., forming) multiple groups of multiple signal communication channels (e.g., multiple first signal communication channels and multiple second signal communication channels) in the integrated lid substrate and/or the integrated base substrate

A

ELECTROCHEMICAL SENSORS AND PACKAGING AND RELATED METHODS

CROSS-REFERENCE TO RELATED APPLICATIONS

This application claims the benefit of U.S. Provisional Patent Application No. 62/028,543, filed Jul. 24, 2014, hereby incorporated by reference in its entirety. Further, this application claims the benefit of International Appln. No. PCT/US2015/42137, filed Jul. 24, 2015, hereby incorporated by reference in its entirety, International Appln. No. PCT/US2015/42136, filed Jul. 24, 2015, hereby incorporated by reference in its entirety, and International Appln. No. PCT/US2015/42135, filed Jul. 24, 2015, hereby incorporated by reference in its entirety.

Further, this application is related to U.S. Non-Provisional patent application Ser. No. 14/317,222, filed Jun. 27, 2014, hereby incorporated by reference in its entirety. U.S. Non-Provisional patent application Ser. No. 14/317,222 is a continuation-in-part of U.S. Non-Provisional patent application Ser. No. 13/740,327, filed Jan. 14, 2013, hereby incorporated by reference in its entirety, which issued as U.S. Pat. No. 8,795,484 on Aug. 5, 2014. Further, U.S. Non-Provisional patent application Ser. No. 13/740,327 is a divisional of U.S. Non-Provisional patent application Ser. No. 12/953,672, filed Nov. 24, 2010, hereby incorporated by reference in its entirety.

Each of U.S. Non-Provisional patent application Ser. No. 14/317,222, U.S. Non-Provisional patent application Ser. No. 13/740,327, U.S. Non-Provisional patent application Ser. No. 12/953,672, and U.S. Provisional Patent Application No. 62/028,543 are incorporated by reference herein in their entirety.

FIELD OF THE INVENTION

This invention relates generally to electrochemical sensors and packaging, and relates more particularly to electrochemical gas sensors and packaging and related methods.

DESCRIPTION OF THE BACKGROUND

Electrochemical cells have been used for detection of toxic gases since the 1970's in, for example, fixed location instrumentation for infrastructure (such as buildings and parking garages) and portable safety and inspection equipment used in transportation. For example, see Stetter, J. R., "Instrumentation to Monitor Chemical Exposure in the Synfuel Industry," Annals American Conf. of Governmental and Industrial Hygienists, 11, 225-269, (1984). These sensors may be desirable in ambient monitoring applications because of their accuracy at low detection levels, selectivity, linearity, and power requirements. Industrial-grade electrochemical cells can cost the customer over $25 each and even several hundred dollars without any electronics, even when manufactured in high volumes. This cost can significantly increase the cost of gas monitors and detectors, and can leave manufacturers with few cost-effective options to create ultra-cheap, yet high performance gas detectors. For example, high quality, accurate devices for sensing carbon monoxide and triggering an alarm in the presence of excessive concentrations of carbon monoxide (CO) that may be hazardous to life or health are presently available for many industrial applications, but such devices are still too costly for use in most homes.

As a result, less expensive sensors with much lower performance are chosen to meet high volume consumer product cost goals, resulting in lower performance and a sacrifice of needed safety and health protection for the consumer. Additional consumer, medical, and industrial applications will be made available with a significant reduction in the cost and dimensions of electrochemical gas sensors. Other prior art gas sensors may use a liquid proton conductor where the outside surfaces of the sensing and counter electrodes of the sensor are coated by NAFION™ layers. NAFION™ material is subject to freezing at 0 degrees (° C.)., hindering operation of a sensor coated by NAFION™ material at temperatures of 0° C. and below. Further, the lifetime of these sensors can range from about 6-12 months due to rapid drying of the liquid electrolyte. Thus, the sensor requires maintenance due to liquid electrolyte evaporation, leakage, and/or corrosion. In addition, the sensors can have significant manufacturing costs and be relatively large, sometimes with large electrolyte or water reservoirs, which make integration of these sensors into modern equipment or small personal monitors difficult.

Another prior art gas sensor uses a design incorporating proton conductors, one type of electronically conductive metal catalyst for the sensing electrode, and a different type of electronically conductive metal catalyst for the counter electrode. This configuration allows the sensing electrode to decompose a gas to produce protons and electrons, while the counter electrode exhibited no activity to decompose the gas. The result is a Nernst potential between the two electrodes, which can be used to detect a target gas. However, issues that could result from such a design include the gas reaction being carried out slowly or interfering reactions occurring on one or the other electrode surface. Additionally, the response signal could be weak. Further, the Nernst potential may be difficult to zero in clean air and the calibration is limited to about 59 millivolts (mV) per decade of concentration. Again poor electrolyte or electrode stability over time can degrade performance of a potentiometric gas sensor which often operate better at a high temperature.

Thus, there is a need or potential benefit for a competitive electrochemical sensor that can cost less to manufacture in high volume, has high performance and small size, and that would create a new opportunity for companies to develop low-cost gas detectors that could be manufactured in high volumes, thus making high accuracy detectors, such as carbon monoxide detectors, much less expensive. This cost reduction, without loss in performance, could revolutionize and tremendously expand the use of gas detectors in their application, including home carbon monoxide monitors, automobile air quality monitors, and building ventilation and controls. In addition, new applications would become possible, including safety organizations that may desire to inexpensively protect or monitor a large area from toxic gases like carbon monoxide, and universities or scientific/environmental organizations wanting to study toxic gas levels over large areas. In addition, an electrochemical sensor that also can be small can be used in cell-phones to enable worldwide networks of CO and other gas monitors.

The traditional porous, composite electrode is comprised of 10-40% polytetrafluoroethylene (PTFE) by weight and 60-90% catalyst by weight. The traditional electrode has possible residual dispersing, surfactants and thickening agents. These residual components are chemically inert and electrochemically inert. These electrodes are cured and/or sintered near the melting point of PTFE, typically 290-310 C. This requires printing on substrates such as porous PTFE that can withstand the PTFE cure temperatures. The PTFE serves as a binder to hold the catalyst particles together in a porous bed. It also serves as the hydrophobic portion of the composite bed electrode to provide a proper environment for a triple-phase boundary. This triple-phase boundary is desirous for gas-phase amperometric sensors.

A need or potential benefit exists for high performance electrochemical sensors having thin and tiny form factors and low cost assembly.

BRIEF DESCRIPTION OF THE DRAWINGS

To facilitate further description of the embodiments, the following drawings are provided in which.

Figure 1:
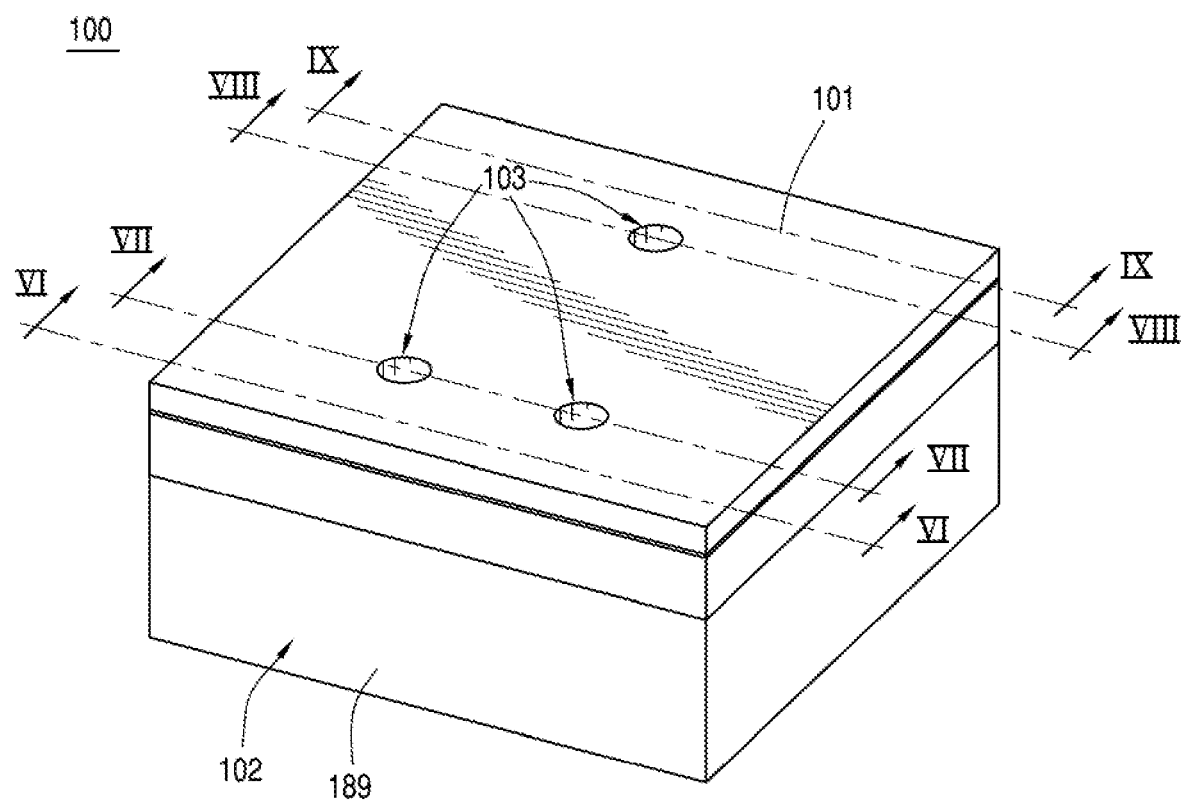
FIG. 1 illustrates an isometric view of an electrochemical sensor including a lid element coupled to a base element, according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments include an electrochemical sensor. The electrochemical sensors comprises a lid element comprising a substrate, multiple electrodes, multiple interior contacts electrically coupled to the multiple electrodes, and a base element configured to be coupled to the lid element. The base element comprises a sensor cavity and a base element material. Meanwhile, the electrochemical sensor further comprises multiple exterior contacts at an exterior surface of the electrochemical sensor, multiple signal communication channels comprising multiple signal communication lines, and an electrolyte element located in the sensor cavity. The substrate can comprise a substrate material. Further, the electrochemical sensor can be configured such that when the lid element is coupled to the base element, the multiple electrodes are located in the sensor cavity, the multiple electrodes are in electrolytic communication with the electrolyte element, the multiple interior contacts are located in the sensor cavity; and the multiple interior contacts are electrically coupled to the multiple exterior contacts by the multiple signal communication lines.

Further embodiments include a method. The method can comprise: providing a lid element, the providing the lid element comprising providing a substrate; providing multiple electrodes; providing multiple interior contacts; providing a base element configured to be coupled to the lid element, the providing the base element comprising providing a sensor cavity; providing multiple exterior contacts; providing multiple signal communication channels; and providing multiple signal communication lines at the multiple signal communication channels. In these embodiments, the substrate can comprise a substrate material, and the base element can comprise a base element material. Further, the sensor cavity can be configured to receive an electrolyte element. Further still, the electrochemical sensor can be configured such that when the lid element is coupled to the base element and when the sensor cavity has received the electrolyte element, the multiple electrodes are located in the sensor cavity, the multiple electrodes are in electrolytic communication with the electrolyte element, the multiple interior contacts are located in the sensor cavity; and the multiple interior contacts are electrically coupled to the multiple exterior contacts by the multiple signal communication lines.

Other embodiments include an electrochemical sensor. The electrochemical sensor comprises a lid element comprising a substrate, multiple electrodes comprising multiple wicks, multiple interior contacts electrically coupled to the multiple electrodes, and a base element configured to be coupled to the lid element. The base element comprises a sensor cavity, a base element material, multiple exterior contacts located at an exterior surface of the base element, and multiple signal communication channels comprising multiple signal communication lines. Meanwhile, the electrochemical sensor further comprises an electrolyte element located in the sensor cavity. The substrate can comprise a substrate material. Further, the electrochemical sensor can comprise a gas sensor, and can be configured such that when the lid element is coupled to the base element, the multiple electrodes are located in the sensor cavity, the multiple electrodes are in electrolytic communication with the electrolyte element, the multiple interior contacts are located in the sensor cavity, and the multiple interior contacts are electrically coupled to the multiple exterior contacts by the multiple signal communication lines. In these or other embodiments, the lid element can comprise the multiple electrodes and the multiple interior contacts, and a barrier layer coupled to the substrate. The barrier layer can comprise multiple inlets, and the multiple inlets can be at least partially aligned with the multiple electrodes. Also, the substrate material can be at least partially porous and can comprise a polymer material, and the base element material can comprise a ceramic material. Further still, the multiple exterior contacts can be configured to be electrically coupled with one or more electronic components.

Some embodiments include a system. The system comprises an electrochemical sensor comprising a lid element and a base element configured to be coupled to the lid element, and comprises a packaging structure comprising a lid structure and a base structure configured to be coupled to the lid structure. The base structure can comprise an enclosure body and a package cavity configured to receive the electrochemical sensor. Meanwhile, the lid element can comprise a substrate, and the substrate can comprise a substrate material. Further, the base element can comprise a sensor cavity, and a base element material. In these or other embodiments, the electrochemical sensor can further comprise multiple electrodes, multiple interior contacts electrically coupled to the multiple electrodes, multiple exterior contacts located at an exterior surface of the electrochemical sensor, multiple signal communication channels comprising multiple signal communication lines, and an electrolyte element located in the sensor cavity. Also, the electrochemical sensor can be configured such that when the lid element is coupled to the base element, the multiple electrodes are located in the sensor cavity, the multiple electrodes are in electrolytic communication with the electrolyte element, the multiple interior contacts are located in the sensor cavity, and the multiple interior contacts are electrically coupled to the multiple exterior contacts by the multiple signal communication lines.

Further embodiments include a method. The method can comprise: providing an electrochemical sensor; and providing a packaging structure. Meanwhile, the providing the packaging structure can comprise: providing a lid structure; and providing a base structure configured to be coupled to the lid structure. The electrochemical sensor can comprise a lid element and a base element configured to be coupled to the lid element. Further, the providing the base structure can comprise: providing an enclosure body; and providing a package cavity configured to receive the electrochemical sensor. Meanwhile, the lid element can comprise a substrate, and the substrate can comprise a substrate material. Further, the base element can comprise a sensor cavity and a base element material. Further still, the electrochemical sensor can further comprise multiple electrodes, multiple interior contacts electrically coupled to the multiple electrodes, multiple exterior contacts located at an exterior surface of the electrochemical sensor, multiple signal communication channels comprising multiple signal communications lines, and an electrolyte element located in the sensor cavity. Also, the electrochemical sensor can be configured such that when the lid element is coupled to the base element, the multiple electrodes are located in the sensor cavity, the multiple electrodes are in electrolytic communication with the electrolyte element, the multiple interior contacts are located in the sensor cavity, and the multiple interior contacts are electrically coupled to the multiple exterior contacts by the multiple signal communication lines.

Other embodiments include a system. The system comprises an electrochemical sensor comprising a lid element and a base element configured to be coupled to the lid element, and comprises a packaging structure comprising a lid structure and a base structure configured to be coupled to the lid structure. The base structure can comprise an enclosure body and a package cavity configured to receive the electrochemical. Meanwhile, the lid element can comprise a substrate, and the base element can comprise a sensor cavity. Further, the electrochemical sensor can further comprise multiple electrodes, multiple interior contacts electrically coupled to the multiple electrodes, multiple exterior contacts located at a exterior surface of the electrochemical sensor, multiple signal communication channels comprising multiple signal communications lines; and an electrolyte element located in the sensor cavity. In these or other embodiments, the electrochemical sensor can be configured such that when the lid element is coupled to the base element, the multiple electrodes are located in the sensor cavity, the multiple electrodes are in electrolytic communication with the electrolyte element, the multiple interior contacts are located in the sensor cavity; and the multiple interior contacts are electrically coupled to the multiple exterior contacts by the multiple signal communication lines. Further, the packaging structure can comprise multiple packaging contacts electrically coupled to the multiple exterior contacts. Further still, the substrate material can be at least partially porous, the substrate material can comprise polytetrafluoroethylene, and/or the base element material can comprise one or more ceramic materials.

Some embodiments include a method. The method can comprise: providing an integrated lid substrate, the integrated lid substrate comprising an integrated lid substrate first surface and an integrated lid substrate second surface opposite the integrated lid substrate first surface; providing an integrated base substrate, the integrated base substrate comprising an integrated base substrate first surface and an integrated base substrate second surface opposite the integrated base substrate first surface; providing a first sensor cavity in the integrated base substrate at the integrated base substrate first surface, the first sensor cavity being configured to receive a first electrolyte element; providing a second sensor cavity in the integrated base substrate at the integrated base substrate first surface, the second sensor cavity being configured to receive a second electrolyte element; providing multiple first electrodes over at least one of the integrated lid substrate first surface or the integrated base substrate first surface; and providing multiple second electrodes over at least one of the integrated lid substrate first surface or the integrated base substrate first surface. In many embodiments, the integrated lid substrate first surface can be configured to be coupled to the integrated base first surface. Further, when (i) the integrated lid substrate first surface is coupled to the integrated base first surface, (ii) the first electrolyte element is received at the first sensor cavity, and (iii) the second electrolyte element is received at the second sensor cavity, the integrated lid substrate and the integrated base substrate can be configured such that (a) the multiple first electrodes are located at the first sensor cavity and are in electrolytic communication with the first electrolyte element and (b) the multiple second electrodes are located at the second sensor cavity and are in electrolytic communication with the second electrolyte element.

Further embodiments include a system. The system comprises an integrated lid substrate. Meanwhile, the integrated lid substrate can comprise an integrated lid substrate first surface and an integrated lid substrate second surface opposite the integrated lid substrate first surface. Further, the system comprises an integrated base substrate. The integrated base substrate comprises an integrated base substrate first surface, and an integrated base substrate second surface opposite the integrated base substrate first surface. Further, the integrated base substrate comprises a first sensor cavity in the integrated base substrate at the integrated base substrate first surface. The first sensor cavity is configured to receive a first electrolyte element. Further still, the integrated base substrate comprises a second sensor cavity in the integrated base substrate at the integrated base substrate first surface. The second sensor cavity is configured to receive a second electrolyte element. Meanwhile, the system further comprises multiple first electrodes located over at least one of the integrated lid substrate first surface or the integrated base substrate first surface, and multiple second electrodes located over at least one of the integrated lid substrate first surface or the integrated base substrate first surface. In many embodiments, the integrated lid substrate first surface can be configured to be coupled to the integrated base first surface. Further, when (i) the integrated lid substrate first surface is coupled to the integrated base first surface, (ii) the first electrolyte element is received at the first sensor cavity, and (iii) the second electrolyte element is received at the second sensor cavity, the integrated lid substrate and the integrated base substrate can be configured such that (a) the multiple first electrodes are located at the first sensor cavity and are in electrolytic communication with the first electrolyte element and (b) the multiple second electrodes are located at the second sensor cavity and are in electrolytic communication with the second electrolyte element.

Other embodiments include a method. The method comprises: providing an integrated lid substrate, the integrated lid substrate comprising an integrated lid substrate first surface and an integrated lid substrate second surface opposite the integrated lid substrate first surface; providing an integrated base substrate, the integrated base substrate comprising an integrated base substrate first surface and an integrated base substrate second surface opposite the integrated base substrate first surface; providing a first sensor cavity in the integrated base substrate at the integrated base substrate first surface, the first sensor cavity being configured to receive a first electrolyte element; providing a second sensor cavity in the integrated base substrate at the integrated base substrate first surface, the second sensor cavity being configured to receive a second electrolyte element; providing multiple first electrodes over at least one of the integrated lid substrate first surface or the integrated base substrate first surface; providing multiple second electrodes over at least one of the integrated lid substrate first surface or the integrated base substrate first surface; providing the first electrolyte element at the first sensor cavity; and providing the second electrolyte element at the second sensor cavity. In many embodiments, the integrated lid substrate first surface can be configured to be coupled to the integrated base first surface. Further, when (i) the integrated lid substrate first surface is coupled to the integrated base first surface, (ii) the first electrolyte element is received at the first sensor cavity, and (iii) the second electrolyte element is received at the second sensor cavity, the integrated lid substrate and the integrated base substrate can be configured such that (a) the multiple first electrodes are located at the first sensor cavity and are in electrolytic communication with the first electrolyte element and (b) the multiple second electrodes are located at the second sensor cavity and are in electrolytic communication with the second electrolyte element. Further, the integrated lid substrate can be at least partially porous, the integrated lid substrate can comprise one or more integrated lid substrate materials, and the one or more integrated lid substrate materials can comprise polytetrafluoroethylene. Further still, the integrated base substrate can comprise one or more integrated base substrate materials, and the one or more integrated base substrate materials can comprise at least one or more ceramic materials one or more polymer materials. Also, one or more of the multiple first electrodes can be configured to react with an analyte when the one or more of the multiple first electrodes are in communication with the analyte and the first electrolyte element, and one or more of the multiple second electrodes can be configured to react with the analyte when the one or more of the multiple second electrodes are in communication with the analyte and the second electrolyte element.

Figure 2:
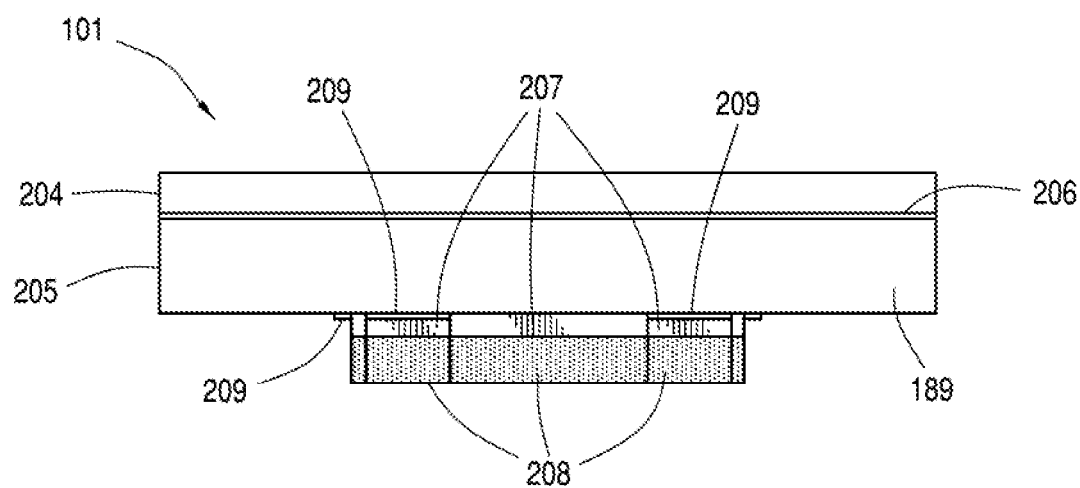
FIG. 2 illustrates a side view of the lid element of FIG. 1.
Figure 3:
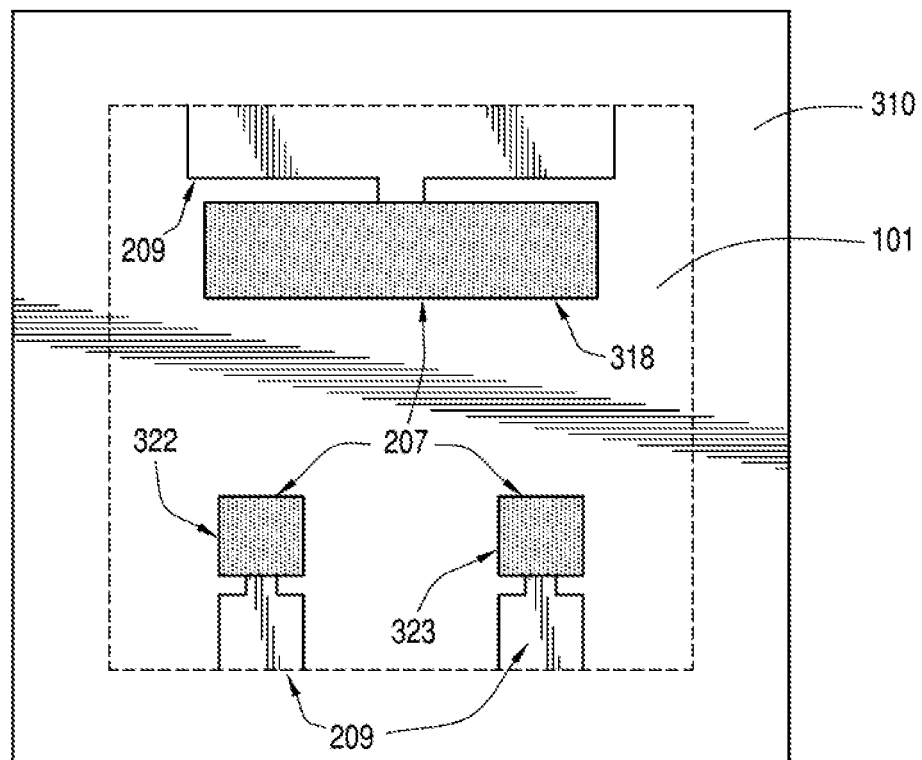
FIG. 3 illustrates a bottom view of the lid element of FIG. 101.
Figure 4:
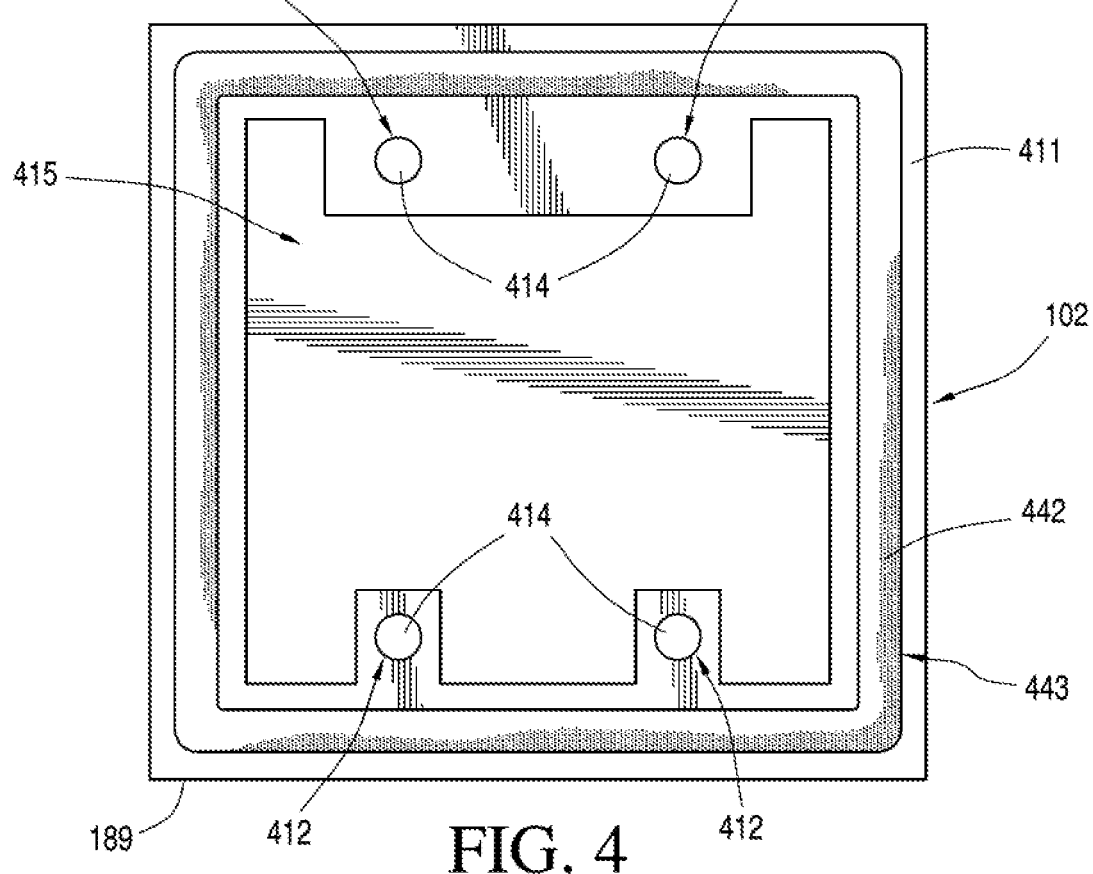
FIG. 4 illustrates a top view of the base element of FIG. 1.
Figure 5:
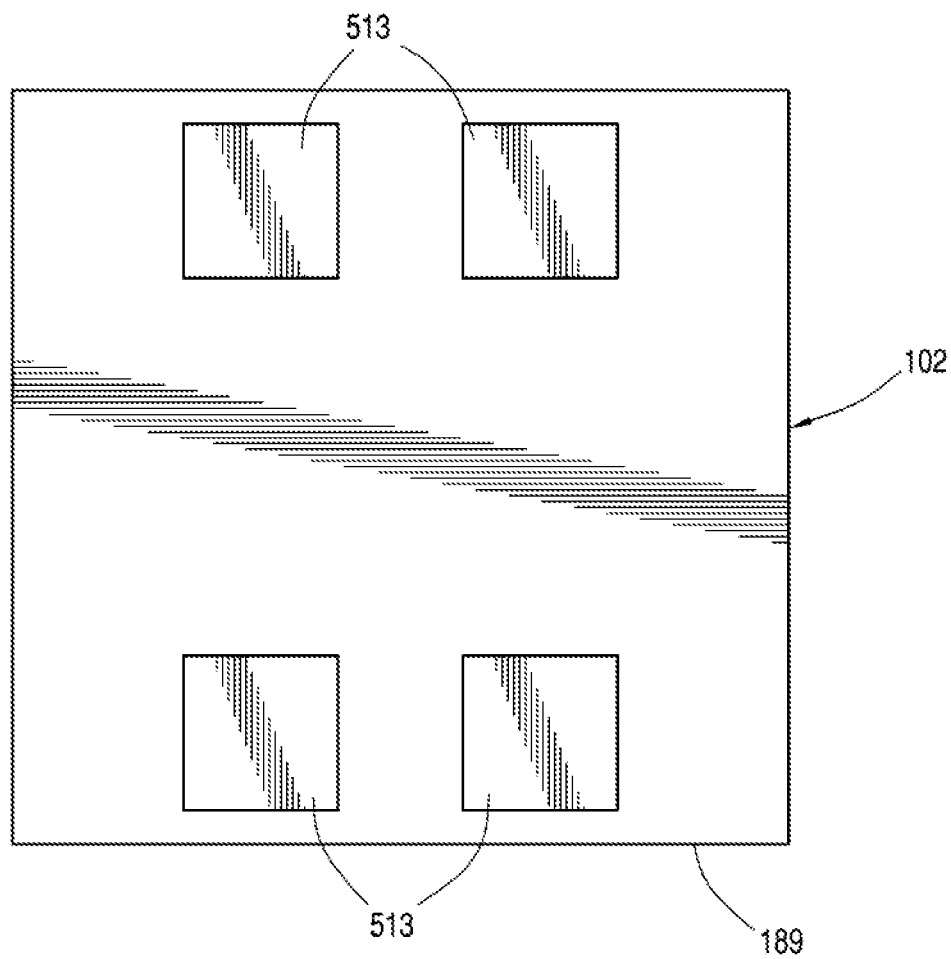
FIG. 5 illustrates a bottom view of the base element of FIG. 1.
Figure 6:
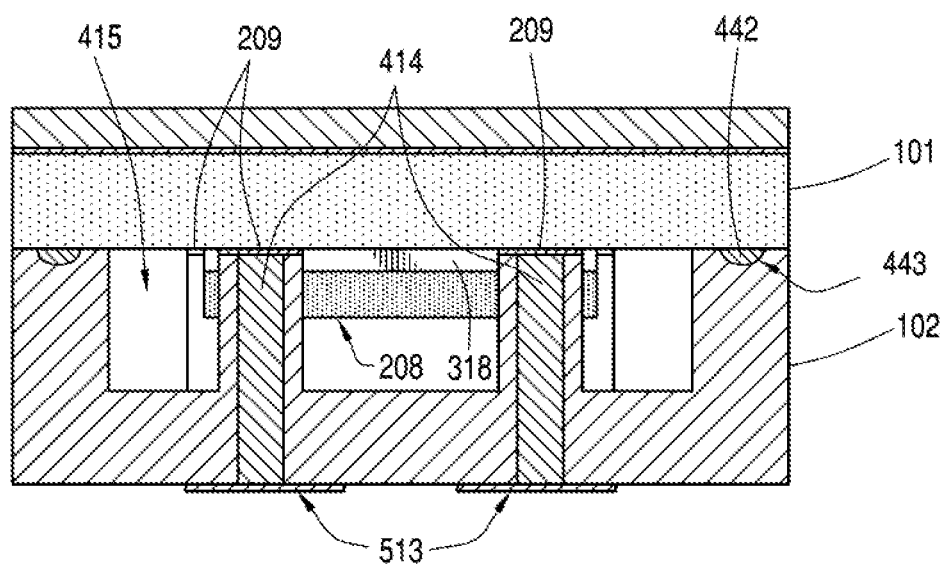
FIG. 6 illustrates a cross-sectional side view of the electrochemical sensor of FIG. 1 when the lid element is coupled to base element, taken from the viewpoint of cross-sectional line VI-VI of FIG. 1.
Figure 7:
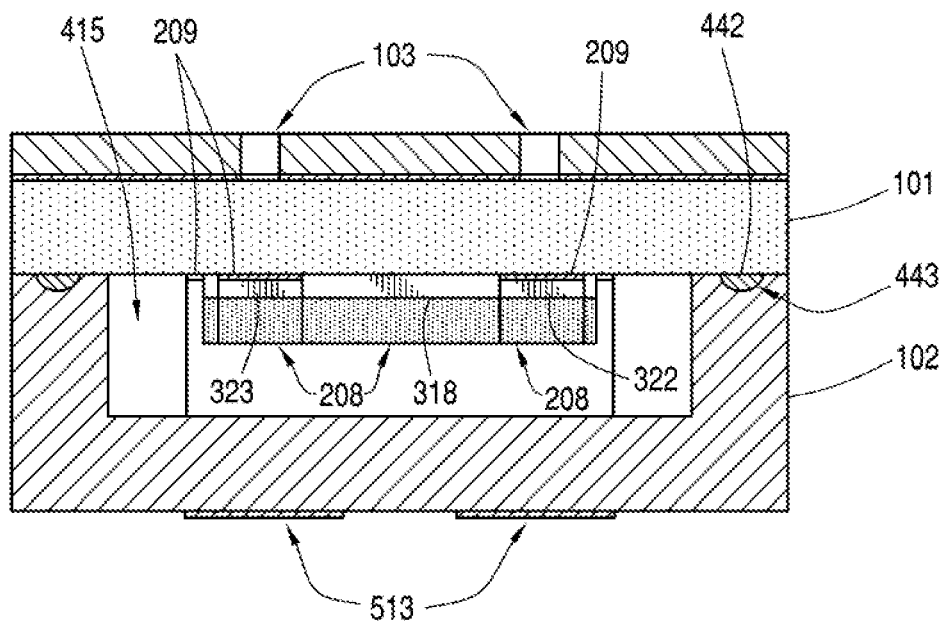
FIG. 7 illustrates a cross-sectional side view of the electrochemical sensor of FIG. 1 when the lid element is coupled to base element, taken from the viewpoint of cross-sectional line VII-VII of FIG. 1.
Figure 8:
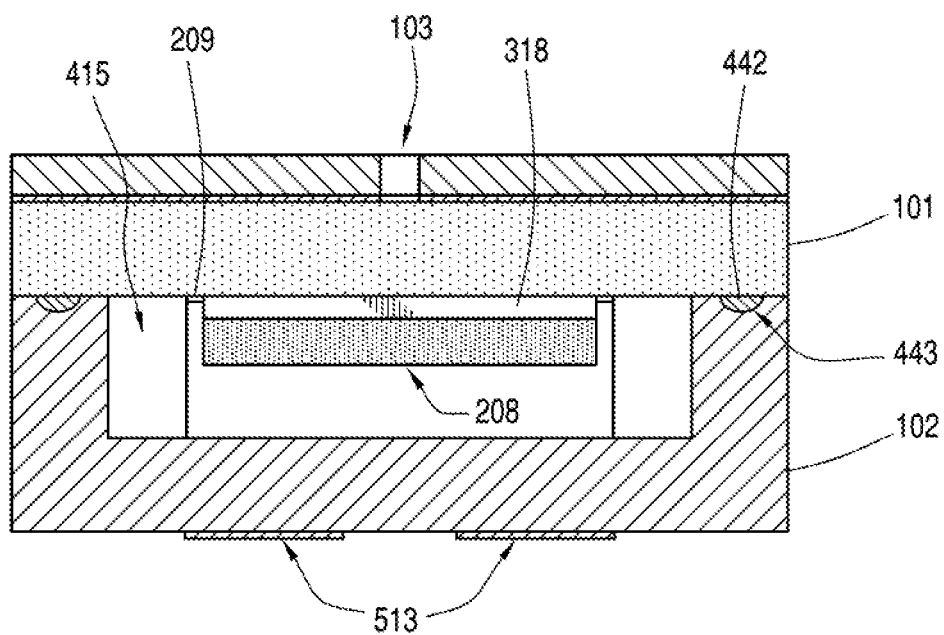
FIG. 8 illustrates a cross-sectional side view of the electrochemical sensor of FIG. 1 when the lid element is coupled to base element, taken from the viewpoint of cross-sectional line VIII-VIII of FIG. 1.
Figure 9:
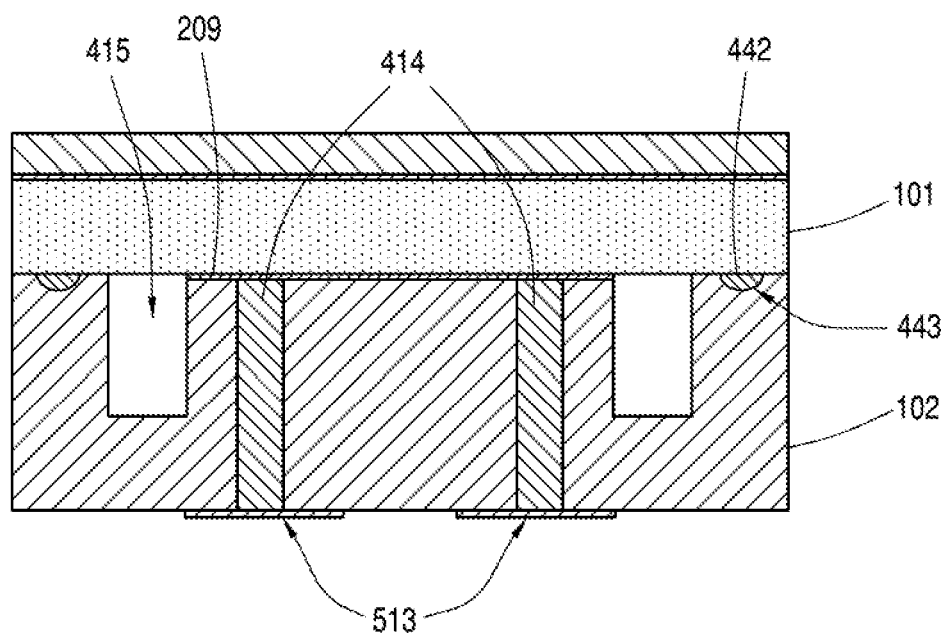
FIG. 9 illustrates a cross-sectional side view of the electrochemical sensor of FIG. 1 when the lid element is coupled to base element, taken from the viewpoint of cross-sectional line IX-IX of FIG. 1.

Turning to the drawings, FIG. 1 illustrates an isometric view of an electrochemical sensor 100 comprising a lid element 101 coupled to a base element 102, according to an embodiment; FIG. 2 illustrates a side view of lid element 101, according to the embodiment of FIG. 1; FIG. 3 illustrates a bottom view of lid element 101, according to the embodiment of FIG. 1; FIG. 4 illustrates a top view of base element 102, according to the embodiment of FIG. 1; FIG. 5 illustrates a bottom view of base element 102, according to the embodiment of FIG. 1; FIG. 6 illustrates a cross-sectional side view of electrochemical sensor 100 when lid element 101 is coupled to base element 102, taken from the viewpoint of cross-sectional line VI-VI of FIG. 1; FIG. 7 illustrates a cross-sectional side view of electrochemical sensor 100 when lid element 101 is coupled to base element 102, taken from the viewpoint of cross-sectional line VII-VII of FIG. 1; FIG. 8 illustrates a cross-sectional side view of electrochemical sensor 100 when lid element 101 is coupled to base element 102, taken from the viewpoint of cross-sectional line VIII-VIII of FIG. 1; and FIG. 9 illustrates a cross-sectional side view of electrochemical sensor 100 when lid element 101 is coupled to base element 102, taken from the viewpoint of cross-sectional line IX-IX of FIG. 1. In FIGS. 1-5, electrochemical sensor 100, lid element 101, and base element 102 together include a side 189 that is referenced in the figures to clarify the orientation of electrochemical sensor 100, lid element 101, and base element 102.

Electrochemical sensor 100 is merely exemplary and embodiments of the electrochemical sensor are not limited to the embodiments presented herein. Electrochemical sensor 100 can be employed in many different embodiments or examples not specifically depicted or described herein. In some embodiments, certain elements or modules of electrochemical sensor 100 can perform various methods and/or activities of those methods. In these or other embodiments, the methods and/or the activities of the methods can be performed by other suitable elements or modules of system 100.

In many embodiments, electrochemical sensor 100 can comprise a gas sensor (e.g., a printed gas sensor). Electrochemical sensor 100 can be operable to detect and measure a wide range of target gaseous components. In some embodiments, electrochemical sensor 100 can be operable to detect and measure carbon monoxide (CO), carbon dioxide ($CO_2$), hydrogen sulfide ($H_2S$), nitrogen monoxide (NO), acetone (($CH_3)_2CO$), hydrogen ($H_2$), one or more alcohols (e.g., ethanol ($CH_3CH_2OH$)), nitrogen dioxide ($NO_2$), sulfur dioxide ($SO_2$), ozone ($O_3$), and related compounds that can be either electro-oxidized or electro-reduced compounds. Further, electrochemical sensor 100 can be operable to detect and measure a total oxidants (TOX) and/or a total reductance (TOR). For exemplary electro-oxidized and electro-reduced compounds see: Stetter, J. R. Sang-Do, Han, and G. Korotchenkov, "Review of Electrochemical Hydrogen Sensors," Chemical Reviews 109(3), 2009, pp 1402-1433; Joseph R. Stetter and Jing Li, in Modern Topics in Chemical Sensing: Chapter 4, "Amperometric Gas Sensors-A Review," Chemical Reviews, 108 (2), 2008, pp 352-366; Chang, S. C., Stetter, J. R., Cha, C. S., "Amperometric Gas Sensors", Talanta, 40, No. 4, pp 461-467, (1993).

Referring to FIG. 1, although electrochemical sensor 100 is illustrated as a rectangular prism, electrochemical sensor 100 can comprise any suitable form (e.g., shape) and/or dimensions. Other exemplary shapes of electrochemical sensor 100 can comprise a cylinder, a triangular prism, a sphere, a hexagonal prism, an octagonal prism, etc.). In many embodiments, electrochemical sensor 100 can comprise a largest dimension of greater than or equal to approximately 0.500 millimeters and less than or equal to approximately 15.0 millimeters. For example, electrochemical sensor 100 can comprise a largest dimension of approximately 0.500 millimeters, approximately 1.00 millimeters, approximately 5.00 millimeters, approximately 10.0 millimeters, or approximately 15.0 millimeters.

In many embodiments, electrochemical sensor 100 comprises lid element 101 and base element 102. Further, electrochemical sensor 100 comprises a substrate 205 (FIG. 2), multiple electrodes 207 (FIG. 2), multiple interior contacts 209 (FIG. 2), a lid perimeter portion 310 (FIG. 3), a base perimeter portion 411 (FIG. 4), multiple signal communication channels 412 (FIG. 4), multiple exterior contacts 513 (FIG. 5), multiple signal communication lines 414 (FIG. 4), a sensor cavity 415 (FIG. 4), and an electrolyte element. For example, in various embodiments, multiple electrode(s) 207 of FIG. 2 can comprise first electrode 318 (FIG. 3), second electrode 322 (FIG. 3), and third electrode 323 (FIG. 3).

In these or other embodiments, electrochemical sensor 100 can comprise one or more inlets 103, a barrier layer 204 (FIG. 2), an adhesive layer 206 (FIG. 2), and/or multiple wicks 208 (FIG. 2). In some embodiments, inlet(s) 103, barrier layer 204 (FIG. 2), adhesive layer 206 (FIG. 2), and/or wicks 208 (FIG. 2) can be omitted.

Referring to FIG. 2, in some embodiments, lid element 101 can comprise substrate 205 and lid perimeter portion 310 (FIG. 3). In these or other embodiments, lid element 101 can comprise barrier layer 204, adhesive layer 206, at least one electrode of electrodes 207, at least one wick of wicks 208, at least one interior contact of interior contacts 209, and/or inlet(s) 103 (FIG. 1). Further, in some embodiments, barrier layer 204 can comprise inlet(s) 103 (FIG. 1). Additionally, in some embodiments, though not illustrated in FIG. 2, lid element 101 can further comprise at least one signal communication channel of signal communication channels 412 (FIG. 4), at least one exterior contact of exterior contacts 513 (FIG. 5), and/or at least one signal communication line of signal communication lines 414 (FIG. 4). In further embodiments, lid element 101 can comprise multiple or all electrodes of electrodes 207, multiple or all wicks of wicks 208, multiple or all interior contacts of interior contacts 209. In still further embodiments, though not illustrated in FIG. 2, lid element 101 can comprise multiple or all signal communication channels of signal communication channels 412 (FIG. 4), multiple or all exterior contacts of exterior contacts 513 (FIG. 5), and/or multiple or all signal communication lines of signal communication lines 414 (FIG. 4). In other embodiments, though not illustrated in FIG. 2, lid element 101 can be devoid of electrodes 207, wicks 208, and/or interior contacts 209, and in still other embodiments, as shown in FIG. 2, lid element 101 can be devoid of signal communication channels 412 (FIG. 4), exterior contacts 513 (FIG. 5), and/or signal communication lines 414 (FIG. 4).

In many embodiments, lid element 101 can comprise an exterior lid surface and an interior lid surface opposite the exterior lid surface. In these embodiments, the interior lid surface can comprise lid perimeter portion 310 (FIG. 3), and lid perimeter portion 310 (FIG. 3) can refer to a portion of interior lid surface proximal to an edge of lid element 101. In further embodiments, the lid perimeter portion can at least partially encircle a remaining portion of the interior lid surface.

Referring to FIG. 4, in some embodiments, base element 102 can comprise base perimeter portion 411 and sensor cavity 415. In further embodiments, though not illustrated in FIG. 4, base element 102 can comprise at least one electrode of electrodes 207 (FIG. 2), at least one wick of wicks 208 (FIG. 2), at least one interior contact of interior contacts 209 (FIG. 2). In other embodiments shown in FIG. 4, base element 102 can comprise at least one signal communication channel of signal communication channels 412, at least one exterior contact of exterior contacts 513 (FIG. 5), and/or at least one signal communication line of signal communication lines 414 (FIG. 4). In further embodiments, though not illustrated in FIG. 4, base element 102 can comprise multiple or all electrodes of electrodes 207 (FIG. 2), multiple or all wicks of wicks 208 (FIG. 2), and/or multiple or all interior contacts of interior contacts 209 (FIG. 2). In other embodiments, as illustrated in FIG. 4, base element 102 can comprise multiple or all signal communication channels of signal communication channels 412, multiple or all exterior contacts of exterior contacts 513 (FIG. 5), and/or multiple or all signal communication lines of signal communication lines 414. In other embodiments, as also illustrated in FIG. 4, base element 102 can be devoid of electrodes 207 (FIG. 2), wicks 208 (FIG. 2), and/or interior contacts 209 (FIG. 2), and in further embodiments, though not illustrated in FIG. 4, base element 102 also can be devoid of signal communication channels 412, exterior contacts 513 (FIG. 5), and/or signal communication lines 414 (FIG. 4).

Further, in many embodiments, base element 102 can comprise one or more exterior base surfaces, one or more interior base surfaces, and a top base surface separating the exterior base surface(s) and the interior base surface(s). In these embodiments, the top base surface can comprise base perimeter portion 411.

In many embodiments, lid element 101 (FIGS. 1-3 & 6-9) can be coupled to base element 102. Accordingly, in these or other embodiments, sensor cavity 415 can be formed by and/or between lid element 101 (FIGS. 1-3 & 6-9) and base element 102 when lid element 101 (FIGS. 1-3 & 6-9) is coupled to base element 102. For example, the interior base surface(s) of base element 102 and part of the interior lid surface of lid element 101 (FIGS. 1-3 & 6-9) can define (e.g., bound) sensor cavity 415 when lid element 101 (FIGS. 1-3 & 6-9) is coupled to base element 102. Meanwhile, sensor cavity 415 can contain electrodes 207 and the electrolyte element, and sensor cavity 415 can be operable as a test volume for electrochemical sensor 100 (FIGS. 1 & 6-9) when lid element 101 is coupled to base element 102. In these embodiments, sensor cavity 415 can be operable as a reservoir for the electrolyte element. Further still, in many embodiments, lid element 101 (FIGS. 1-3 & 6-9) can be coupled to base element 102 such that sensor cavity 415 is at least partially sealed (e.g., hermetically sealed) from the environment surrounding electrochemical sensor 100 (FIGS. 1 & 6-9). In these or other embodiments, substrate 205 (FIG. 2) can provide the only path of ingress into sensor cavity 415, and in many embodiments, can limit the material or materials that can access sensor cavity 415. For example, in some embodiments, substrate 205 can limit access to sensor cavity 415 to an analyte (e.g., a gas sample).

In these or other embodiments, lid element 101 (FIGS. 1-3 & 6-9) can be coupled to base element 102 by thermal bonding, anodic bonding, chemical bonding, adhesive bonding, ultrasonic bonding, lamination, pressure bonding, gasket (e.g., o-ring) bonding and/or welding. In many embodiments, lid perimeter portion 310 (FIG. 3) can be coupled to base element 102 at base perimeter portion 411 in order to couple lid element 101 (FIGS. 1-3 & 6-9) to base element 102. In many embodiments, when lid element 101 is coupled to base element 102 by anodic bonding, the substrate material(s) of substrate 205 (FIG. 2), as described below, can comprise a glass material, and the base element material(s) of base element 102 (FIG. 1), as described below, can comprise silicon, or vice versa.

In many embodiments, electrochemical sensor 100 can comprise sealing gasket 442 (FIG. 4). Sealing gasket 442 (FIG. 4) can be operable to couple lid element 101 (FIGS. 1-3 & 6-9) to base element 102 and/or to at least partially seal (e.g., hermetically seal) sensor cavity 415 when lid element 101 (FIGS. 1-3 & 6-9) is coupled to base element 102. In some embodiments, lid element 101 of FIG. 1 (e.g., lid perimeter portion 310 (FIG. 3)) and/or base element 102 (e.g., base perimeter portion 411) can comprise groove 443 (FIG. 4) extending around at least part of lid element 101 of FIG. 1 (e.g., lid perimeter portion 310 (FIG. 3)) and/or base element 102 (e.g., base perimeter portion 411) to receive sealing gasket 442 (FIG. 4). In other embodiments, though not illustrated at the drawings, sealing gasket 442 (FIG. 4) can be omitted.

Sealing gasket 442 (FIG. 4) can comprise one or more gasket materials. The gasket material(s) can comprise one or more materials suitable to couple and seal lid element 101 to base element 415 (FIG. 4). Exemplary gasket material(s) can comprise fluorinated ethylene propylene (FEP), perfluoroether polytetrafluoroethylene (PFA), liquid polyimide, polyimide and epoxy, high temperature epoxy, pressure sensitive adhesive (PSA), thermal set adhesive (TSA), and/or silicone adhesive, etc.

Returning now to FIG. 2, in many embodiments, substrate 205 can be operable to receive the analyte. Further, in some embodiments, substrate 205 can be operable to allow the analyte to pass through (e.g., permeate) at least part of substrate 205 to communicate and electrochemically react with one or more electrodes (e.g., a working electrode) of electrodes 207 when lid element 101 is coupled to base element 102 (FIGS. 1 & 4-9). Accordingly, in many embodiments, substrate 205 can comprise an at least partially porous substrate and/or can comprise one or more inlet(s) (not illustrated at the drawings), such as, for example, to permit the analyte access to one or more electrodes of electrodes 207 when lid element 101 is coupled to base element 102 (FIGS. 1 & 4-9).

In these or other embodiments, substrate 205 can comprise one or more substrate materials. The substrate material(s) can comprise one or more polymer materials (e.g., low surface energy polymer materials) and/or one or more ceramic (e.g., glass) materials. For example, in some embodiments, exemplary polymer material(s) can comprise polytetrafluoroethylene (PTFE), polyethylene terephthalate (PET), polyethylene, polypropylene, polyisobutylene, polyester, polyurethane, polyacrylic, fluorine polymer, cellulosic polymer, fiberglass (e.g., treated to alter the hydrophobicity or oligophobicity), and/or any other non-reactive thermoplastic, or composites or mixtures thereof. Further, in these or other embodiments, exemplary ceramic (e.g., glass) material(s) can comprise alumina ($Al_2O_3$), alumina nitride, sapphire, silicon, amorphous silicon, silicon nitride, silicon dioxide, barium borosilicate, soda lime silicate, alkali silicate, silicon-oxygen tetrahedral, etc. In some embodiments, the substrate material(s) can be wettable, and in other embodiments, can be non-wettable.

Further, substrate 205 can comprise a substrate thickness and/or a substrate pore diameter. In some embodiments, the substrate thickness can be greater than or equal to approximately 0.100 micrometers and less than or equal to approximately 0.250 micrometers, and/or the substrate pore diameter can be greater than or equal to approximately 0.100 micrometers and less than or equal to approximately 5.00 micrometers. However, in further embodiments, as discussed further below, the substrate thickness and/or substrate pore diameter can comprise any suitable thickness and/or diameter permitting an analyte to communicate and electrochemically react with one or more electrodes of electrodes 207 when lid element 101 is coupled to base element 102 (FIGS. 1 & 4-9).

In many embodiments, substrate 205 can comprise or consist of one or more membranes operable to permit the analyte to permeate through substrate 205 to communicate and electrochemically react with one or more electrodes of electrodes 207 when lid element 101 is coupled to base element 102 (FIGS. 1 & 4-9). In these or other embodiments, the membrane(s) can be characterized according to a Gurley number (i.e., gas transport efficiency through the membrane(s)) and/or a water initiation pressure (i.e., a pressure at which water diffuses through the membrane(s)) of the membrane(s). For example, the water initiation pressure of the membrane(s) can be greater than or equal to approximately 25.00 kilopascals and less than or equal to 103.4 kilopascals. In further embodiments, the water initiation pressure of the membrane(s) can be greater than or equal to approximately 75.84 kilopascals.

Though not illustrated at the drawings, in some embodiments, when substrate 205 comprises the membrane(s), the inlet(s) of substrate 205 can comprise the membrane(s) and/or the membrane(s) can be approximately co-planar and/or parallel with substrate 205. For example, in these embodiments, each inlet of the inlet(s) of substrate 205 can comprise one membrane of the membrane(s). Further, the membrane(s) can be located in or over the inlet(s) of substrate 205. Also, in some embodiments, when substrate 205 comprises the membrane(s), the membrane(s) can be provided in a solid or liquid form. In various embodiments, when the membrane(s) are provided in a liquid form, the membrane(s) can be dried into a solid form.

In these or other embodiments, the membrane(s) can be at least partially porous, and/or can be hydrophobic, oligophobic, or hydrophillic. In some embodiments, the membrane(s) can comprise one or more hydrophobic membranes, such as, for example, when the electrolyte element comprises an aqueous or hydrophilic room temperature ionic liquid (RTIL) electrolyte material. In other embodiments, the membrane(s) can comprise one or more oligophobic membranes, such as, for example, when the electrolyte element comprises a hydrophobic organic electrolyte material (e.g., an ionic liquid or more particularly an room temperature ionic liquid (RTIL), a salt in the liquid state that primarily comprises ions and short-lived ion pairs). A wettability of the membrane(s) of substrate 205 to the electrolyte material(s) of the electrolyte element can be measured according to a contact angle of the electrolyte material(s) of the electrolyte element to the membrane(s). In various embodiments, a contact angle of the electrolyte material(s) of the electrolyte element to the membrane(s) of substrate 205 can be greater than or equal to a contact angle for water or sulfuric acid (e.g., approximately) 90°.

The membrane(s) of substrate 205 can comprise one or more membrane materials. In some embodiments, the membrane material(s) can be similar or identical to the substrate material(s) of substrate 205. In further embodiments, the substrate material(s) can consist of the membrane material(s), such as, for example, when substrate 205 consists of the membrane(s).

For example, in some embodiments, the membrane material(s) can comprise one or more porous hydrophobic and oligophobic materials, such as, for example, polytetrafluoroethylene (PTFE) or equivalenet (e.g., MuPor™ by Porex™, Zitex™ by Saint-Gobain™, Gore-Tex)® by WL Gore & Associates, Inc.), polypropylene (e.g. polypropylene filters by Pall™, polypropylene membranes by Sterlitech™), polycarbonate (PC) (e.g., polycarbonate track etch (PCTE) membrane disc filters by Sterlitech™), and polyvinylidene fluoride (PVDF) (e.g., Immobilon™ by Millipore™). Meanwhile, the membrane(s) of substrate 205 can comprise one or more porous hydrophillic membranes when the substrate material(s) include polyethersulfone (PES) (e.g., polyethersulfone membranes by Pall™), surface modified polyvinyl chloride (PVC) (e.g., PVC with ozone induced graft polymerization), and surface modified polypropylene (e.g., polypropylene with ultraviolet (UV) radiation). In some embodiments, substrate 205, a surface of substrate 205, and/or the membrane(s) of substrate 205 can be made hydrophobic by treating substrate 205 with cytop or by derivatizing a surface of substrate 205 with silane. Further, substrate 205 and/or the membrane(s) of substrate 205 can be made hydrophobic or oligophobic generally by selecting a surface treatment chemistry with a desired level of hydrophobicity or oligophobicity.

In many embodiments, barrier layer 204 can be operable to structurally support substrate 205 and/or to limit an exposed surface area of substrate 205. Accordingly, in these or other embodiments, barrier layer 204 can be coupled to substrate 205, such as, for example, at one side of substrate 205 (e.g., a side of substrate 205 not forming the interior lid surface of lid element 101).

In some embodiments, barrier layer 204 can be coupled to support substrate 205 by adhesive layer 206. In these embodiments, adhesive layer 206 can comprise fluorinated ethylene propylene (FEP), perfluoroether polytetrafluoroethylene (PFA), liquid polyimide, polyimide and epoxy, high temperature epoxy, pressure sensitive adhesive (PSA), thermal set adhesive (TSA), and/or silicone adhesive, etc. In other embodiments, adhesive layer 206 can be omitted. In further embodiments, barrier layer 204 can be coupled to substrate 205 by lamination or any other suitable manner of coupling. In still further embodiments, barrier layer 204 can be deposited over substrate 205 to couple barrier layer 204 to substrate 205.

For example, in many embodiments, barrier layer 204 can be deposited over substrate 205 using any suitable deposition technique (e.g., spin coating, dispensing, screen-printing, jetting, etc.). In these embodiments, barrier layer 204 can be cured at greater than or equal to 300° C. or less than or equal to 400° C. and washed. Further, in these or other embodiments, one or more edges of lid element 101 can be sealed.

Barrier layer 204 can comprise a barrier layer thickness greater than or equal to approximately 0.001 millimeters and less than or equal to approximately 0.127 millimeters. In further embodiments, the barrier layer thickness can be greater than or equal to approximately 0.0508 millimeters and less than or equal to approximately 0.0100 millimeters. However, in other embodiments, the barrier layer thickness can be any suitable thickness permitting an analyte to communicate and electrochemically react with one or more electrodes of electrodes 207 when lid element 101 is coupled to base element 102 (FIGS. 1 & 4-9) and when barrier layer 204 is coupled to substrate 205. In these or other embodiments, barrier layer 204 can comprise one or more barrier layer materials. The barrier layer material(s) can comprise one or more polymer materials (e.g., polyimide, polyethylene terephthalate (PET), polycarbonate (PC), polypropylene, etc.), one or more metal material(s), and/or one or more ceramic (e.g., glass) materials (e.g., alumina ($Al_2O_3$), alumina nitride, sapphire, silicon, amorphous silicon, silicon nitride, silicon dioxide, barium borosilicate, soda lime silicate, alkali silicate, silicon-oxygen tetrahedral, etc.).

In some embodiments, as discussed above, barrier layer 204 can comprise inlet(s) 103 (FIG. 1). Inlet(s) 103 (FIG. 1) can be operable to allow an analyte to access substrate 205 when barrier layer 204 is coupled to substrate 205 and when lid element 101 is coupled to base element 102 (FIGS. 1 & 4-9). In some embodiments, when barrier layer 204 is omitted, inlet(s) 103 (FIG. 1) can be omitted.

In some embodiments, inlet(s) 103 (FIG. 1) can be arranged in any suitable arrangement (e.g., pattern and/or spacing). For example, inlet(s) 103 (FIG. 10) can be arranged in a square pattern with a 1.00 millimeter spacing.

In some embodiments, as discussed above, substrate 205 can comprise one or more inlets. In these or other embodiments, base element 102 (FIGS. 1 & 4-9) can comprise one or more inlets.

The inlet(s) of substrate 205 and/or of base element 102 (FIGS. 1 & 4-9) can be at least partially aligned with inlet(s) 103. Further, the inlet(s) of substrate 205 and/or of base element 102 (FIGS. 1 & 4-9) can be operable to allow an analyte to communicate and electrochemically react with one or more electrodes of electrodes 207 when lid element 101 is coupled to base element 102 (FIGS. 1 & 4-9). For example, substrate 205 can comprise the inlet(s) and/or base element 102 (FIGS. 1 & 4-9) when the substrate material(s) of substrate 205 are non-porous. However, in other embodiments, substrate 205 and/or base element 102 (FIGS. 1 & 4-9) can be devoid of any inlet(s), such as, for example, when the substrate material(s) of substrate 205 are porous.

In many embodiments, one or more inlet(s) of inlet(s) 103 (FIG. 1), the one or more of the inlet(s) of substrate 205, and/or the one or more of the inlet(s) of base element 102 (FIGS. 1 & 4-9) can be at least partially aligned with (e.g., overlapping) electrodes 207. Aligning inlet(s) 103 (FIG. 1), the inlet(s) of substrate 205, and/or the inlet(s) of base element 102 (FIGS. 1 & 4-9) with electrodes 207 can improve an analyte detection time of electrochemical sensor 100 (FIGS. 1 & 6-9), such as, for example, by making electrodes 207 more easily accessible to an analyte being tested at sensor cavity 415 (FIG. 4). Still, in these or other embodiments, one or more inlet(s) of inlet(s) 103 (FIG. 1), the one or more of the inlet(s) of substrate 205, and/or the one or more of the inlet(s) of base element 102 (FIGS. 1 & 4-9) can be unaligned with one or more of electrodes 207.

In many embodiments, inlet(s) 103 (FIG. 1), the inlet(s) of substrate 205, and/or the inlet(s) of base element 102 (FIGS. 1 & 4-9) can comprise one or more inlet diameters. The inlet diameter(s) can be the same or different from each other. Further, the inlet diameter(s) implemented can depend on an analyte to be detected by electrochemical sensor 100 (FIGS. 1 & 6-9), a desired range of electrochemical sensor 100, and a manner of construction and/or operation (e.g., diffusion limited signal, reaction rate limited signal, etc.) of electrochemical sensor 100. For example, the inlet diameter(s) can be sized to be sufficiently large to allow an analyte to communicate and electrochemically react with one or more electrodes of electrodes 207 when lid element 101 is coupled to base element 102 (FIGS. 1 & 4-9) and to be sufficiently small so that the analyte does not overwhelm a test capacity of electrodes 207 and/or fail to provide a desired range of reactivity. In some embodiments, the inlet diameter(s) can be greater than or equal to approximately 0.0762 millimeters and less than or equal to approximately 2.032 millimeters. In some embodiments, larger inlet diameters can be implemented for lower concentrations (e.g. a 1-10 parts per million (ppm) carbon monoxide (CO) sensor) while smaller inlet diameters can be implemented for a broader range sensor (e.g. a 0-10,000 ppm carbon monoxide (CO) sensor).

In some embodiments, inlet(s) 103 (FIG. 1), the inlet(s) of substrate 205, and/or the inlet(s) of base element 102 (FIGS. 1 & 4-9) can be formed by stamping, selective depositing, etching, laser cutting, die cutting, drilling, etc. Further, when barrier layer 204 is formed by deposition over substrate 205, barrier layer 204 can be masked with photoresist and etched to form inlet(s) 103 (FIG. 1). In these or other embodiments, inlet(s) 103 (FIG. 1), the inlet(s) of substrate 205, and/or the inlet(s) of base element 102 (FIGS. 1 & 4-9) can be linear or tortuous (e.g., curved, stepped, etc.).

In some embodiments, inlet(s) 103 (FIG. 1), the inlet(s) of substrate 205, and/or the inlet(s) of base element 102 (FIGS. 1 & 4-9) can comprise one or more filters and/or reactive agents. The filter(s) can be at least partially porous. Further, the filter(s) and/or reactive agent(s) can comprise one or more filter materials and/or one or more reactive material(s) configured to prevent certain material from accessing and/or leaving sensor cavity 415 (FIG. 4) while permitting an analyte to access sensor cavity 415 (FIG. 4). For example, the filter(s) and/or reactive agent(s) can prevent dust or interfering gases (e.g., hydrogen sulfide when electrochemical sensor 100 is implemented to detect carbon monoxide (CO)) from accessing sensor cavity 415 (FIG. 4), and/or can prevent electrolyte from evaporating from sensor cavity 415 (FIG. 4). Further, the filter(s) can reduce pressure fluctuations and air turbulence at electrochemical sensor 100 (FIGS. 1 & 6-9). Exemplary filter material(s) and/or reactive material(s) can comprise polytetrafluoroethylene (PTFE), carbon, impregnated carbon cloth, potassium permanganate ($KMnO_4$) on alumina ($Al_2O_3$), etc. An exemplary filter material and/or reactive material for nitrogen monoxide (NO) can include triethanolamine on silica. Other filter material(s) and/or reactive material(s) can be implemented based on acid-base and other absorptive or reactive properties of the filter material(s). For example, copper acetate ($C_4H_6CuO_4$), bicarbonate ($HCO_3$), or similar basic salts can be used to remove acid gases like hydrogen sulfide ($H_2S$) or sulfur dioxide ($SO_2$). For ammonia removal, the filter material(s) and/or reactive material(s) can comprise an acid media such as acid washed alumina. However, because the acid washed alumina can remove basic gases, the acid washed alumina can be dispersed to remove the gases efficiently without impeding the analyte flow.

In many embodiments, one or more electrodes (e.g., a working electrode) of electrodes 207 can be operable to communicate and electrochemically react with an analyte when the electrode(s) of electrodes 207 are in communication with the analyte and the electrolyte element. In some embodiments, electrodes 207 can be part of an electrode layer. In many embodiments, at least one electrode of electrodes 207 can be formed on one side of substrate 205 (e.g., a side of substrate 205 forming the interior lid surface of lid element 101). For example, when electrochemical sensor 100 (FIGS. 1 & 6-9) and/or lid element 101 comprise barrier layer 204 and when barrier layer 204 is coupled to substrate 205, at least one electrode of electrodes 207 can be formed on a side of substrate 205 that is opposite the side of substrate 205 coupled to barrier layer 204. In these or other embodiments, though not illustrated in FIG. 2, at least one electrode of electrodes 207 can be formed on base element 102 of FIG. 1 (e.g., at one or more of the interior base surface(s) of base element 102 (FIGS. 1 & 4-9)).

Electrodes 207 can comprise one or more electrode material(s). For example, in some embodiments, the electrode material(s) can comprise one or more metal materials. Further, the electrode material(s) can comprise an ink composite (e.g., suspending the metal material(s)) such that electrodes 207 are configured as porous gas diffusion electrodes. In these embodiments, a physical structure of electrodes 207 can be controlled by a formulation and curing process of the ink composite.

For example, the electrode material(s) can comprise greater than or equal to approximately 60% and less than or equal to approximately 90% of one or more electrically conductive materials. The electrically conductive material(s) can be operable as a catalyst, can be configured as a powder, and/or can comprise one or more metal or metal alloy materials (e.g., platinum (Pt), palladium (Pd), gold (Au), silver (Ag), ruthenium (Ru), rhodium (Rh), iridium (Ir), cobalt (Co), iron (Fe), and/or nickel (Ni), etc.) and/or carbon (C). The electrically conductive material(s) further can comprise one or more supported catalyst materials. For example, the supported catalyst material(s) can comprise nanoparticulate carbon, ball-milled graphitic carbon, single walled carbon nanotubes (SWCNTs), gold (Au) nanoparticles, or any suitable support catalyst.

In these or other embodiments, the electrode material(s) can comprise greater than or equal to approximately 2% and less than or equal to approximately 40% of a polymer material (e.g., micron-sized polytetrafluoroethylene (PTFE) particles).

In these or other embodiments, the electrode material(s) can comprise an ink composition comprising less than or equal to approximately 10% of one or more binders, less than or equal to approximately 10% of one or more surfactants, and/or greater than or equal to approximately 0% and less than or equal to approximately 10% of one or more modifiers. In many embodiments, the ink composition can be operable to suspend the other electrode material(s) of electrodes 207.

In many embodiments, the binder(s) can remain at electrodes 207 during electrochemical reactions of electrodes 207 with an analyte and can be operable to provide structural support to electrodes 207. Further, the binder(s) can be operable to provide the ink composition with a desired viscosity and vaporization/drying rate for deposition (e.g., screen-printing) and/or to couple electrodes 207 to substrate 205 and/or base element 102 (FIGS. 1 & 4-9) and merge electrodes 207 with substrate 205 and/or base element 102 (FIGS. 1 & 4-9) when electrodes 207 are cured to control electrode properties such as hydrophobicity, hydrophilicity and/or porosity (amount and type). Exemplary binder(s) can include Nicrobraz-S (available from Wall Colmonoy Corporation located in Madison Heights, Mich.), or solutions of polyvinyl alcohol (PVA). Other suitable binders include silicate or aluminate materials, or polymers such as ethyl cellulose.

In further embodiments, the modifier(s) can comprise one or more additives operable to alter properties of electrodes 207, such as, for example, wetting or porosity. The modifier(s) can comprise small amounts of additives, which can be active in controlling the behavior of the ink composition before, during, and/or after processing and curing. Exemplary modifier(s) can include polyvinyl alcohol, 1-propanol, gum arabic, sodium n-dodecyl sulfate, ethanol, or a composite material.

In still further embodiments, the surfactant(s) can be operable as a solution stabilizer for the ink composition and can comprise one or more solvents. Exemplary surfactant(s) can comprise water, triton-100, carbopol or other materials.

One or more of the material(s) of the ink composition can evaporate or bake out of electrodes 207 during a curing process, or can be electrochemically inert and configured not to alter performance, porosity, or wettability of electrodes 207. Further, the material(s) of the ink composition can leave behind an electrode catalyst of a desired porosity, chemistry, density, and hydrophobicity or hydrophilicity for optimum interaction with the electrolyte element and the analyte.

In many embodiments, a surface area of electrodes 207 can be sized to control an electrode-electrolyte interface, such as, for example, to optimally maximize an electric current output of electrochemical sensor 100 (FIGS. 1 & 6-9) and minimize electrical noise in electrochemical sensor 100 (FIGS. 1 & 6-9). In many embodiments, an optimal analytical signal for an analyte can depend on various signal, background, noise, and interference considerations. In some embodiments, electrodes 207 can be operable as a gas-permeable membrane and provide a physical boundary between the electrolyte element and the analyte.

In many embodiments, electrodes 207 can be formed in any suitable manner. For example, electrodes 207 can be sputtered, stamped, stenciled, or deposited (e.g., screen-printed, inkjet printed, etc.) onto or made to lie next to substrate 205 and/or base element 102 (FIGS. 1 & 4-9). When electrodes 207 are deposited, the deposition can be implemented by physical or chemical deposition.

In some embodiments, electrodes 207 can be cured after electrodes 207 are sputtered, stamped, stenciled, or deposited (e.g., screen-printed, inkjet printed, etc.) onto or made to lie next to substrate 205 and/or base element 102 (FIGS. 1 & 4-9). In these embodiments, electrodes 207 can be cured at a temperature less than a melting temperature of substrate 205. In these or other embodiments, electrodes 207 can be cured at a cure temperature of greater than or equal to approximately 260° C. and less than or equal to approximately 330° C. For example, electrodes 207 can be cured at a cure temperature of approximately 300° C.

In further embodiments, electrodes 207 can comprise an electrode thickness. For example, the electrode thickness can be greater than or equal to approximately 100 nanometers and less than or equal to approximately 125 microns. However, in other embodiments, the electrode thickness can be any suitable thickness configured to effectively electrochemically react with an analyte. For example, when electrodes 207 are deposited by screen-printing, the electrode thickness can be greater than or equal to approximately 0.0254 millimeters and less than or equal to approximately 0.127 millimeters, depending on the ink formulation and the screen mesh size used to deposit the electrode material(s). In some embodiments, screen-printing can provide a fast, efficient method to form electrodes 207 at the same time and to form multiple electrochemical sensors on a large substrate area, simultaneously. Exemplary electrode metal material(s)

implemented with screen-printing deposition can include platinum (Pt) particles for detecting carbon monoxide (CO), gold (Au) particles for detecting hydrogen sulfide ($H_2S$), and single walled carbon nanotubes (SWCNTs) for detecting ozone.

In many embodiments, when one or more electrode(s) (e.g., a working electrode) of electrodes 207 electrochemically react with an analyte, electrochemical sensor 100 generates an electric current indicating that the analyte is present (i.e., detected). Further, in some embodiments, an amount of electric current generated by electrochemical sensor 100 can correspond to an amount of the analyte present (i.e., detected).

In these or other embodiments, electrodes 207 can comprise a first electrode referred to as a sensing or working electrode and a second electrode referred to as a counter, auxiliary, counter-reference, or common electrode. The first electrode can be configured to communicate and electrochemically react with the analyte. When the analyte comes in contact with the first electrode, an oxidation or reduction reaction takes place at the first electrode, with a corresponding reduction or oxidation reaction occurring at the second electrode.

For example, when electrochemical sensor 100 is configured to detect carbon monoxide, an oxidation/reduction reaction can occur at sensor cavity 415 (FIG. 4). In these examples, carbon monoxide can undergo oxidation reaction (1) as follows:

$$CO+H_2O \rightarrow CO_2+2H^++2e^- \quad (1)$$

Meanwhile, protons (hydrogen ions) generated by the oxidation reaction can migrate across a proton conductive electrolyte element to the second electrode where they can react with oxygen according to reduction reaction (2) as follows:

$$2H^++2e^-+\tfrac{1}{2}O_2 \rightarrow H_2O \quad (2)$$

In some embodiments, electrodes 207 can comprise a third electrode. In these embodiments, the third electrode can be referred to as a reference electrode. The third electrode can be configured with a constant or approximately constant electrical potential throughout the analyte reaction. Accordingly, the third electrode can help to stabilize an electrical potential of the first electrode. In other embodiments, the second electrode may be non-polarizable such that the second electrode can be operable as a reference electrode. Further, if the electric current generated by electrochemical sensor 100 (FIGS. 1 & 6-9) is sufficiently small to minimally polarize the second electrode, then the second electrode can be used as a reference electrode when electrodes 207 comprise three electrodes.

As explained in greater detail below, electrochemical sensor 100 (FIGS. 1 & 6-9) can be coupled (e.g., electrically coupled) to one or more electronic components, such as, for example, to read and measure an electrical current generated by electrochemical sensor 100. Exemplary electronic components can comprise a micro-controller, a current to voltage convertor, a potentiostat, an amperostat, a current mirror, a galvanic sensor operation and circuit, etc.

In many embodiments, electrodes 207 can comprise wicks 208. In these embodiments, each electrode of electrodes 207 can comprise one wick of wicks 208. In some embodiments, wicks 208 can be operable to absorb and wick the electrolyte element into communication with electrodes 207. In various embodiments, wicks 208 can be electrically nonconductive. Further, in these or other embodiments, wicks 208 can be operable to provide ionic communication between electrodes 207 and the electrolyte element. Wicks 208 can be deposited (e.g., screen-printed, inkjet printed, etc.) over part or all of electrodes 207.

In some embodiments, wicks 208 can be at least partially porous. Further, wicks 208 can comprise one or more wick materials. The wick material(s) can comprise silicate, silicon carbide, carbon, graphite, alumina, fiber glass, polymer, or any material suitably configured to absorb and wick the electrolyte element.

In further embodiments, wicks 208 can comprise a wick thickness. The wick thickness can be approximately constant or can vary individually and/or with respect to others of wicks 208. Further, in many embodiments, the wick thickness can be greater than or equal to approximately 5 microns and less than or equal to approximately 125 microns. However, in other embodiments, the wick thickness can comprise any thickness suitable to absorb and wick the electrolyte element.

In many embodiments, electrodes 207 can be in electrolytic communication with the electrolyte element. When electrochemical sensor 100 (FIGS. 1 & 6-9) and/or electrodes 207 comprise wicks 208, wicks 208 can be operable to facilitate electrolytic communication of the electrolyte element with electrodes 207, as discussed above. In some embodiments, the electrolyte element can comprise an electrolyte layer.

In further embodiments, the electrolyte element can comprise one or more electrolyte materials. For example, the electrolyte material(s) can comprise one or more materials configured to provide electrolytic communication between or among electrodes 207. In these or other embodiments, the electrolyte element can be configured in aqueous solutions of acids, bases, and/or salts or can be non-aqueous. Exemplary electrolyte material(s) can comprise NAFION™, propylene carbonate lithium perchlorate, polyethylene oxide lithium chloride, phosphoric acid, sulfuric acid, aqueous phosphoric acid, aqueous sulfuric acid, methanesulphonic acid, aqueous phosphate salt solution, aqueous sulfate salt solution, potassium hydroxide, aqueous potassium acetate, lithium perchlorate in propylene carbonate, polyvinyl alcohol with sulfuric acid, polyacrylic acid, an ionic gel electrolyte, and/or an ionic liquid (e.g., room temperature ionic liquid (RTIL)), etc.

Further, the electrolyte material(s) can have certain contact angles with substrate 205. In some embodiments, the electrolyte material(s) implemented can be determined based on the range(s) of their contact angle(s) with substrate 205. For example, a contact angle of an electrolyte material with substrate 205 can impact a performance of substrate 205 with respect to that electrolyte material. Contact angles of exemplary room temperature ionic liquid (RTIL) electrolyte materials are provided below based on working contact angle measurements of a 2 μL droplet of each exemplary electrolyte material on MuPor porous polytetrafluoroethylene (PTFE). 4M sulfuric acid ($H_2SO_4$) has about a 118° contact angle, 1-Hexyl-3-methylimidazolium bis(trifluoromethylsulfonyl)imide has about a 99° contact angle, 1-Ethyl-3-methylimidazolium bis(trifluoromethylsulfonyl)imide has about a 106° contact angle, 1-Butyl-3-methylimidazolium bis(trifluoromethylsulfonyl)imide has about a 90° contact angle, 1-ethyl-3-methylimidazolium ethyl sulfate has about a 113° contact angle, 1-butyl-3-methylimidazolium tetrafluoroborate has about a 139° contact angle, 1-ethyl-3-methylimidazolium tetrafluoroborate has about a 122° contact angle, 1-butyl-1-methylpyrrolidinium dicyanamide has a contact angle between about 131° and 134°, and 1-butyl-1-methylpyrrolidinium bis[(trifluoromethyl)sulfonyl]imide has about a 71° contact angle. In many embodiments, the electrolyte material(s) can be implemented with contact angle(s) greater than 115°. Implementing electrolyte material(s) comprising contact angle(s) greater than 115° can provide a high quality response in measurements of hydrogen sulfide ($H_2S$) and ozone ($O_3$) and also can be suited to other gas measurement chemistries.

Further, the electrolyte element can be configured in a solid, liquid and/or gel state. In some embodiments, the electrolyte element can be configured in a matrix or suspended in a gelling agent to prevent dryout or movement of the electrolyte element during vibration or use or to otherwise enhance sensing properties of electrochemical sensor 100 (FIGS. 1 & 6-9).

Meanwhile, in some embodiments, electrochemical sensor 100 can comprise one or more a expansion chambers. The expansion chamber(s) can be coupled to sensor cavity 415 (FIG. 4) to accommodate expansion and contraction of the electrolyte element at sensor cavity 415 (FIG. 4).

In many embodiments, base element 102 (FIGS. 1 & 4-9) can be coupled to lid element 101 to enclose sensor cavity 415 (FIG. 4), electrodes 207, and the electrolyte element and/or to form an integrated structure with lid element 101. In some embodiments, base element 102 can comprise an encapsulation layer.

In some embodiments, base element 102 (FIGS. 1 & 4-9) can be at least partially porous. Further, base element 102 (FIGS. 1 & 4-9) can comprise one or more base element materials. The base material(s) can comprise one or more materials suitable to enclose and at least partially seal sensor cavity 415 (FIG. 4). Exemplary base element material(s) can comprise one or more polymer materials and/or one or more ceramic (e.g., glass) materials. Exemplary polymer material(s) can comprise polyimide, polycarbonate (PC), polyethylene, polypropylene, polyisobutylene, polyester, polyurethane, polyacrylic, fluorine polymer, cellulosic polymer, fiberglass, polytetrafluoroethylene (PTFE), etc. In these or other embodiments, exemplary ceramic (e.g., glass) material(s) can comprise alumina ($Al_2O_3$), alumina nitride, sapphire, silicon, amorphous silicon, silicon nitride, silicon dioxide, barium borosilicate, soda lime silicate, alkali silicate, silicon-oxygen tetrahedral, etc. In some embodiments, exemplary base element material(s) can comprise one or more potting compounds, other materials or mixtures or composites thereof that can be suitably bonded to form base element 102 (FIGS. 1 & 4-9).

In some embodiments, base element 102 can comprise one or more capillary channels. In these embodiments, sensor cavity 415 (FIG. 4) can be filled with the electrolyte element via the capillary channel(s). In further embodiments, base element 102 can comprise one or more gas vents. The gas vent(s) can permit air to evacuate sensor cavity 415 (FIG. 4) as the electrolyte element fills sensor cavity 415 (FIG. 4). Further, the gas vent(s) can allow venting of sensor cavity 415 (FIG. 4) in applications where electrochemical sensor 100 (FIGS. 1 & 6-9) experiences large pressure fluctuations, such as, for example, where electrochemical sensor 100 (FIGS. 1 & 6-9) is detecting gas on airplanes or in submarines. In many embodiments, the capillary channel(s) and/or gas vent(s) can be formed by stamping, laser cutting or die cutting. In other embodiments, the capillary channel(s) and/or gas vent(s) can be omitted. In other embodiments, the capillary channel(s) and/or gas vent(s) can be omitted. In these embodiments, sensor cavity 415 (FIG. 4) can be filled with the electrolyte element before lid 101 is coupled to base element 102 (FIGS. 1 & 4-9).

In many embodiments, interior contacts 209 can comprise multiple electrically conductive pads. Interior contacts 209 can comprise any suitable shape (e.g., circular, rectangular, etc.).

Electrodes 207 can be coupled (e.g., electrically coupled) to interior contacts 209. For example, each electrode of electrodes 207 can be coupled (e.g., electrically coupled) to at least one interior contact of interior contacts 209. In some embodiments, each electrode of electrodes 207 can be coupled (e.g., electrically coupled) to the at least one interior contact of interior contacts 209 by one or more electrically conductive runners (e.g., electrically conductive traces). In other embodiments, the conductive runner(s) can be omitted, such as, for example, when electrodes 207 are directly coupled (e.g., electrically coupled) to interior contacts 209.

In these or other embodiments, for each electrode of electrodes 207 that is sputtered, stamped, stenciled, or deposited over substrate 205, at least one interior contact of interior contacts 209 can be patterned and plated (e.g., electrolytic or electroless plated, etc.), sputtered, stamped, stenciled, or deposited (e.g., vapor deposited, screen-printed, inkjet printed, etc.) over substrate 205, and in some embodiments, at least one printed runner can be patterned and plated (e.g., electrolytic or electroless plated, etc.), sputtered, stamped, stenciled, or deposited (e.g., vapor deposited, screen-printed, inkjet printed, etc.) over substrate 205 and the printed runner(s) can couple the electrode of electrodes 207 to the interior contact(s) of interior contacts 209. In these or other embodiments, for each electrode of electrodes 207 that is sputtered, stamped, stenciled, or deposited over base element 102 (FIGS. 1 & 4-9), at least one interior contact of interior contacts 209 can be patterned and plated (e.g., electrolytic or electroless plated, etc.), sputtered, stamped, stenciled, or deposited (e.g., vapor deposited, screen-printed, inkjet printed, etc.) over base element 102 (FIGS. 1 & 4-9), and in some embodiments, at least one printed runner can be patterned and plated (e.g., electrolytic or electroless plated, etc.), sputtered, stamped, stenciled, or deposited (e.g., vapor deposited, screen-printed, inkjet printed, etc.) over base element 102 (FIGS. 1 & 4-9) and the printed runner(s) can couple the electrode of electrodes 207 to the interior contact(s) of interior contacts 209.

In further embodiments, the electrically conductive runner(s) can be configured to transport electrons but not materials. In some embodiments, the electrically conductive runner(s) can be implemented as a solid wire or ribbon. In these or other embodiments, the electrically conductive runner(s) can comprise one or more conductive runner materials. For example, the electrically conductive runner material(s) can comprise one or more electrically conductive material(s). Further, the electrically conductive runner material(s) can comprise a conductive ink (e.g., suspending the electrically conductive material(s)). In many embodiments, the conductive runner material(s) can comprise one or more metal and/or metal alloy materials (e.g., copper (Cu), chromium (Cr), nickel (Ni), gold (Au), titanium (Ti), tungsten (W), palladium (Pd), platinum (Pt), ruthenium (Ru), and/or iridium (Ir), etc.), carbon (C) (e.g., carbon that is non-porous and non-wettable with respect to the electrolyte element), and/or one or more electrically conductive polymer adhesives (e.g., one or more welded polymers, one or more pressure sensitive adhesives (PSA), or any suitable thermoset or ultraviolet (UV) cured electrically conductive adhesive or adhesives that are inert with respect to the electrode material(s) and/or the electrolyte material(s)).

In further embodiments, interior contacts 209 can comprise one or more interior contact materials. The interior contact material(s) can comprise one or more electrically conductive materials. For example, the interior contact material(s) can comprise one or more metal or metal alloy materials (e.g., copper (Cu), chromium (Cr), nickel (Ni), gold (Au), titanium (Ti), tungsten (W), palladium (Pd), platinum (Pt), ruthenium (Ru), and/or iridium (Ir), etc.) and/or carbon (C) (e.g., carbon that is non-porous and non-wettable with respect to the electrolyte element).

In many embodiments, interior contacts 209 can be coupled (e.g., electrically coupled) to exterior contacts 513 (FIG. 5). In these or other embodiments, interior contacts 209 can be coupled (e.g., electrically coupled) to exterior contacts 513 (FIG. 5) by signal communication lines 414 (FIG. 4).

In many embodiments, exterior contacts 513 (FIG. 5) can comprise multiple electrically conductive pads, multiple electrically conductive spheres (e.g., solder balls), multiple electrically conductive pins, multiple electrically conductive castellations, etc. Exterior contacts 513 (FIG. 5) can comprise any suitable shape (e.g., circular, rectangular, etc.). In many embodiments, exterior contacts 513 (FIG. 5) can be implemented in a ball grid array, a land grid array, or any other suitable type of array at one or more of the exterior lid surfaces of lid element 101 and/or one or more exterior base surfaces of base element 102 (FIGS. 1 & 4-9).

In further embodiments, exterior contacts 513 (FIG. 5) can comprise one or more exterior contact materials. The exterior contact material(s) can comprise one or more electrically conductive materials. For example, the exterior contact material(s) can comprise one or more metal materials (e.g., copper (Cu), chromium (Cr), nickel (Ni), gold (Au), titanium (Ti), tungsten (W), palladium (Pd), platinum (Pt), ruthenium (Ru), and/or iridium (Ir), etc.), carbon (C), and/or one or more ceramic materials.

Meanwhile, in many embodiments, signal communication lines 414 (FIG. 4) can be hollow (e.g., tubular) or filled (e.g., solid) signal communication lines, and can comprise one or more signal communication line materials. The signal communication line material(s) can comprises one or more electrically conductive materials. For example, the signal communication line material(s) can comprise one or more metal and/or metal alloy materials (e.g., copper (Cu), chromium (Cr), nickel (Ni), gold (Au), titanium (Ti), tungsten (W), palladium (Pd), platinum (Pt), ruthenium (Ru), and/or iridium (Ir), etc.) and/or carbon (C).

In many embodiments, signal communication lines 414 (FIG. 4) can pass from interior contacts 209 to exterior contacts 513 (FIG. 5) by way of signal communication channels 412 (FIG. 4). For example, signal communication lines 414 (FIG. 4) can run through signal communication channels 412 (FIG. 4). In many embodiments, signal communication channels 412 (FIG. 4) each can comprise a first end proximal to (e.g., at) sensor cavity 415 (FIG. 4) and a second end proximal to (e.g., at) an exterior lid surface of lid element 101 or an exterior surface of base element 102 (FIGS. 1 & 4-9), as applicable. Further, signal communication lines 414 (FIG. 4) can fill signal communication channels 412 (FIG. 4) and/or at least the first ends of signal channels 412 (FIG. 4) can be sealed to act as a barrier to material (e.g., the electrolyte element) escaping sensor cavity 415 (FIG. 4) through signal communication channels 412 (FIG. 4). For example, at least the first ends of signal channels 412 (FIG. 4) can be sealed with one or more sealants by weld, adhesive, gasket, etc. In some embodiments, when base element 102 is porous and at least the first ends of signal channels 412 (FIG. 4) are sealed with one or more sealants, the sealant(s) can embed into the pores of base element 102. Exemplary sealant(s) can comprise fluorinated ethylene propylene (FEP), perfluoroether polytetrafluoroethylene (PFA), liquid polyimide, polyimide and epoxy, high temperature epoxy, pressure sensitive adhesive (PSA), thermal set adhesive (TSA), silicone adhesive, etc. In some embodiments, at least part of signal channels 412 (FIG. 4) can be treated with chemicals to defluorinate the porous polytetrafluoroethylene (PTFE) at signal channels 412 (FIG. 4) so that the at least part of signal channels 412 (FIG. 4) become hydrophobic and allow the sealant material(s) to penetrate the at least part of signal channels 412 (FIG. 4).

In many embodiments, signal communication channels 412 (FIG. 4) can be formed in top element 101 and/or base element 102 (FIGS. 1 & 4-9). Signal communication channels 412 (FIG. 4) can be formed using any suitable semiconductor manufacturing techniques. For example, in many embodiments, top element 101 and/or base element 102 (FIGS. 1 & 4-9) can be masked and etched in order to form signal communication channels 412 (FIG. 4).

In these or other embodiments, signal communication channels 412 (FIG. 4) can comprise multiple vias formed in base element 102. In many embodiments, the vias can comprise multiple blind vias, and exterior contacts 513 (FIG. 5) can be coupled (e.g., electrically coupled) to signal communication lines 414 at the ends of signal communication channels 412 (FIG. 4) proximal to (e.g., at) the exterior lid surface(s) of lid element 101 and/or the exterior base surface(s) of base element 102 (FIGS. 1 & 4-9), as applicable. Meanwhile, in these or other embodiments, interior contacts 409 (FIG. 4) can be coupled (e.g., electrically coupled) to signal communication lines 414 (FIG. 4) at the ends of signal communication channels 412 (FIG. 4) proximal to (e.g., at) the interior lid surface(s) of lid element 101 and/or the interior base surface(s) of base element 102 (FIGS. 1 & 4-9), as applicable. Further, in some embodiments, the vias can be metalized in order to form signal communication lines 414 (FIG. 4).

In many embodiments, one or more signal communication channels of signal communication channels 412 (FIG. 4) can be linear. However, in these or other embodiments, one or more signal communication channels of signal communication channels 412 (FIG. 4) can be tortuous (e.g., curved, stepped, etc.). Implementing a signal communication channels of signal communication channels 412 (FIG. 4) with a tortuous configuration can help to mitigate or prevent material (e.g., the electrolyte element) from escaping sensor cavity 415 (FIG. 4) through the signal communication channel of signal communication channels 412 (FIG. 4). Further, in some embodiments, one or more signal communication channels of signal communication channels 412 (FIG. 4) can be single layered, and in these or other embodiments, one or more signal communication channels of signal communication channels 412 (FIG. 4) can be multiple layered.

In many embodiments, signal communication channels 412 (FIG. 4) can comprise any suitable cross-sectional shape (e.g., circular, rectangular, etc.). In some embodiments, the cross-sectional shape of signal communication channels 412 (FIG. 4) can be the same or different from the shapes of interior contacts 209 and/or exterior contacts 513 (FIG. 5). Further, signal communication channels 412 (FIG. 4) can comprise a largest dimension (e.g., diameter). The largest dimension of signal communication channels 412 (FIG. 4) can be greater than or equal to approximately 0.200 millimeters and less than or equal to approximately 1.800 millimeters. For example, the largest dimension of signal communication channels 412 (FIG. 4) can be approximately 0.250 millimeters, approximately 0.500 millimeters, approximately 0.750 millimeters, approximately 1.000 millimeters, approximately 1.250 millimeters, or approximately 1.500 millimeters. In further embodiments, the largest dimension of signal communication channels 412 (FIG. 4) can be the same or different from (e.g., larger or smaller than) the largest dimension (e.g., diameter) of interior contacts 209 and/or exterior contacts 513 (FIG. 5).

In some embodiments, signal communication channels 412 (FIG. 4) can be coated with a channel coating. The channel coating can comprise one or more channel coating materials. In these embodiments, the channel coating material(s) can comprise one or more electrically conductive and/or electrically non-conductive materials. In further embodiments, the channel coating material(s) can comprise one or more metal materials, one or more ceramic materials, and/or one or more polymer materials. Exemplary channel coating material(s) can comprise polytetrafluoroethylene (PTFE).

In some embodiments, one or more interior contacts of interior contacts 209 can be selectively coupled (e.g., electrically coupled) to one or more exterior contacts of exterior contacts 513 (FIG. 5) by coupling lid element 101 to base element 102 (FIGS. 1 & 4-9). In these or other embodiments, one or more interior contacts of interior contacts 209 can be permanently coupled (e.g., electrically coupled) to one or more exterior contacts of exterior contacts 513 (FIG. 5).

In many embodiments, exterior contacts 209 can be coupled (e.g., electrically coupled) to one or more electronic components (e.g., a micro-controller, a current to voltage convertor, a potentiostat, an amperostat, a current mirror, a galvanic sensor operation and circuit, etc.), thereby coupling (e.g., electrically coupling) electrochemical sensor 100 (FIGS. 1 & 6-9) to the electronic component(s). In these or other embodiments, exterior contacts 209 can be operable to form one or more electric circuits with the electronic component(s) so that electric current generated by electrochemical sensor 100 (FIGS. 1 & 6-9) when one or more electrodes of electrodes 207 react with an analyte can be provided to the electronic component(s). For example, as discussed above, electrodes 207 can be coupled (e.g., electrically coupled) to interior contacts 209 (e.g., by the printed runner(s)) and interior contacts 209 can be coupled (e.g., electrically coupled) to exterior contacts 513 of FIG. 5 (e.g., by signal communication lines 414 (FIG. 4)). Accordingly, in many embodiments, when electrodes 207 are coupled (e.g., electrically coupled) to interior contacts 209 and when interior contacts 209 are coupled (e.g., electrically coupled) to exterior contacts 513 (FIG. 5), electric current can run from a first electrode (e.g., a working electrode) of electrodes 207 to a first interior contact of interior contacts 209 and then to a first exterior contact of exterior contacts 513 (FIG. 5). Then, the electric current can pass through the at least one electronic component of the electronic component(s) to a second exterior contact of exterior contacts 513 (FIG. 4) on to a second interior contact of interior contacts 209 and further on to a second electrode (e.g., a counter electrode) of electrodes 207. In many embodiments, the electric current can be read, and in some embodiments, measured by one or more of the electronic component(s).

In some embodiments, electrochemical sensor 100 (FIGS. 1 & 6-9) can be integrated with one or more of the electronic component(s) as part of an integrated circuit (e.g., an application-specific integrated circuit (ASIC)) and/or as part of a printed circuit board. Further, in many embodiments, electrochemical sensor 100 (FIGS. 1 & 6-9) can be integrated in one or more products and/or one or more installations. In these or other embodiments, the product(s) can comprise the electronic component(s), the printed circuit board, and/or the integrated circuit. Exemplary product(s) can comprise one or more one or more automobiles, one or more traffic signals, one or more signs, one or more apparel items (e.g., one or more articles of clothing, one or more items of jewelry, one or more mobile electronic devices (e.g., one or more smartphones, one or more tablet computers, one or more laptop computers, etc.), one or more airplanes, one or more safety devices, one or more medical devices, one or more astronautic devices, etc. Meanwhile, exemplary installation(s) can comprise one or more roads, one or more bridges, one or more homes, one or more theaters, one or more hospitals, etc.

In many embodiments, electrochemical sensor 100 (FIGS. 1 & 6-9) can be scalable to sizes (e.g., smaller sized) not reached by previous technologies and can be operable over broad temperature ranges. Further, electrochemical sensor 100 (FIGS. 1 & 6-9) can be operable in environments having a wide range of relative humidities and have a scalable, optimized signal to noise ratio that can be used to detect low or high levels of an analyte (e.g., target gas).

Figure 20:
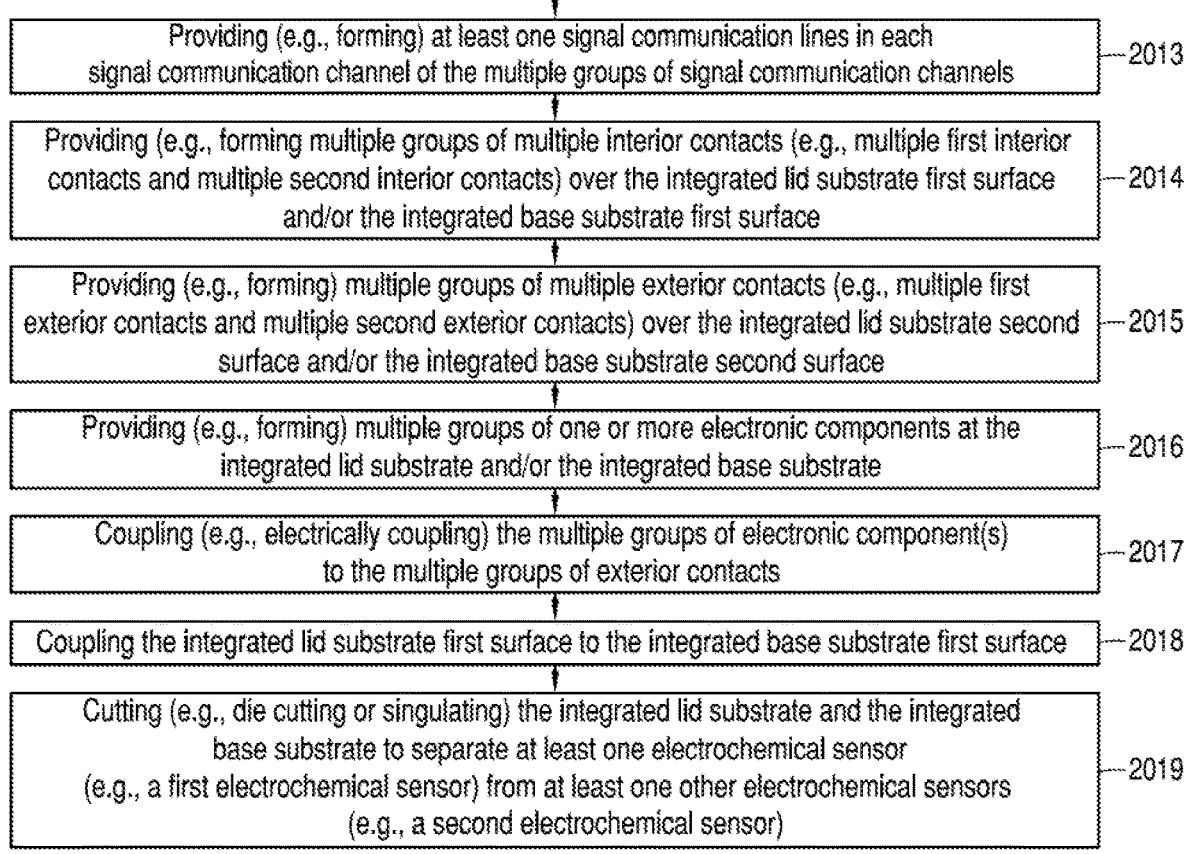
FIGS. 20A & 20B illustrate a flow chart for a method, according to an embodiment.
Figure 21:
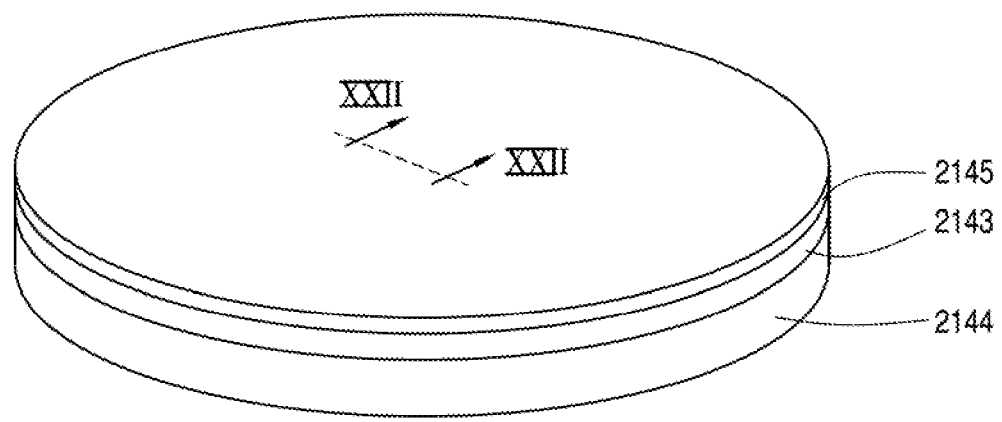
FIG. 21 illustrates an isometric view of an integrated lid substrate of a system coupled to an integrated base substrate of the system, and an integrated barrier layer of the system coupled to the integrated lid substrate, according to an embodiment.

Meanwhile, electrochemical sensor 100 (FIGS. 1 & 6-9) can be produced at low cost due to the ability to scale production of electrochemical sensor 100 (FIGS. 1 & 6-9). In these embodiments, electrochemical sensor 100 (FIGS. 1 & 6-9) can be manufactured in a group with one or more other electrochemical sensors. The other electrochemical sensor(s) can be similar or identical to electrochemical sensor 100 (FIGS. 1 & 6-9). For example, in many embodiments, electrochemical sensor 100 (FIGS. 1 & 6-9) can be manufactured (e.g., fabricated) using semiconductor wafer manufacturing techniques and equipment. In some embodiments, electrochemical sensor 100 (FIGS. 1 & 6-9) can be manufactured (e.g., fabricated) using conventional semiconductor manufacturing equipment (e.g., handling equipment, etc.). Accordingly, in these embodiments, electrochemical sensor 100 (FIGS. 1 & 6-9) may be provided (e.g., manufactured) without requiring investment in specialized semiconductor manufacturing equipment (e.g., handling equipment, etc.). Group manufacturing of the electrochemical sensors is discussed in greater detail below with respect to method 2000 (FIGS. 20A & 20B) and system 2100 (FIG. 21).

Figure 10:
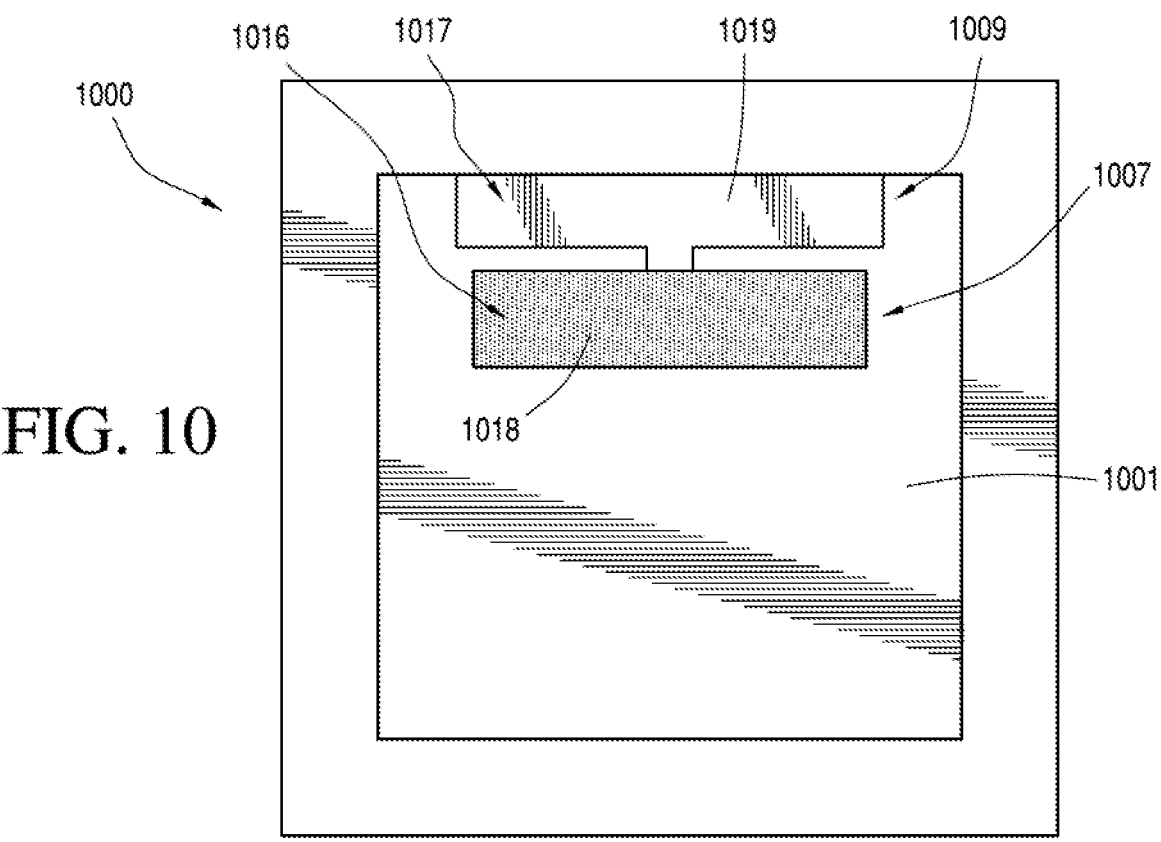
FIG. 10 illustrates a bottom view of a lid element of an electrochemical sensor, according to an embodiment.
Figure 11:
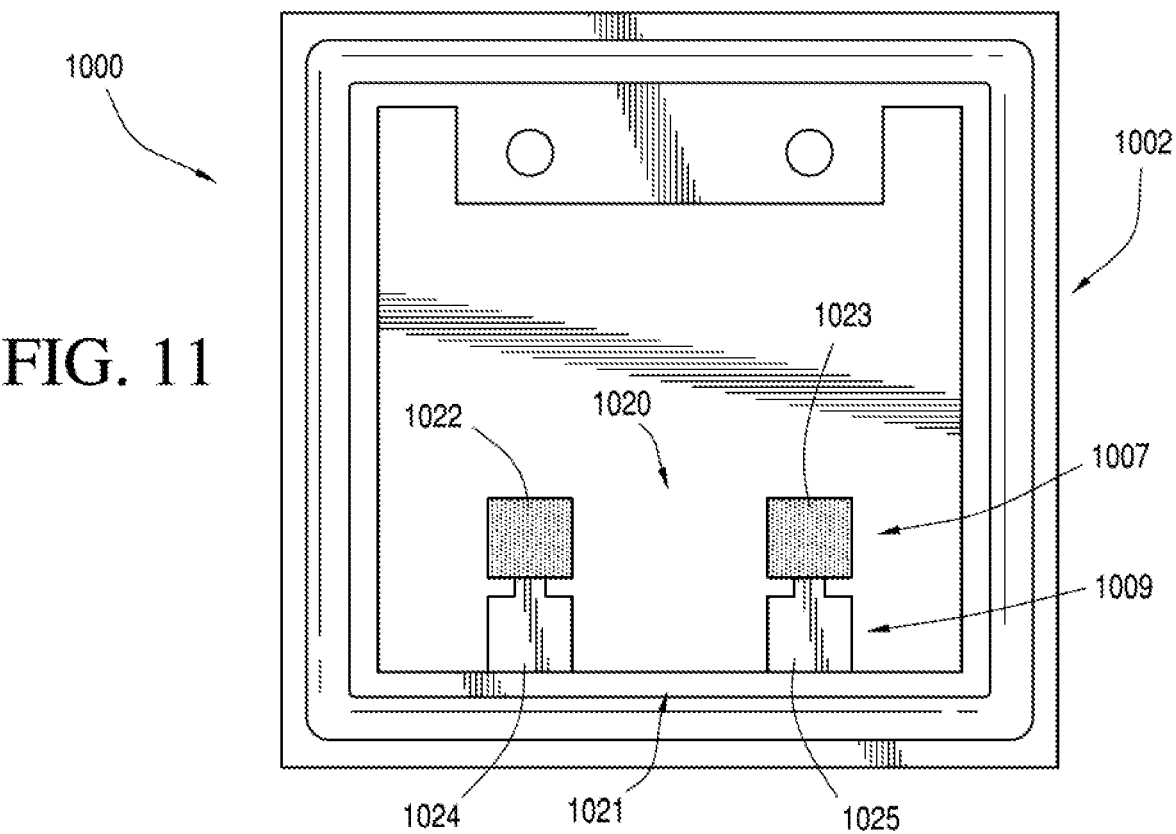
FIG. 11 illustrates a top view of a base element of the electrochemical sensor, according to the embodiment of FIG. 10.

Turning ahead in the drawings, FIG. 10 illustrates a bottom view of a lid element 1001 of an electrochemical sensor 1000, according to an embodiment; and FIG. 11 illustrates a top view of a base element 1002 of the electrochemical sensor 1000, according to the embodiment of FIG. 10. Electrochemical sensor 1000 can be similar or identical to electrochemical sensor 100 (FIGS. 1 & 6-9); lid element 1001 can be similar or identical to lid element 101 (FIGS. 1-3 & 6-9); and/or base element 1002 can be similar or identical to base element 102 (FIGS. 1 & 4-9). Further, in many embodiments, electrochemical sensor 1000 can comprise multiple electrodes 1007 and multiple interior contacts 1009 coupled (e.g., electrically coupled) to electrodes 1007. Electrodes 1007 can be similar or identical to electrodes 207 (FIG. 2), and/or interior contacts 1009 can be similar or identical to interior contacts 209 (FIG. 2).

Referring to FIG. 10, multiple electrodes 1007 can comprise at least one lid electrode 1016, and interior contacts 1009 can comprises at least one lid interior contact 1017 coupled to lid electrode(s) 1016. For example, lid electrode(s) 1016 can comprise a first lid electrode 1018, and lid interior contact(s) 1017 can comprise a first lid interior contact 1019. In these embodiments, first lid electrode 1018 can be similar or identical to first lid electrode 318 (FIG. 3). In many embodiments, lid element 1001 can comprise lid electrode(s) 1016 (e.g., first lid electrode 1018) and lid interior contact(s) 1017 (e.g., first lid interior contact 1019).

Referring to FIG. 11, multiple electrodes 1007 can comprise at least one base electrode 1020, and interior contacts 1009 can comprise at least one base interior contact 1021 coupled to base electrode(s) 1020. For example, base electrode(s) 1020 can comprise a first base electrode 1022 and a second base electrode 1023, and base interior contact(s) 1021 can comprise a first base interior contact 1024 and a second base interior contact 1025. In these embodiments, first base electrode 1022 can be similar or identical to second electrode 322 (FIG. 3) and/or second dbase electrode 1023 can be similar or identical to third electrode 323 (FIG. 3). In many embodiments, base element 1002 can comprise base electrode(s) 1020 (e.g., first base electrode 1022 and second base electrode 1023) and base interior contact(s) 1021 (e.g., first base interior contact 1024 and second base interior contact 1025).

Figure 12:
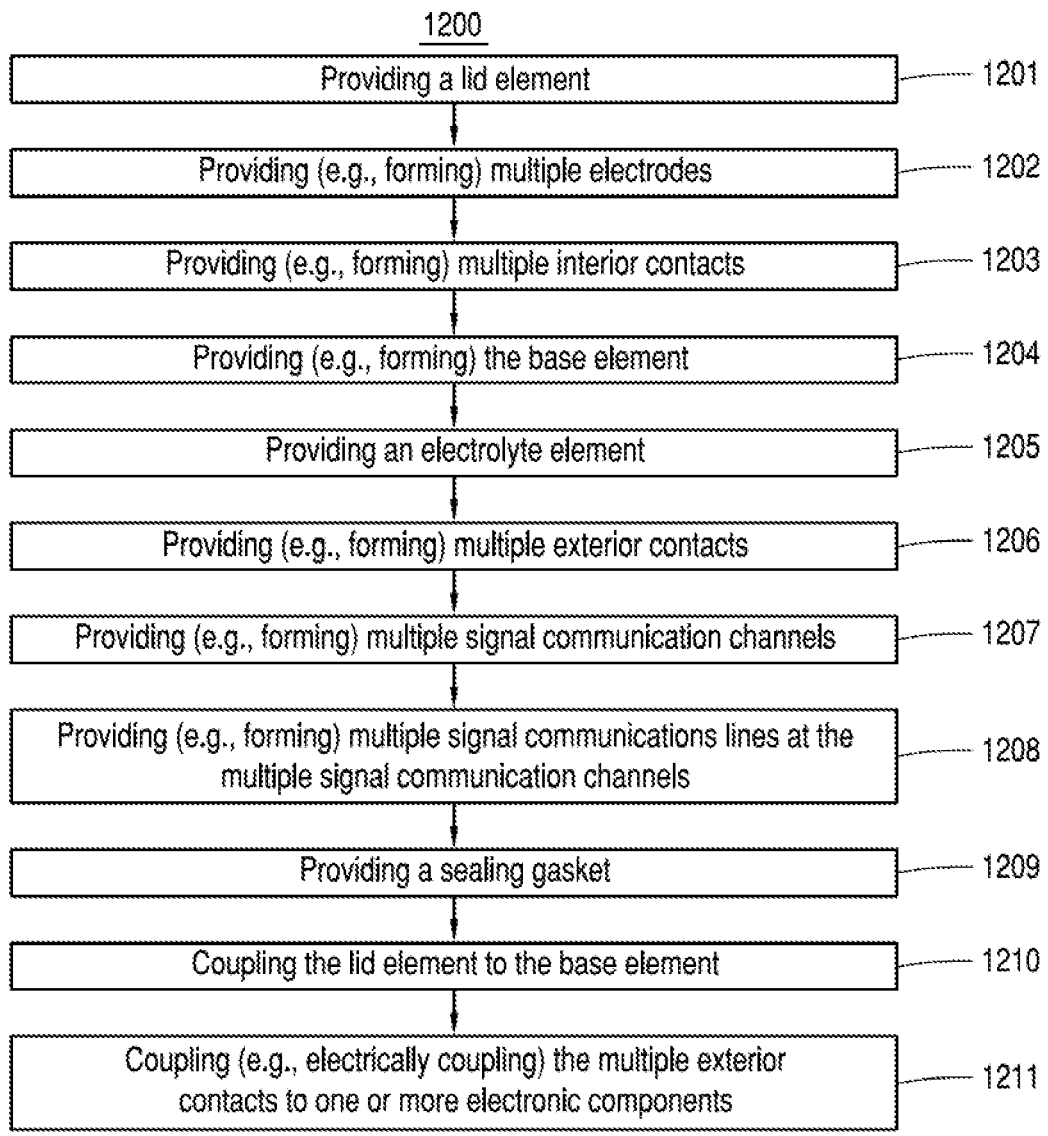
FIG. 12 illustrates a flow chart for a method, according to an embodiment.

Turning ahead again in the drawings, FIG. 12 illustrates a flow chart for a method 1200, according to an embodiment. In some embodiments, method 1200 can comprise a method of providing (e.g., manufacturing) an electrochemical sensor. The electrochemical sensor can be similar or identical to electrochemical sensor 100 (FIGS. 1 & 6-9) and/or electrochemical sensor 1000 (FIGS. 10 & 11). Method 1200 is merely exemplary and is not limited to the embodiments presented herein. Method 1200 can be employed in many different embodiments or examples not specifically depicted or described herein. In some embodiments, the activities of method 1200 can be performed in the order presented. In other embodiments, the activities of method 1200 can be performed in any suitable order. In still other embodiments, one or more of the activities of method 1200 can be combined or skipped.

Figure 13:
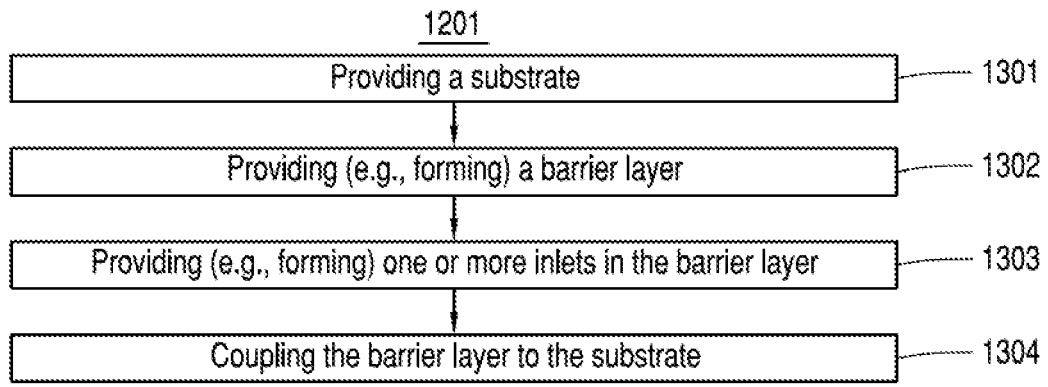
FIG. 13 illustrates an exemplary activity of providing a lid element, according to the embodiment of FIG. 12.

In many embodiments, method 1200 can comprise activity 1201 of providing a lid element. The lid element can be similar or identical to lid element 101 (FIGS. 1-3 & 6-9) and/or lid element 1001 (FIG. 10). In further embodiments, performing activity 1201 can be similar or identical to providing a lid element as described above with respect to electrochemical sensor 100 (FIGS. 1 & 6-9). FIG. 13 illustrates an exemplary activity 1201, according to the embodiment of FIG. 12.

For example, in many embodiments, activity 1201 can comprise activity 1301 of providing a substrate. The substrate can be similar or identical to substrate 205 (FIG. 2).

In some embodiments, activity 1201 can comprise activity 1302 of providing (e.g., forming) a barrier layer. The barrier layer can be similar or identical to barrier layer 204 (FIG. 2). In further embodiments, performing activity 1302 can be similar or identical to providing a barrier layer as described above with respect to electrochemical sensor 100 (FIGS. 1 & 6-9). In some embodiments, activity 1302 can be omitted.

In further embodiments, activity 1201 can comprise activity 1303 of providing (e.g., forming) one or more inlets in the barrier layer. The inlet(s) can be similar or identical to inlet(s) 103 (FIG. 1). In various embodiments, performing activity 1303 can be similar or identical to providing one or more inlets in the barrier layer as described above with respect to electrochemical sensor 100 (FIGS. 1 & 6-9). In some embodiments, activity 1303 can be performed as part of activity 1302. In other embodiments, activity 1303 can be omitted, such as, for example, when activity 1302 is omitted.

In further embodiments, activity 1201 can comprise activity 1304 of coupling the barrier layer to the substrate. In various embodiments, performing activity 1304 can be similar or identical to coupling the barrier layer to the substrate as described above with respect to electrochemical sensor 100 (FIGS. 1 & 6-9). In some embodiments, activity 1303 can be performed as part of activity 1302. In other embodiments, activity 1303 can be omitted, such as, for example, when activity 1302 is omitted.

Figure 14:
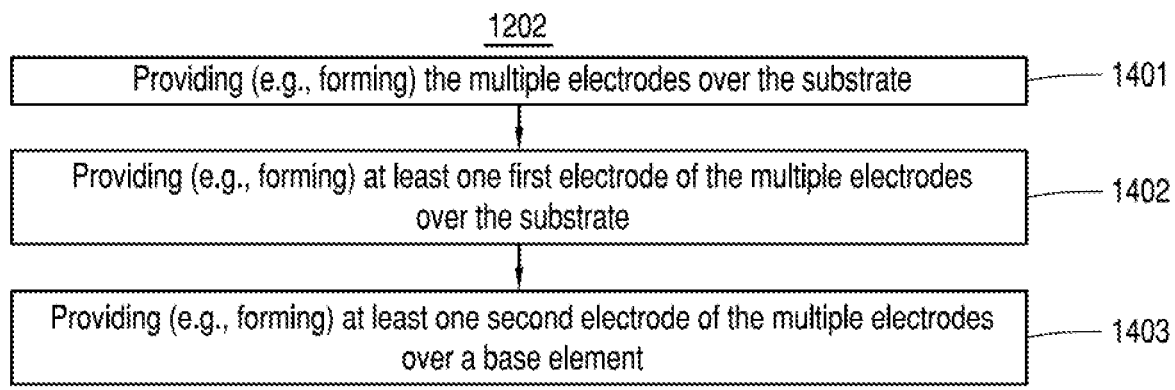
FIG. 14 illustrates an exemplary activity of providing (e.g., forming) multiple electrodes, according to the embodiment of FIG. 12.

Referring back to FIG. 12, in many embodiments, method 1200 can comprise activity 1202 of providing (e.g., forming) multiple electrodes. The electrodes can be similar or identical to electrodes 207 (FIG. 2) and/or electrodes 1007 (FIGS. 10 & 11). FIG. 14 illustrates an exemplary activity 1202, according to the embodiment of FIG. 12.

For example, in some embodiments, activity 1202 can comprise activity 1401 of providing (e.g., forming) the multiple electrodes over the substrate. In further embodiments, performing activity 1401 can be similar or identical to providing the multiple electrodes over the substrate as described above with respect to electrochemical sensor 100 (FIGS. 1 & 6-9). In many embodiments, activity 1401 can be performed after at least part of activity 1201.

In other embodiments, activity 1202 can comprise activity 1402 of providing (e.g., forming) at least one first electrode of the multiple electrodes over the substrate. In further embodiments, performing activity 1402 can be similar or identical providing to at least one first electrode of the multiple electrodes over the substrate as described above with respect to electrochemical sensor 100 (FIGS. 1 & 6-9). In some embodiments, activity 1402 can be omitted, such as, for example, when activity 1401 is performed, and vice versa. In many embodiments, activity 1401 can be performed after at least part of activity 1201.

Meanwhile, in these or other embodiments, activity 1202 can comprise activity 1403 of providing (e.g., forming) at least one second electrode of the multiple electrodes over a base element. The base element can be similar or identical to base element 102 (FIGS. 1 & 4-9) and/or base element 1102 (FIG. 11). In further embodiments, performing activity 1403 can be similar or identical to providing at least one second electrode of the multiple electrodes over a base element as described above with respect to electrochemical sensor 100 (FIGS. 1 & 6-9). In some embodiments, activity 1403 can be omitted, such as, for example, when activity 1401 is performed, and vice versa. In many embodiments, activity 1403 can be performed after at least part of activity 1204.

Figure 15:
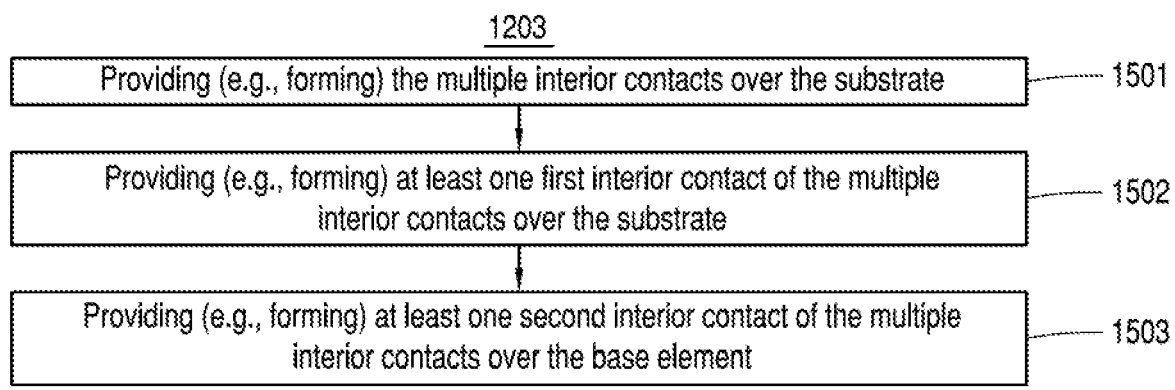
FIG. 15 illustrates an exemplary activity of providing (e.g., forming) multiple interior contacts, according to the embodiment of FIG. 12.

Referring back to FIG. 12, in many embodiments, method 1200 can comprise activity 1203 of providing (e.g., forming) multiple interior contacts. The interior contacts can be similar or identical to interior contacts 209 (FIG. 2). In some embodiments, performing activity 1203 can be similar or identical to providing multiple interior contacts as described above with respect to electrochemical sensor 100 (FIGS. 1 & 6-9). In some embodiments, at least portions of activities 1202 and 1203 can be performed simultaneously with each other. FIG. 15 illustrates an exemplary activity 1203, according to the embodiment of FIG. 12.

For example, in some embodiments, activity 1203 can comprise activity 1501 of providing (e.g., forming) the multiple interior contacts over the substrate. In further embodiments, performing activity 1501 can be similar or identical to providing the multiple interior contacts over the substrate as described above with respect to electrochemical sensor 100 (FIGS. 1 & 6-9). In many embodiments, activity 1501 can be performed after at least part of activity 1201.

In other embodiments, activity 1203 can comprise activity 1502 of providing (e.g., forming) at least one first interior contact of the multiple interior contacts over the substrate. In further embodiments, performing activity 1502 can be similar or identical providing at least one first interior contact of the multiple interior contacts over the substrate as described above with respect to electrochemical sensor 100 (FIGS. 1 & 6-9). In some embodiments, activity 1502 can be omitted, such as, for example, when activity 1501 is performed, and vice versa. In many embodiments, activity 1501 can be performed after at least part of activity 1201.

Meanwhile, in these or other embodiments, activity 1203 can comprise activity 1503 of providing (e.g., forming) at least one second interior contact of the multiple interior contacts over the base element. In further embodiments, performing activity 1503 can be similar or identical to providing at least one second interior contact of the multiple interior contacts over the base element as described above with respect to electrochemical sensor 100 (FIGS. 1 & 6-9). In some embodiments, activity 1503 can be omitted, such as, for example, when activity 1501 is performed, and vice versa. In many embodiments, activity 1503 can be performed after at least part of activity 1204.

Referring again back to FIG. 12, in many embodiments, method 1200 can comprise activity 1204 of providing the base element. In some embodiments, performing activity 1204 can be similar or identical to providing the base element as described above with respect to electrochemical sensor 100 (FIGS. 1 & 6-9). For example, in many embodiments, activity 1204 can comprise an activity of providing (e.g., forming) a sensor cavity. The sensor cavity can be similar or identical to sensor cavity 415 (FIG. 4).

In many embodiments, method 1200 can comprise activity 1205 of providing (e.g., forming) multiple exterior contacts (e.g., at an exterior surface of the base element). The exterior contacts can be similar or identical to exterior contacts 513 (FIG. 5). In some embodiments, performing activity 1205 can be similar or identical to providing multiple exterior contacts as described above with respect to electrochemical sensor 100 (FIGS. 1 & 6-9).

In many embodiments, method 1200 can comprise activity 1206 of providing (e.g., forming) multiple signal communication (e.g., at the base element). The signal communication channels can be similar or identical to signal communication channels 412 (FIG. 4). In some embodiments, performing activity 1206 can be similar or identical to providing multiple signal communication channels at the base element as described above with respect to electrochemical sensor 100 (FIGS. 1 & 6-9). In many embodiments, activity 1206 can be performed before activity 1205.

In many, method 1200 can comprise activity 1207 of providing (e.g., forming) multiple signal communications lines at the multiple signal communication channels. The signal communication lines can be similar or identical to signal communication lines 414 (FIG. 4). In some embodiments, performing activity 1207 can be similar or identical to providing multiple signal communications lines at the multiple signal communication channels as described above with respect to electrochemical sensor 100 (FIGS. 1 & 6-9). In many embodiments, activity 1207 can be performed before activity 1205 and/or after activity 1206.

In many embodiments, method 1200 can comprise activity 1208 of providing an electrolyte element (e.g., located in the sensor cavity). The electrolyte element can be similar or identical to the electrolyte element described above with respect to electrochemical sensor 100 (FIGS. 1 & 6-9). In some embodiments, activity 1208 can be performed after activity 1204. In other embodiments, activities 1207 and 1208 can be performed simultaneously with each other in a manner similar to semiconductor manufacturing techniques used to build multi-level metal interconnect structures for computer chips.

In many embodiments, method 1200 can comprise activity 1209 of providing a sealing gasket. The sealing gasket can be similar or identical to sealing gasket 442 (FIG. 4). In some embodiments, activity 1209 can be omitted.

In many embodiments, method 1200 can comprise activity 1210 of coupling the lid element to the base element. In some embodiments, activity 1209 can be part of activity 1210.

In many embodiments, method 1200 can comprise activity 1211 of coupling (e.g., electrically coupling) the multiple exterior contacts to one or more electronic components. The electronic component(s) can be similar or identical to the electronic component(s) described above with respect to electrochemical sensor 100 (FIGS. 1 & 6-9). In many embodiments, activity 1211 can be performed after activities 1201-1210. In other embodiments, activity 1211 can be performed approximately simultaneously with one or more of activities 1201-1210.

Figure 16:
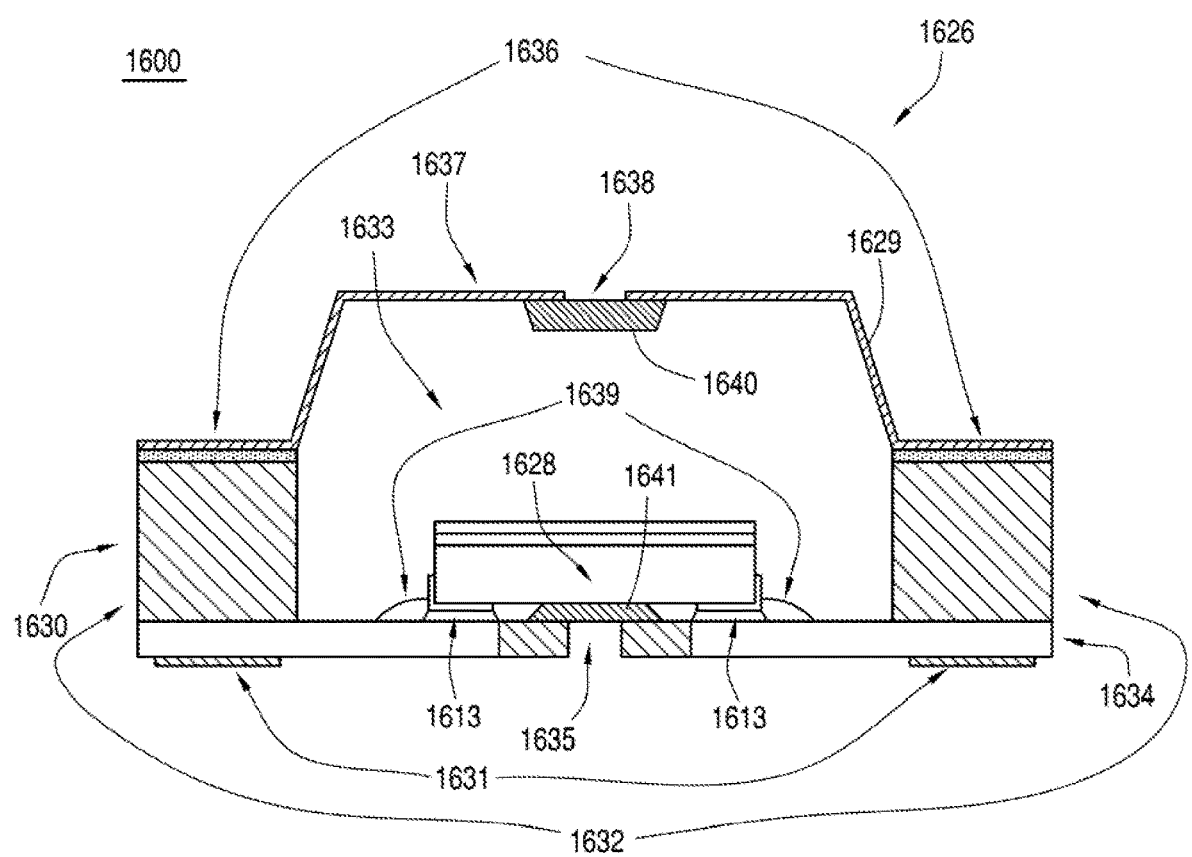
FIG. 16 illustrates a cross-sectional side view of a system, according to an embodiment.

Turning ahead in the drawings, FIG. 16 illustrates a cross-sectional side view of a system 1600, according to an embodiment. System 1600 is merely exemplary and embodiments of the system are not limited to the embodiments presented herein. System 1600 can be employed in many different embodiments or examples not specifically depicted or described herein. In some embodiments, certain elements or modules of system 1600 can perform various methods and/or activities of those methods. In these or other embodiments, the methods and/or the activities of the methods can be performed by other suitable elements or modules of system 1600.

System 1600 comprises a packaging structure 1626. As described in greater detail below, in many embodiments, packaging structure 1626 can be operable to package electrochemical sensor 1628. In these or other embodiments, electrochemical sensor 1628 can be similar or identical to electrochemical sensor 100 (FIGS. 1 & 6-9) and/or electrochemical sensor 1000 (FIGS. 10 & 11).

In many embodiments, packaging structure 1626 comprises a lid structure 1629 and a base structure 1630. In some embodiments, packaging structure 1626 can comprise multiple packaging contacts 1631, and in further embodiments, also can comprise multiple packaging electrical connectors 1639. In other embodiments, packaging contacts 1631 and/or packaging electrical connectors 1639 can be omitted.

Further, in many embodiments, base structure 1630 can comprise an enclosure body 1632 and a package cavity 1633. In further embodiments, base structure 1630 can comprise an interconnect substrate 1634.

In further embodiments, base structure 1630 and/or enclosure body 1632 can comprise one or more base structure inlets 1635 and/or one or more base structure filters 1641. In other embodiments, though not illustrated in FIG. 16, base structure 1630 and/or enclosure body 1632 can be devoid of base structure inlet(s) 1635 and/or one or more of base structure filters 1641.

In further embodiments, base structure 1630 and/or interconnect substrate 1634 can comprise at least one packaging contact of packaging contacts 1631. In further embodiments, base structure 1630 and/or interconnect substrate 1634 can comprise multiple or all of packaging contacts 1631. In other embodiments, though not illustrated in FIG. 16, base structure 1630 and/or interconnect substrate 1634 can be devoid of packaging contacts 1631.

In further embodiments, lid structure 1629 can comprise a bonding portion 1636. In some embodiments, lid structure 1629 can comprise a projected portion 1637, one or more lid structure inlets 1638, and/or one or more lid structure filters 1640. In other embodiments, though not illustrated in FIG. 16, lid structure 1629 can be devoid of projected portion 1637, lid structure inlet(s) 1638, and/or one or more of lid structure filter(s) 1640.

In further embodiments, though not illustrated in FIG. 16, lid structure 1629 can comprise at least one packaging contact of packaging contacts 1631. In still further embodiments, though not illustrated in FIG. 16, lid structure 1629 can comprise multiple or all of packaging contacts 1631. In other embodiments, though not illustrated in FIG. 16, lid structure 1629 can be devoid of packaging contacts 1631.

In some embodiments, system 1600 can comprise electrochemical sensor 1628. In other embodiments, electrochemical sensor 1628 can be omitted.

As provided above, electrochemical sensor 1628 can be similar or identical to electrochemical sensor 100 (FIGS. 1 & 6-9) and/or electrochemical sensor 1000 (FIGS. 10 & 11). Accordingly, electrochemical sensor 1628 can comprise multiple exterior contacts 1613, and exterior contacts 1613 can be similar or identical to exterior contacts 513 (FIG. 5).

Packaging structure 1626 can comprise any suitable form (e.g., shape) and/or dimensions. Exemplary shapes of packaging structure 1626 can comprise a rectangular prism, cylinder, a triangular prism, a sphere, a hexagonal prism, an octagonal prism, etc. In many embodiments, packaging structure 1626 can comprises a largest dimension of greater than or equal to approximately 2.00 millimeters and less than or equal to approximately 20.0 millimeters. For example, packaging structure 1626 can comprises a largest dimension of approximately 2.00 millimeters, approximately millimeters, approximately 5.00 millimeters, approximately 10.0 millimeters, approximately 15.0 millimeters, or approximately 20.0 millimeters.

In many embodiments, base structure 1630 can be operable to receive electrochemical sensor 1628. Meanwhile, lid structure 1629 can be coupled to base structure 1630 after base structure 1630 receives electrochemical sensor 1628 so that packaging structure 1626, lid structure 1629, and/or base structure 1630 can operate to package electrochemical sensor 1628. In these or other embodiments, when base structure 1630 has received electrochemical sensor 1628 and when lid structure 1629 is coupled to base structure 1630, packaging structure 1626, lid structure 1629, and/or base structure 1630 can protect electrochemical sensor 1628, such as, for example, from impact and/or corrosion. Further, in some embodiments, when base structure 1630 receives electrochemical sensor 1628 and when lid structure 1629 is coupled to base structure 1630, packaging structure 1626, lid structure 1629, and/or base structure 1630 can dissipate and/or regulate heat generated by electrochemical sensor 1628. In these or other embodiments, electrochemical sensor 1628 can refer to a die of packaging structure 1626.

In these or other embodiments, packaging contacts 1631 can be coupled (e.g., electrically coupled) to exterior contacts 1613 of electrochemical sensor 1628 (e.g., via interconnect substrate 1634). In many embodiments, packaging contacts 1631 can be coupled (e.g., electrically coupled) to exterior contacts 1613 of electrochemical sensor 1628 when electrochemical sensor 1628 is received at base structure 1630, and in some embodiments, when lid structure 1629 is coupled to base structure 1630. Packaging contacts 1631 can comprise one or more packaging contact materials. The packaging contact material(s) can comprise one or more electrically conductive materials. Exemplary packaging contact material(s) can comprise one or more metal and/or metal alloy materials (e.g., copper (Cu), chromium (Cr), nickel (Ni), gold (Au), titanium (Ti), tungsten (W), palladium (Pd), platinum (Pt), ruthenium (Ru), and/or iridium (Ir), etc.) and/or carbon (C).

Further, as similarly discussed above with respect to electrochemical sensor 100 (FIG. 1) and exterior contacts 513 (FIG. 5), packaging contacts 1631 can be coupled (e.g., electrically coupled) to one or more electronic components (e.g., a micro-controller, a current to voltage convertor, a potentiostat, an amperostat, a current mirror, a galvanic sensor operation and circuit, etc.), thereby coupling (e.g., electrically coupling) exterior contacts 1613 and electrochemical sensor 1600 to the electronic component(s). In these or other embodiments, exterior contacts 1613 and packaging contacts 1631 can be operable to form one or more electric circuits with the electronic component(s) so that electrical signals generated by electrochemical sensor 1600 can be provided to the electronic component(s). In other words, packaging contacts 1631 can be operable to electrically couple electrochemical sensor 1600 to the electronic component(s).

In some embodiments, packaging contacts 1631 can be coupled (e.g., electrically coupled) to exterior contacts 1613 by packaging electrical connectors 1639. Packaging electrical connectors 1639 can comprise any suitable wired interconnects (e.g., wire bonds, ribbon cables, flex circuits, epoxy bridges, electrically conductive threads, etc.). Further, packaging electrical connectors 1639 can comprise one or more packaging electrical connector materials. The packaging electrical connector material(s) can comprise one or more electrically conductive materials. Exemplary electrical connector material(s) can comprise aluminum, copper, silver, gold, and/or electrically conductive epoxy, etc.

For example, although not shown in FIG. 16, in some embodiments, when a lid element of electrochemical sensor 1628 comprises at least one exterior contact of exterior contacts 1613, and when exterior contacts 1613 are coupled (e.g., electrically coupled) to packaging contacts 1631 by packaging electrical connectors 1639, one or more packaging electrical connectors of packaging electrical connectors 1639 can be coupled (e.g., electrically coupled) to the exterior contact(s) of exterior contacts 1613 being part of the lid element of electrochemical sensor 1628 and coupled (e.g., electrically coupled) to interconnect substrate 1634 in order to couple (e.g., electrically couple) the exterior contact(s) of exterior contacts 1613 being part of the lid element of electrochemical sensor 1628 to one or more packaging contacts of packaging electrical connectors 1639. Accordingly, these packaging electrical connectors 1639 can be bonded to the exterior contact(s) of exterior contacts 1613 being part of the lid element of electrochemical sensor 1628 and to interconnect substrate 1634. In these embodiments, exterior contacts 1613 and the inlet(s) of electrochemical sensor 1628 can be at the lid element of electrochemical sensor 1628.

Meanwhile, in these or other embodiments, packaging contacts 1631 can be bonded to exterior contacts 1613 by one or more bonding materials. In some embodiments, the bonding material(s) can comprise one or more electrically conductive bonding materials. Exemplary electrically conductive bonding material(s) can comprise electrically conductive epoxy, carbon nanotubes, solder, etc.

In these or other embodiments, packaging contacts 1631 can be coupled (e.g., electrically coupled) to exterior contacts 1613 by the electrically conductive bonding material(s). In some embodiments, when packaging contacts 1631 are coupled (e.g., electrically coupled) to exterior contacts 1613 by the electrically conductive bonding material(s), packaging electrical connectors 1639 can be omitted. In other embodiments, when packaging contacts 1631 are coupled (e.g., electrically coupled) to exterior contacts 1613 by packaging electrical connectors 1639, the bonding material(s) can be devoid of electrically conductive bonding material(s) and/or packaging contacts 1631 can lack bonding with exterior contacts 1613.

In many embodiments, interconnect substrate 1634 can comprise a lead frame, a ceramic substrate, a printed circuit board, or any other suitable packaging substrate. Interconnect substrate 1634 can comprise one or more interconnect substrate materials. The interconnect substrate material(s) can comprise one or more metal and/or metal alloy materials (e.g., copper (Cu), chromium (Cr), nickel (Ni), gold (Au), titanium (Ti), tungsten (W), palladium (Pd), platinum (Pt), ruthenium (Ru), and/or iridium (Ir), etc.), one or more ceramic materials, and/or one or more polymer materials.

In some embodiments, when interconnect substrate 1634 comprises a lead frame, the lead frame can be formed by etching or stamping a flat plate of the interconnect substrate material(s) to form the lead frame. In these or other embodiments, the interconnect substrate material(s) can comprise copper or copper-alloy.

In many embodiments, enclosure body 1632 can be provided (e.g., formed) over interconnect substrate 1634 in any suitable manner. For example, in some embodiments, enclosure body 1632 can be deposited over interconnect substrate 1634. In other embodiments, enclosure body 1632 can be preformed (e.g., premolded) and placed over and coupled to interconnect substrate 1634. Enclosure body 1632 can comprise one or more enclosure body materials. Exemplary body material(s) can comprise epoxy molding compound, liquid crystal polymer, and/or one or more equivalent materials.

In some embodiments, package cavity 1633 can be provided (e.g., formed) in enclosure body 1632. For example, in various embodiments, after enclosure body 1632 is provided, enclosure body 1632 can be masked and etched to provide (e.g., form) package cavity 1633 in enclosure body 1632. In other embodiments, enclosure body 1632 can be provided (e.g., formed) such that enclosure body 1632 comprises package cavity 1633.

In some embodiments, base structure 1630 can be configured to receive electrochemical sensor 1628 at package cavity 1633. In these or other embodiments, electrochemical sensor 1628 can be coupled (e.g., bonded) to enclosure body 1632 and/or interconnect substrate 1634 at package cavity 1633. For example, electrochemical sensor 1628 can be bonded to enclosure body 1632 and/or interconnect substrate 1634 by an adhesive and/or by eutectic bonding. The adhesive can comprise one or more adhesive materials. Exemplary adhesive material(s) can comprise electrically non-conductive epoxy.

In many embodiments, lid structure 1629 can comprise one or more lid structure materials. Exemplary lid structure material(s) can comprise metal, epoxy molding compound, liquid crystal polymer, and/or one or more equivalent materials. In some embodiments, lid structure 1629 can be metalized with one or more metalizing materials (e.g., gold (Au), nickel (Ni), silver, (Ag), Chromium (Cr), etc.). Implementing the lid structure material(s) to comprise metal can provide electromagnetic shielding to electrochemical sensor 1628.

In further embodiments, lid structure 1629 can be bonded to base structure 1630 in order to couple lid structure 1629 to base structure 1630. For example, bonding portion 1636 of lid structure 1629 can be bonded to enclosure body 1632 of base structure 1630. In some embodiments, lid structure 1629 (e.g., bonding portion 1636) can be bonded to base structure 1630 (e.g., enclosure body 1632) by an adhesive material (e.g., B-stage epoxy), such as, for example, when the lid structure material(s) comprise epoxy molding compound or liquid crystal polymer. In other embodiments, lid structure 1629 (e.g., bonding portion 1636) can be bonded to base structure 1630 (e.g., enclosure body 1632) by soldering, such as, for example, when the lid structure material(s) comprise metal.

In other embodiments, lid structure 1629 can be coupled to base structure 1630 using one or more mechanical fasteners and/or by friction (e.g., a snap fit). For example, lid structure 1629 can be coupled to base structure 1630 using one or more mechanical fasteners and/or by friction (e.g., a snap fit) when the lid structure material(s) comprise metal and/or epoxy molding compound.

In many embodiments, projected portion 1636 of lid structure 1629 can be located over package cavity 1633 when lid structure 1629 is coupled to base structure 1630. In these or other embodiments, projected portion 1636 can refer to a portion of lid structure 1629 that projects away from package cavity 1633 when lid structure 1629 is coupled to base structure 1630. For example, projected portion 1636 and bonding portion 1636 can be non-planar. However, in other embodiments, projected portion 1636 can be omitted. In these embodiments, lid structure 1629 can be flat such that bonding portion 1636 is co-planar with the remaining portion of lid structure 1629.

In some embodiments, implementing lid structure 1629 can provide additional volume over package cavity 1633. As a result, packaging structure 1626 can accommodate electrochemical sensor 1628 that has larger dimensions.

In some embodiments, when the lid structure material(s) comprise epoxy molding compound or liquid crystal polymer, projected portion 1636 can be omitted. In further embodiments, when the lid structure material(s) comprise metal, lid structure 1629 can comprise projected portion 1636.

Again, as provided above, electrochemical sensor 1628 can be similar or identical to electrochemical sensor 100 (FIGS. 1 & 6-9) and/or electrochemical sensor 1000 (FIGS. 10 & 11). Accordingly, electrochemical sensor 1628 can comprise one or more inlets, and the inlet(s) of electrochemical sensor 1628 can be similar or identical to inlet(s) 103 (FIG. 1), the inlet(s) of substrate 205 (FIG. 2), and/or the inlet(s) of base element 102 (FIGS. 1 & 4-9). In many embodiments, base structure inlet(s) 1635 can be similar or identical to inlet(s) 103 (FIG. 1), the inlet(s) of substrate 205 (FIG. 2), and/or the inlet(s) of base element 102 (FIGS. 1 & 4-9) but with respect to base structure 1630, and/or lid structure inlet(s) 1638 can be similar or identical to inlet(s) 103 (FIG. 1), the inlet(s) of substrate 205 (FIG. 2), and/or the inlet(s) of base element 102 (FIGS. 1 & 4-9) but with respect to lid structure 1629.

For example, base structure inlet(s) 1635 and/or lid structure inlet(s) 1638 can be operable to permit an analyte (e.g., a gas sample) to access package cavity 1633 and to access electrochemical sensor 1628 at package cavity 1633.

Accordingly, electrochemical sensor 1628 can operate to detect the analyte when electrochemical sensor 1628 is packaged by packaging structure 1626. Meanwhile, in some embodiments, similar to inlet(s) 103 (FIG. 1), the inlet(s) of substrate 205 (FIG. 2), and/or the inlet(s) of base element 102 (FIGS. 1 & 4-9) with respect to each other, base structure inlet(s) 1635 and/or lid structure inlet(s) 1638 can be at least partially aligned with (e.g., overlapping) the inlet(s) of electrochemical sensor 1628 and/or with each other. However, in other embodiments, base structure inlet(s) 1635 and/or lid structure inlet(s) 1638 can be unaligned with the inlet(s) of electrochemical sensor 1628 and/or with each other. Further, in some embodiments, base structure inlet(s) 1635 and/or lid structure inlet(s) 1638 can comprises similar or different inlet diameter(s) than the inlet(s) of electrochemical sensor 1628 and/or each other.

In further embodiments, as provided above, base structure inlet(s) 1635 can comprise base structure filter(s) 1641, and/or lid structure inlet(s) 1638 can comprise lid structure filter(s) 1640. Base structure filter(s) 1641 and/or lid structure filter(s) 1640 can be similar or identical to the filter(s) described above with respect to inlet(s) 103 (FIG. 1), the inlet(s) of substrate 205 (FIG. 2), and/or the inlet(s) of base element 102 (FIGS. 1 & 4-9).

Meanwhile, in some embodiments, lid structure 1629 can comprise one or more lid structure colors. In these embodiments, the lid structure color(s) can be associated with one or more analytes (e.g., one or more gas samples) that electrochemical sensor 1628 is configured to detect. Accordingly, the lid structure color can indicate the type of analyte (e.g., gas sample(s)) that electrochemical sensor 1628 is configured to detect. The lid structure color Advantageously, in many embodiments, system 1600 and/or packaging structure 1626 can be provided (e.g., manufactured) using conventional semiconductor manufacturing equipment (e.g., handling equipment, etc.). Accordingly, in these embodiments, system 1600 and/or packaging structure 1626 may be provided (e.g., manufactured) without requiring investment in specialized and more expensive manufacturing equipment (e.g., handling equipment, etc.).

Also, in many embodiments, electrochemical sensor 1628 can be positioned and/or oriented in any suitable position and/or orientation at sensor cavity 1633. For example, the position and/or orientation of electrochemical sensor 1628 can depend on the manner in which exterior contacts 1613 are coupled (e.g., electrically coupled) to packaging contacts 1631. In some embodiments, interconnect substrate 1634, enclosure body 1632, and/or lid structure 1629 can be formed in a manner facilitating coupling (e.g., electrically coupling), and in some embodiments, bonding exterior contacts 1613 to packaging contacts 1631.

For example, in some embodiments, electrochemical structure 1628 can be oriented with a lid element of electrochemical sensor facing toward lid structure 1629 when electrochemical sensor 1628 is located at sensor cavity 1633, such as, for example, as illustrated at FIG. 16. In other embodiments, though not illustrated in FIG. 16, electrochemical structure 1628 can be oriented with a lid element of electrochemical sensor facing toward base structure 1630 when electrochemical sensor 1628 is located at sensor cavity 1633. In these embodiments, base structure 1630 can comprise filter(s) 1641 so that an analyte can access the lid element of electrochemical sensor 1628. Further, at least one packaging electrical connector of packaging electrical connectors 1639 can be coupled (e.g., electrically coupled) to at least one exterior contact of exterior contacts 1613 being part of a base structure of electrochemical sensor 1628.

Figure 17:
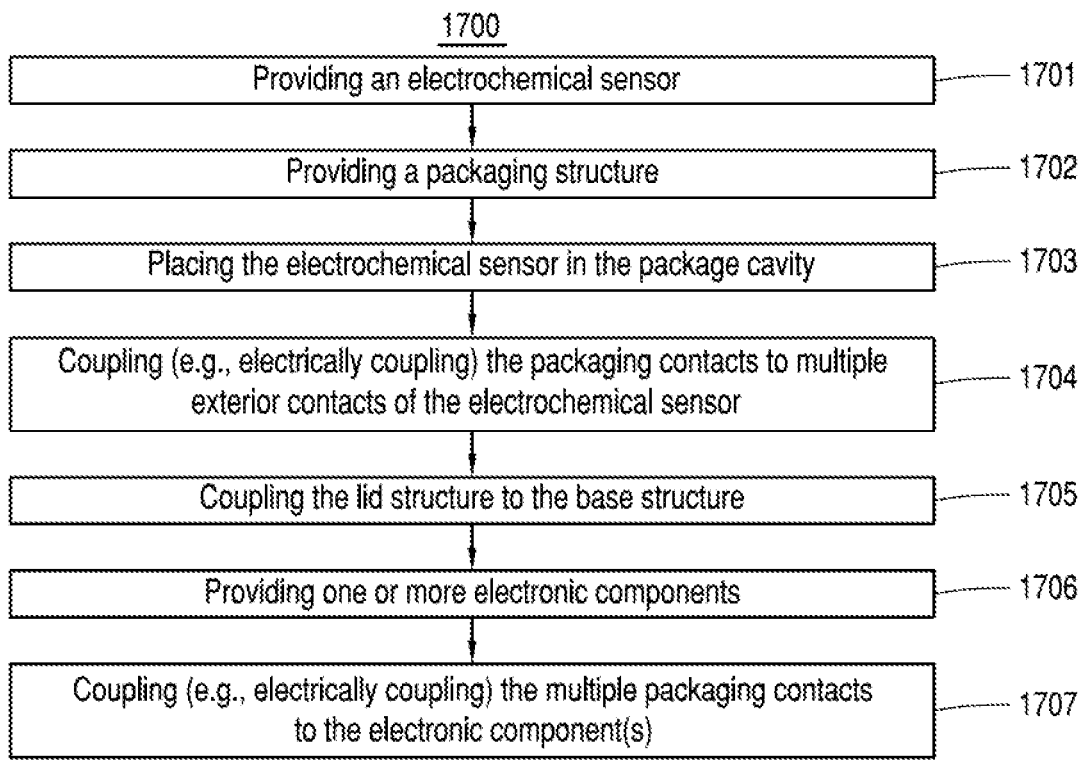
FIG. 17 illustrates a flow chart for a method, according to an embodiment.

Turning ahead again in the drawings, FIG. 17 illustrates a flow chart for a method 1700, according to an embodiment. In some embodiments, method 1700 can comprise a method of providing (e.g., manufacturing) a system. The system can be similar or identical to system 1600 (FIG. 16). Method 1700 is merely exemplary and is not limited to the embodiments presented herein. Method 1700 can be employed in many different embodiments or examples not specifically depicted or described herein. In some embodiments, the activities of method 1700 can be performed in the order presented. In other embodiments, the activities of method 1700 can be performed in any suitable order. In still other embodiments, one or more of the activities of method 1700 can be combined or skipped.

In many embodiments, method 1700 can comprise activity 1701 of providing an electrochemical sensor. The electrochemical sensor can be similar or identical to electrochemical sensor 100 (FIGS. 1 & 6-9) and/or electrochemical sensor 1000 (FIGS. 10 & 11). In further embodiments, performing activity 1701 can be similar or identical to providing an electrochemical sensor as described above with respect to system 1600 (FIG. 16). In some embodiments, activity 1701 can be omitted.

Figure 18:
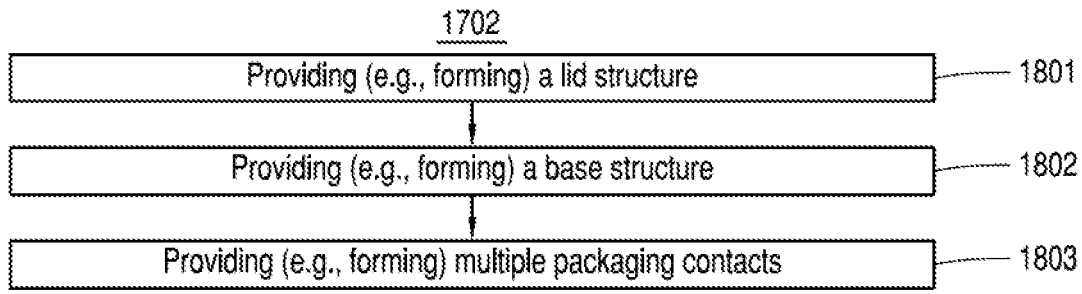
FIG. 18 illustrates an exemplary activity of providing a packaging structure, according to the embodiment of FIG. 17.

In many embodiments, method 1700 can comprise activity 1702 of providing a packaging structure. The packaging structure can be similar or identical to packaging structure 1626 (FIG. 16). In further embodiments, performing activity 1702 can be similar or identical to providing a packaging structure as described above with respect to system 1600 (FIG. 16). In some embodiments, activity 1702 can be performed before, after, or approximately simultaneously with activity 1701. FIG. 18 illustrates an exemplary activity 1702, according to the embodiment of FIG. 17.

For example, in many embodiments, activity 1702 can comprise activity 1801 of providing (e.g., forming) a lid structure. The lid structure can be similar or identical to lid structure 1629 (FIG. 16). In further embodiments, performing activity 1702 can be similar or identical to providing a lid structure as described above with respect to system 1600 (FIG. 16).

Figure 19:
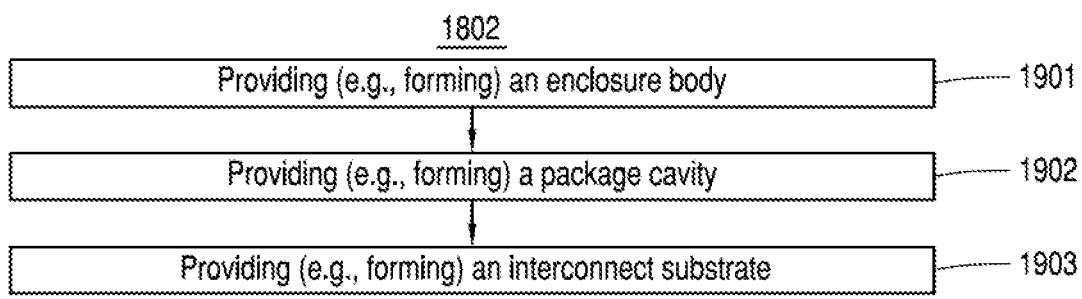
FIG. 19 illustrates an exemplary activity of providing (e.g., forming) a base structure, according to the embodiment of FIG. 17.

In further embodiments, activity 1702 can comprise activity 1802 of providing (e.g., forming) a base structure. The base structure can be similar or identical to base structure 1630 (FIG. 16). In further embodiments, performing activity 1702 can be similar or identical to providing a base structure as described above with respect to system 1600 (FIG. 16). FIG. 19 illustrates an exemplary activity 1802, according to the embodiment of FIG. 17.

For example, in many embodiments, activity 1802 comprises activity 1901 of providing (e.g., forming) an enclosure body. The enclosure body can be similar or identical to enclosure body 1632 (FIG. 16). In further embodiments, performing activity 1901 can be similar or identical to providing an enclosure body as described above with respect to system 1600 (FIG. 16).

In further embodiments, activity 1802 can comprise activity 1902 of providing (e.g., forming) a package cavity. The package cavity can be similar or identical to package cavity 1633 (FIG. 16). In further embodiments, performing activity 1902 can be similar or identical to providing a package cavity as described above with respect to system 1600 (FIG. 16). In some embodiments, activity 1902 can be performed after or approximately simultaneously with activity 1901.

In further embodiments, activity 1802 can comprise activity 1903 of providing (e.g., forming) an interconnect substrate. The interconnect substrate can be similar or identical to interconnect substrate 1634 (FIG. 16). In further embodiments, performing activity 1903 can be similar or identical to providing an interconnect substrate as described above with respect to system 1600 (FIG. 16). In many embodiments, activity 1903 can be performed before activity 1901 and/or activity 1902.

Referring back to FIG. 18, in some embodiments, activity 1702 can comprise activity 1803 of providing (e.g., forming) multiple packaging contacts. The packaging contacts can be similar or identical to packaging contacts 1631 (FIG. 16). In further embodiments, performing activity 1803 can be similar or identical to providing multiple packaging contacts as described above with respect to system 1600 (FIG. 16). In some embodiments, activity 1803 can be performed as part of activity 1801 and/or activity 1802. In other embodiments, activity 1803 can be omitted.

Referring back to FIG. 17, in many embodiments, method 1700 can comprise activity 1703 of placing the electrochemical sensor in the package cavity. In further embodiments, performing activity 1703 can be similar or identical to placing the electrochemical sensor in the package cavity as described above with respect to system 1600 (FIG. 16). In some embodiments, activity 1703 can be performed after activity 1701 and/or activity 1702. In other embodiments, activity 1703 can be omitted.

In many embodiments, method 1700 can comprise activity 1704 of coupling (e.g., electrically coupling) the packaging contacts to multiple exterior contacts of the electrochemical sensor. The exterior contacts of the electrochemical sensor can be similar or identical to exterior contacts 1613 (FIG. 16). In further embodiments, performing activity 1704 can be similar or identical to coupling (e.g., electrically coupling) the packaging contacts to multiple exterior contacts of the electrochemical sensor as described above with respect to system 1600 (FIG. 16). In some embodiments, activity 1704 can be performed after activities 1701-1703.

In many embodiments, method 1700 can comprise activity 1705 of coupling the lid structure to the base structure. In further embodiments, performing activity 1705 can be similar or identical to coupling the lid structure to the base structure as described above with respect to system 1600 (FIG. 16). In some embodiments, activity 1705 can be performed after activities 1701-1704.

In many embodiments, method 1700 can comprise activity 1706 of providing one or more electronic components. The electronic component(s) can be similar or identical to the electronic component(s) described above with respect to system 1600 (FIG. 16). In further embodiments, performing activity 1706 can be similar or identical to providing one or more electronic components as described above with respect to system 1600 (FIG. 16). In some embodiments, activity 1706 can be performed before, after, or approximately simultaneously with one or more of activities 1701-1705. In other embodiments, activity 1706 can be omitted.

In many embodiments, method 1700 can comprise activity 1707 of coupling (e.g., electrically coupling) the multiple packaging contacts to the electronic component(s). In further embodiments, performing activity 1707 can be similar or identical to coupling (e.g., electrically coupling) the multiple packaging contacts to the electronic component(s) as described above with respect to system 1600 (FIG. 16). In some embodiments, activity 1707 can be performed after one or more of activities 1701-1706. In other embodiments, activity 1707 can be omitted.

Turning ahead again in the drawings, FIGS. 20A & 20B illustrate a flow chart for a method 2000, according to an embodiment. In some embodiments, method 2000 can comprise a method of providing (e.g., manufacturing) multiple electrochemical sensors. In these or other embodiments, each electrochemical sensor of the multiple electrochemical sensors can be similar or identical to electrochemical sensor 100 (FIGS. 1 & 6-9) and/or electrochemical sensor 1000 (FIGS. 10 & 11). The method can include large scale or wafer-level manufacturing in a production environment of electrochemical sensors.

Method 2000 is merely exemplary and is not limited to the embodiments presented herein. Method 2000 can be employed in many different embodiments or examples not specifically depicted or described herein. In some embodiments, the activities of method 2000 can be performed in the order presented. In other embodiments, the activities of method 2000 can be performed in any suitable order. In still other embodiments, one or more of the activities of method 2000 can be combined or skipped.

In many embodiments, method 2000 can comprise activity 2001 of providing (e.g., forming) an integrated lid substrate. The integrated lid substrate can comprise an integrated lid substrate first surface and an integrated lid substrate second surface opposite the integrated lid substrate first surface. In these or other embodiments, the integrated lid substrate can be similar or substantially identical to substrate 205 (FIG. 2). However, the integrated lid substrate can comprise larger dimensions (e.g., lateral and/or thickness dimensions) than substrate 205 (FIG. 2) so that multiple constituent substrates can be provided (e.g., formed) from the integrated lid substrate. For example, the integrated lid substrate can comprise a substantially circular wafer or a panel, and can comprise any suitable largest dimension (e.g., diameter), such as, for example, approximately 1.969 inches (approximately 5.000 centimeters), approximately 2.000 inches (approximately 5.080 centimeters), approximately 2.953 inches (approximately 7.500 centimeters), approximately 3.000 inches (approximately 7.620 centimeters), approximately 3.937 inches (approximately 10.00 centimeters), approximately 4.000 inches (approximately 10.16 centimeters), approximately 4.921 inches (approximately 12.50 centimeters), approximately 5.000 inches (approximately 12.70 centimeters), approximately 5.906 inches (approximately 15.00 centimeters), approximately 6.000 inches (approximately 15.24 centimeters), approximately 7.874 inches (approximately 20.00 centimeters), approximately 8.000 inches (approximately 20.32 centimeters), approximately 11.81 inches (approximately 30.00 centimeters), approximately 12.00 inches (approximately 30.48 centimeters), approximately 17.72 inches (approximately 45.00 centimeters), or approximately 18.00 inches (approximately 45.72 centimeters). In some embodiments, the integrated substrate can comprise a panel, such as, for example, of approximately 300 millimeters by approximately 400 millimeters, of approximately 360 millimeters by approximately 465 millimeters, of approximately 370 millimeters by approximately 470 millimeters, of approximately 400 millimeters by approximately 500 millimeters, of approximately 550 millimeters by approximately 650 millimeters, of approximately 600 millimeters by approximately 720 millimeters, of approximately 620 millimeters by approximately 750 millimeters, of approximately 680 millimeters by approximately 880 millimeters, of approximately 730 millimeters by approximately 920 millimeters, of approximately 1100 millimeters by approximately 1250 millimeters, of approximately 1100 millimeters by approximately 1300 millimeters, of approximately 1500 millimeters by approximately 1800 millimeters, of approximately 1500 millimeters by approximately 1850 millimeters, of approximately 1870 millimeters by approximately 2200 millimeters, of approximately 1950 millimeters by approximately 2200 millimeters, of approximately 1950 millimeters by approximately 2250 millimeters, of approximately 2160 millimeters by approximately 2460 millimeters, of approximately 2200 millimeters by approximately 2500 millimeters, or of approximately 2880 millimeters by approximately 3130 millimeters. Each of the constituent substrates can be similar or identical to substrate 205 (FIG. 2), and the constituent substrates can be used as the substrates for electrochemical sensors provided (e.g., manufactured) by method 2000.

Like substrate 205 (FIG. 2), the integrated lid substrate can be at least partially porous. Further, the integrated lid substrate can comprise one or more integrated lid substrate materials. In these embodiments, the integrated lid substrate material(s) can be similar or identical to the substrate material(s) of substrate 205 (FIG. 2). For example, in some embodiments, the integrated lid substrate material(s) can comprise polytetrafluoroethylene (PTFE).

In many embodiments, method 2000 can comprise activity 2002 of providing (e.g., forming) an integrated base substrate. The integrated base substrate can comprise an integrated base substrate first surface and an integrated base substrate second surface opposite the integrated base substrate first surface. In these or other embodiments, the integrated base substrate can be similar or substantially identical to base element 102 (FIGS. 1 & 4-9). However, the integrated base substrate can comprise larger dimensions (e.g., lateral and/or thickness dimensions) than base element 102 (FIGS. 1 & 4-9) so that multiple constituent base elements can be provided (e.g., formed) from the integrated base substrate. For example, the integrated base substrate can comprise a substantially circular wafer or a panel, and can comprise any suitable largest dimension (e.g., diameter), such as, for example, approximately 1.969 inches (approximately 5.000 centimeters), approximately 2.000 inches (approximately 5.080 centimeters), approximately 2.953 inches (approximately 7.500 centimeters), approximately 3.000 inches (approximately 7.620 centimeters), approximately 3.937 inches (approximately 10.00 centimeters), approximately 4.000 inches (approximately 10.16 centimeters), approximately 4.921 inches (approximately 12.50 centimeters), approximately 5.000 inches (approximately 12.70 centimeters), approximately 5.906 inches (approximately 15.00 centimeters), approximately 6.000 inches (approximately 15.24 centimeters), approximately 7.874 inches (approximately 20.00 centimeters), approximately 8.000 inches (approximately 20.32 centimeters), approximately 11.81 inches (approximately 30.00 centimeters), approximately 12.00 inches (approximately 30.48 centimeters), approximately 17.72 inches (approximately 45.00 centimeters), or approximately 18.00 inches (approximately 45.72 centimeters). In some embodiments, the integrated base substrate can comprise a panel, such as, for example, of approximately 300 millimeters by approximately 400 millimeters, of approximately 360 millimeters by approximately 465 millimeters, of approximately 370 millimeters by approximately 470 millimeters, of approximately 400 millimeters by approximately 500 millimeters, of approximately 550 millimeters by approximately 650 millimeters, of approximately 600 millimeters by approximately 720 millimeters, of approximately 620 millimeters by approximately 750 millimeters, of approximately 680 millimeters by approximately 880 millimeters, of approximately 730 millimeters by approximately 920 millimeters, of approximately 1100 millimeters by approximately 1250 millimeters, of approximately 1100 millimeters by approximately 1300 millimeters, of approximately 1500 millimeters by approximately 1800 millimeters, of approximately 1500 millimeters by approximately 1850 millimeters, of approximately 1870 millimeters by approximately 2200 millimeters, of approximately 1950 millimeters by approximately 2200 millimeters, of approximately 1950 millimeters by approximately 2250 millimeters, of approximately 2160 millimeters by approximately 2460 millimeters, of approximately 2200 millimeters by approximately 2500 millimeters, or of approximately 2880 millimeters by approximately 3130 millimeters. Each of the constituent base elements can be similar or identical to base element 102 (FIGS. 1 & 4-9), and the constituent base elements can be used as the base elements for electrochemical sensors provided (e.g., manufactured) by method 2000.

The integrated base substrate can comprise one or more integrated base substrate materials. In these embodiments, the integrated base substrate material(s) can be similar or identical to the base element material(s) of base element 102 (FIGS. 1 & 4-9). In many embodiments, the integrated lid substrate first surface can be coupled to the integrated base first surface, such as, for example at activity 2018 (below).

In many embodiments, method 2000 can comprise activity 2003 of providing (e.g., forming) multiple sensor cavities (e.g., a first sensor cavity and a second sensor cavity) in the integrated base substrate at the integrated base substrate first surface. Each of the multiple sensor cavities (e.g., a first sensor cavity and a second sensor cavity) can be similar or identical to sensor cavity 415 (FIG. 4). In further embodiments, performing activity 2003 can be similar or identical to providing (e.g., forming) sensor cavity 415 (FIG. 4) as described above with respect to electrochemical sensor 100 (FIGS. 1 & 6-9).

For example, in some embodiments, performing activity 2003 can comprise masking the integrated base substrate at the integrated base substrate first surface, and then, etching the integrated base substrate at the integrated base substrate first surface to form the multiple sensor cavities (e.g., a first sensor cavity and a second sensor cavity). In other embodiments, activity 2003 can be part of activity 2001. In these embodiments, the integrated base substrate can be formed (e.g., deposited) such that the integrated base substrate comprises the multiple sensor cavities (e.g., a first sensor cavity and a second sensor cavity).

In many embodiments, method 2000 can comprise activity 2004 of providing (e.g., forming) multiple groups of multiple electrodes (e.g., multiple first electrodes and multiple second electrodes) over the integrated lid substrate first surface and/or the integrated base substrate first surface. Each of the electrodes of the multiple groups of electrodes (e.g., multiple first electrodes and multiple second electrodes) can be similar or identical to electrodes 207 (FIG. 2). In further embodiments, performing activity 2004 can be similar or identical to providing electrodes 207 (FIG. 2) as described above with respect to electrochemical sensor 100 (FIGS. 1 & 6-9). For example, in some embodiments, performing activity 2004 can comprise forming (e.g., sputtering, stamping, stenciling, depositing, etc.) the multiple groups of electrodes (e.g., multiple first electrodes and multiple second electrodes) over the integrated lid substrate first surface and/or the integrated base substrate first surface.

In some embodiments, activity 2004 can be performed after one or more of activities 2001-2003. In many embodiments, when activity 2004 comprises providing (e.g., forming) the multiple groups of electrodes (e.g., multiple first electrodes and multiple second electrodes) over the integrated base substrate first surface, activity 2004 can be performed after activities 2002 and 2003. For example, activity 2004 can comprise providing (e.g., forming) the multiple groups of electrodes (e.g., multiple first electrodes and multiple second electrodes) in the multiple sensor cavities. In these or other embodiments, when activity 2004 comprises providing (e.g., forming) the multiple groups of electrodes (e.g., multiple first electrodes and multiple second electrodes) over the integrated lid substrate first surface, activity 2004 can be performed after activity 2001.

In many embodiments, method 2000 can comprise activity 2005 of providing (e.g., forming) an integrated barrier layer over the integrated base substrate second surface. The integrated barrier layer can comprise an integrated barrier layer first surface and an integrated barrier layer second surface opposite the integrated barrier layer first surface.

In these or other embodiments, the integrated barrier layer can be similar or substantially identical to barrier layer 204 (FIG. 2). However, the integrated barrier layer can comprise larger dimensions (e.g., lateral and/or thickness dimensions) than barrier layer 204 (FIG. 2) so that multiple constituent barrier layers can be provided (e.g., formed) from the integrated barrier layer. Each of the constituent barrier layers can be similar or identical to barrier layer 204 (FIG. 2), and the constituent barrier layers can be used as the barrier layers for electrochemical sensors provided (e.g., manufactured) by method 2000. In some embodiments, activity 2005 can be omitted. In many embodiments, activity 2005 can be performed before, after, or approximately simultaneously with activity 2001.

The integrated barrier layer can comprise one or more integrated barrier layer materials. The integrated barrier layer material(s) can be similar or identical to the barrier layer materials of barrier layer 204 (FIG. 2).

Further, in many embodiments, performing activity 2005 can be similar or identical to providing (e.g., forming) barrier layer 204 (FIG. 2) as described above with respect to electrochemical sensor 100 (FIGS. 1 & 6-9). For example, in some embodiments, performing activity 2005 can comprise depositing the integrated barrier layer over the integrated base substrate second surface.

In further embodiments, method 2000 can comprise activity 2006 of coupling the integrated barrier layer (e.g., the integrated barrier layer first surface) to the integrated lid substrate (e.g., the integrated lid substrate second surface). In these or other embodiments, performing activity 2006 can be similar or identical to coupling barrier layer 204 (FIG. 2) to substrate 205 (FIG. 2) as described above with respect to electrochemical sensor 100 (FIGS. 1 & 6-9). For example, in many embodiments, performing activity 2006 can comprise bonding the integrated barrier layer (e.g., the integrated barrier layer first surface) to the integrated lid substrate (e.g., the integrated lid substrate second surface) with an adhesive layer. In these embodiments, the adhesive layer can be similar or identical to adhesive layer 206 (FIG. 2). In some embodiments, activity 2006 can be performed as part of activity 2005, such as, for example, when performing activity 2005 comprises depositing the integrated barrier layer over the integrated base substrate second surface. In various embodiments, activity 2006 can be performed after or approximately simultaneously with activity 2001, and in further embodiments, can be performed after activity 2005. In other embodiments, activity 2006 can be omitted, such as, for example, when activity 2005 is omitted.

In many embodiments, method 2000 can comprise activity 2007 of providing multiple groups of one or more barrier layer inlets (e.g., one or more first barrier layer inlets and one or more barrier layer inlets) at the integrated barrier layer. Each of the barrier layer inlet(s) of the multiple groups of barrier layer inlet(s) can be similar or identical to inlet(s) 103 (FIG. 1). In further embodiments, performing activity 2007 can be similar or identical to providing (e.g., forming) inlet(s) 103 (FIG. 1) as described above with respect to electrochemical sensor 100 (FIGS. 1 & 6-9). In some embodiments, activity 2007 can be performed as part of activity 2005. In other embodiments, activity 2007 can be performed before or after activity 2006. In still other embodiments, activity 2007 can be omitted, such as, for example, when activity 2005 is omitted.

In some embodiments, when the integrated lid substrate first surface is coupled to the integrated base first surface, such as, for example, as provided at activity 2018 below, at least one of the multiple groups of barrier layer inlet(s) can be at least partially aligned with (e.g., overlapping) at least one of the multiple sensor cavities. Further, when the integrated lid substrate first surface is coupled to the integrated base first surface, such as, for example, as provided at activity 2018 below, at least one of the multiple groups of barrier layer inlet(s) can be at least partially aligned with (e.g., overlapping) at least one of the multiple groups of electrodes.

In many embodiments, method 2000 can comprise activity 2008 of providing (e.g., forming) multiple groups of one or more substrate inlets (e.g., one or more first substrate inlets and one or more second substrate inlets) at the integrated lid substrate. Each of the substrate inlet(s) of the multiple groups of substrate inlet(s) can be similar or identical to the inlet(s) of substrate 205 (FIG. 2) described above with respect to electrochemical sensor 100 (FIGS. 1 & 6-9). In further embodiments, performing activity 2008 can be similar or identical to providing (e.g., forming) the inlet(s) of substrate 205 (FIG. 2) as described above with respect to electrochemical sensor 100 (FIGS. 1 & 6-9). In some embodiments, activity 2008 can be performed when activity 2005 the integrated lid substrate is non-porous. In some embodiments, activity 2008 can be performed after or as part of activity 2001.

In some embodiments, when the integrated lid substrate first surface is coupled to the integrated base first surface, such as, for example, as provided at activity 2018 below, at least one of the multiple groups of substrate inlet(s) can be at least partially aligned with (e.g., overlapping) at least one of the multiple sensor cavities. Further, when the integrated lid substrate first surface is coupled to the integrated base first surface, such as, for example, as provided at activity 2018 below, at least one of the multiple groups of substrate inlet(s) can be at least partially aligned with (e.g., overlapping) at least one of the multiple groups of electrodes.

In many embodiments, method 2000 can comprise activity 2009 of providing multiple groups of one or more base inlets (e.g., one or more first base inlets and one or more second base inlets) at the integrated base element substrate. Each of the base inlet(s) of the multiple groups of base inlet(s) can be similar or identical to the inlet(s) of base element 102 (FIGS. 1 & 4-9) described above with respect to electrochemical sensor 100 (FIGS. 1 & 6-9). In further embodiments, performing activity 2009 can be similar or identical to providing (e.g., forming) the inlet(s) of base element 102 (FIGS. 1 & 4-9) as described above with respect to electrochemical sensor 100 (FIGS. 1 & 6-9). In some embodiments, activity 2009 can be performed after or as part of activity 2001. Also, in the same or other embodiments, activities 2002, 2003, and/or 2009 can be performed before, after, or simultaneously with one or more of activities 2001, 2004, 2005, 2006, 2007, and/or 2008.

In some embodiments, when the integrated lid substrate first surface is coupled to the integrated base first surface, such as, for example, as provided at activity 2018 below, at least one of the multiple groups of base inlet(s) can be at least partially aligned with (e.g., under) at least one of the multiple sensor cavities. Further, when the integrated lid substrate first surface is coupled to the integrated base first surface, such as, for example, as provided at activity 2018 below, at least one of the multiple groups of substrate inlet(s) can be at least partially aligned with (e.g., under) at least one of the multiple groups of electrodes.

In many embodiments, method 2000 can comprise activity 2010 of providing (e.g., forming) multiple electrolyte elements (e.g., a first electrolyte element and a second electrolyte element) in the multiple sensor cavities (e.g., a first sensor cavity and a second sensor cavity), respectively. Accordingly, activity 2010 can be performed after activity 2003. The first and second electrolyte elements can be the same or different from each other. Further, each of the electrolyte elements can be similar or identical to the electrolyte element described above with respect to electrochemical sensor 100 (FIGS. 1 & 6-9). In various embodiments, performing activity 2010 can be similar or identical to providing (e.g., forming) the electrolyte element as described above with respect to electrochemical sensor 100 (FIGS. 1 & 6-9). In some embodiments, activity 2010 can be omitted. In other embodiments, activity 2010 can be performed after activity 2018, particularly when the multiple electrolyte elements In many embodiments, method 2000 can comprise activity 2011 of providing (e.g., forming) multiple grooves at the integrated lid substrate first surface or the integrated base substrate first surface. Each groove of the multiple grooves can be similar or identical to groove 443 (FIG. 4). Accordingly, in some embodiments, when the integrated lid substrate first surface is coupled to the integrated base first surface, such as, for example, as provided at activity 2018 below, each groove of the grooves at least partially surrounds a different opening of the multiple sensor cavities. In further embodiments, performing activity 2011 can be similar or identical to providing (e.g., forming) groove 443 (FIG. 4) as described above with respect to electrochemical sensor 100 (FIGS. 1 & 6-9). In some embodiments, activity 2011 can be performed approximately simultaneously with activity 2003. In other embodiments, activity 2011 can be omitted.

In many embodiments, method 2000 can comprise activity 2012 of providing (e.g., forming) multiple groups of multiple signal communication channels (e.g., multiple first signal communication channels and multiple second signal communication channels) in the integrated lid substrate and/or the integrated base substrate. In these embodiments, the multiple groups of multiple signal communication channels (e.g., multiple first signal communication channels and multiple second signal communication channels) can be provided to correspond with the multiple groups of electrodes provided by activity 2004.

In some embodiments, each signal communication channel of the multiple groups of multiple signal communication channels (e.g., multiple first signal communication channels and multiple second signal communication channels) can be similar or identical to one of signal communication channels 412 (FIG. 4). In further embodiments, performing activity 2012 can be similar or identical to providing signal communication channels 412 (FIG. 4) as described above with respect to electrochemical sensor 100 (FIGS. 1 & 6-9). In some embodiments, activity 2012 can be performed before, after, or approximately simultaneously with activity 2003.

In many embodiments, method 2000 can comprise activity 2013 of providing (e.g., forming) at least one signal communication lines in each signal communication channel of the multiple groups of signal communication channels. In these embodiments, the signal communication lines can be provided to correspond with the multiple groups of electrodes provided by activity 2004.

In some embodiments, each signal communication line of the multiple signal communication lines can be similar or identical to one of signal communication lines 414 (FIG. 4). In further embodiments, performing activity 2013 can be similar or identical to providing signal communication lines 414 (FIG. 4) as described above with respect to electrochemical sensor 100 (FIGS. 1 & 6-9). In some embodiments, activity 2013 can be performed after activity 2012. In other embodiments, activities 2012 and 2013 can be performed simultaneously with each other in a manner similar to semiconductor manufacturing techniques used to build multi-level metal interconnect structures for computer chips.

In many embodiments, method 2000 can comprise activity 2014 of providing (e.g., forming) multiple groups of multiple interior contacts (e.g., multiple first interior contacts and multiple second interior contacts) over the integrated lid substrate first surface and/or the integrated base substrate first surface. Each of the interior contacts of the multiple groups of multiple interior contacts (e.g., multiple first interior contacts and multiple second interior contacts) can be similar or identical to interior contacts 209 (FIG. 2). Accordingly, the interior contacts of the multiple groups of multiple interior contacts (e.g., multiple first interior contacts and multiple second interior contacts) can be electrically coupled to the electrodes of the multiple groups of electrodes. In further embodiments, performing activity 2014 can be similar or identical to providing interior contacts 209 (FIG. 2) as described above with respect to electrochemical sensor 100 (FIGS. 1 & 6-9). In some embodiments, activity 2014 can be performed after activity 2012 and/or activity 2013.

In many embodiments, method 2000 can comprise activity 2015 of providing (e.g., forming) multiple groups of multiple exterior contacts (e.g., multiple first exterior contacts and multiple second exterior contacts) over the integrated lid substrate second surface and/or the integrated base substrate second surface. Each of the exterior contacts of the multiple groups of multiple exterior contacts (e.g., multiple first exterior contacts and multiple second exterior contacts) can be similar or identical to exterior contacts 513 (FIG. 5). Accordingly, the exterior contacts of the multiple exterior contacts (e.g., multiple first exterior contacts and multiple second exterior contacts) can be electrically coupled to the multiple groups of multiple interior contacts (e.g., multiple first interior contacts and multiple second interior contacts) by the signal communication lines. In further embodiments, performing activity 2015 can be similar or identical to providing exterior contacts 513 (FIG. 5) as described above with respect to electrochemical sensor 100 (FIGS. 1 & 6-9). In some embodiments, activity 2015 can be performed after activity 2012 and/or activity 2013.

In many embodiments, method 2000 can comprise activity 2016 of providing (e.g., forming) multiple groups of one or more electronic components at the integrated lid substrate and/or the integrated base substrate. Each of the electronic component(s) of the multiple groups of electronic component(s) can be similar or identical to the electronic component(s) described above with respect to electrochemical sensor 100 (FIGS. 1 & 6-9). In further embodiments, performing activity 2016 can be similar or identical to providing (e.g., forming) the electronic component(s) as described above with respect to electrochemical sensor 100 (FIGS. 1 & 6-9).

In many embodiments, activity 2016 can be performed before, after, or approximately simultaneously with one or more of activities 2003, 2004, and 2010-2015. In other embodiments, activity 2016 can be omitted.

In further embodiments, method 2000 can comprise activity 2017 of coupling (e.g., electrically coupling) the multiple groups of electronic component(s) to the multiple groups of exterior contacts. In these embodiments, one group of electronic component(s) can be coupled to the exterior contacts of one or multiple of the multiple groups of exterior contacts. Further, performing activity 2017 can be similar or identical to coupling (e.g., electrically coupling) the electronic component(s) described above with respect to electrochemical sensor 100 (FIGS. 1 & 6-9) to exterior contacts 513 (FIG. 5). In some embodiments, activity 2017 can be performed as part of activity 2016. In further embodiments, activity 2017 can be performed before, after, or approximately simultaneously with activity 2016. In other embodiments, activity 2017 can be omitted.

In many embodiments, method 2000 can comprise activity 2018 of coupling the integrated lid substrate first surface to the integrated base substrate first surface. In these embodiments, performing activity 2018 can be similar or identical to coupling substrate 205. (FIG. 2) to base element 102 (FIGS. 1 & 4-9) as described above with respect to electrochemical sensor 100 (FIGS. 1 & 6-9). In some embodiments, activity 2018 can be performed after activity 2003 and activity 2004.

In further embodiments, method 2000 can comprise activity 2019 of cutting (e.g., die cutting or singulating) the integrated lid substrate and the integrated base substrate to separate at least one electrochemical sensor (e.g., a first electrochemical sensor) from at least one other electrochemical sensors (e.g., a second electrochemical sensor). The at least one electrochemical sensor and the other electrochemical sensors can comprise multiple electrochemical sensors, and the multiple electrochemical sensors can comprise the multiple sensor cavities and the multiple groups of electrodes. In many embodiments, activity 2019 can be performed after activity 2018. In other embodiments, activity 2018 can be omitted, and the substrates and base elements of the multiple electrochemical sensors can be coupled together individually.

In many embodiments, when activity 2017 is performed before activity 2019, activity 2019 can comprise an activity of cutting (e.g., die cutting or singulating) the integrated lid substrate and the integrated base substrate to separate at least one electrochemical sensor (e.g., a first electrochemical sensor) from at least one other electrochemical sensors (e.g., a second electrochemical sensor) while the exterior contacts of the at least one sensor remain coupled (e.g., electrically coupled) to the electronic component(s) of one group of the multiple group(s) of electronic(s). For example, each or multiple of the multiple electrochemical sensors can be integrated with the electronic component(s) of one group of the electronic component(s) to form an integrated circuit (e.g., an application-specific integrated circuit (ASIC)). In some embodiments, these electrochemical sensor(s) and/or the integrated circuit can be part of a printed circuit board. Likewise, the electrochemical sensor(s), integrated circuit, and/or printed circuit board can be integrated in one or more products and/or one or more installations. The product(s) can be similar or identical to the product(s) described above with respect to electrochemical sensor 100 (FIGS. 1 & 6-9) and/or the installation(s) described above with respect to electrochemical sensor 100 (FIGS. 1 & 6-9). In further embodiments, when activity 2016 is performed, but activity 2017 is not performed, method 2000 can comprise an activity of cutting (e.g., die cutting or singulating) the integrated lid substrate and the integrated base substrate to separate at least one electrochemical sensor (e.g., a first electrochemical sensor) from at least one group of electronic component(s) (e.g., a first group of electronic component(s)).

Turning ahead in the drawings, FIG. 21 illustrates an isometric view of an integrated lid substrate 2143 of a system 2100 coupled to an integrated base substrate 2144 of system 2100, and an integrated barrier layer 2145 of system 2100 coupled to integrated lid substrate 2143, according to an embodiment. System 2100 is merely exemplary and embodiments of the system are not limited to the embodiments presented herein. System 2100 can be employed in many different embodiments or examples not specifically depicted or described herein. In some embodiments, certain elements or modules of system 2100 can perform various methods and/or activities of those methods. In these or other embodiments, the methods and/or the activities of the methods can be performed by other suitable elements or modules of system 2100. In these embodiments, integrated lid substrate 2143 can be similar or identical to the integrated lid substrate described above with respect to method 2000 (FIGS. 20A & 20B); integrated base substrate 2144 can be similar or identical to the integrated base substrate described above with respect to method 2000 (FIGS. 20A & 20B); and/or integrated barrier layer 2145 can be similar or identical to the integrated barrier layer described above with respect to method 2000 (FIGS. 20A & 20B). In many embodiments, system 2100 can be provided (e.g., manufactured) using method 2000 (FIGS. 20A & 20B).

Although not illustrated in FIG. 21, when integrated lid substrate 2143 is coupled to integrated base substrate 2144, system 2100 comprises multiple electrochemical sensors which can be separated (e.g., cut) from each other. In these or other embodiments, each of the electrochemical sensors can be similar or identical to electrochemical sensor 100 (FIGS. 1 & 6-9) and/or electrochemical sensor 1000 (FIGS. 10 & 11). In some embodiments, though also not illustrated in FIG. 21, the multiple electrochemical sensors can be coupled (e.g., electrically coupled) to multiple groups of one or more electronic components. Each of the electronic components of the multiple groups of electronic component(s) can be similar or identical to the electronic component(s) described above with respect to electrochemical sensor 100 (FIGS. 1 & 6-9).

Figure 22:
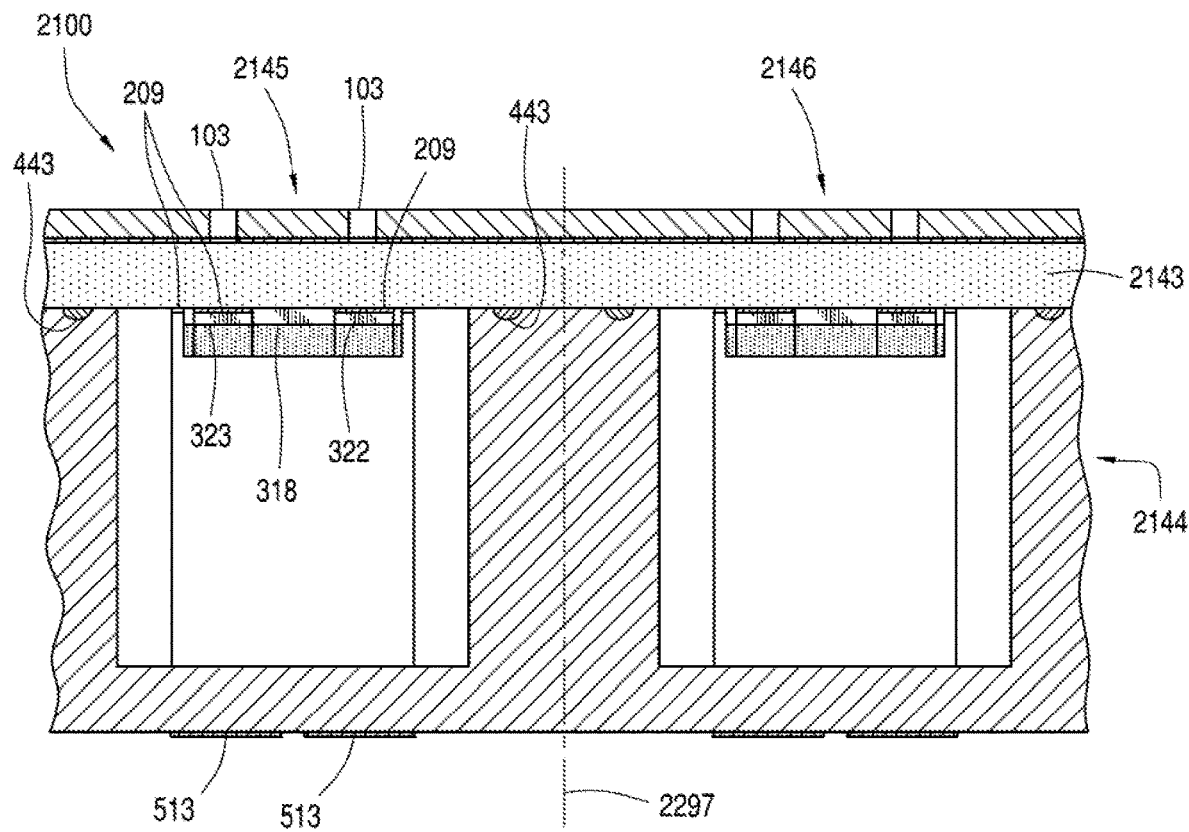
FIG. 22 illustrates a partial cross-sectional view of the system of FIG. 21 when the integrated lid substrate is coupled to the integrated base substrate, taken from the viewpoint of cross-sectional line XXII-XXII of FIG. 21.

FIG. 22 illustrates a partial cross-sectional view of system 2100 when integrated lid substrate 2143 is coupled to integrated base substrate 2144, taken from the viewpoint of cross-sectional line XXII-XXII of FIG. 21. In these embodiments, the multiple electrochemical sensors can comprise first electrochemical sensor 2145 and second electrochemical sensor 2146. First electrochemical sensor 2145 and/or second electrochemical sensor 2146 can be similar or identical to electrochemical sensor 100 (FIGS. 1 & 6-9) and/or electrochemical sensor 1000 (FIGS. 10 & 11).

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that one or more activities of method 1200 (FIG. 12), method 1700 (FIG. 17), and/or method 2000 (FIGS. 20A & 20B) may be comprised of many different activities, procedures, and/or processes and may be performed by many different modules and in many different orders, that any elements of FIGS. 1-22 may be modified, and that the foregoing discussion of certain of these embodiments does not necessarily represent a complete description of all possible embodiments.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An electrochemical sensor comprising:
a lid element comprising a substrate, the substrate comprising a substrate material;
multiple electrodes;
multiple interior contacts electrically coupled to the multiple electrodes;
a base element coupled to the lid element thereby forming a sensor cavity defined by the base element and the lid element, the base element comprising a base element material;
multiple exterior contacts at an exterior surface of the electrochemical sensor;
multiple signal communication channels comprising multiple signal communication lines, wherein:
  the multiple interior contacts are electrically coupled to the multiple exterior contacts by the multiple signal communication lines;
  at least one of the multiple signal communication channels extends through the lid element or the base element from at least one of the multiple interior contacts to at least one of the multiple exterior contacts along a torturous path, and
  at least one signal communication line of the multiple signal communication lines comprises a plurality of layers of conductive material stacked along the torturous path of the at least one of the multiple signal communication channels from the at least one of the multiple interior contacts to the at least one of the multiple exterior contacts; and
an electrolyte element located in the sensor cavity;
wherein:
  the multiple electrodes are located in the sensor cavity;
  the multiple electrodes are in electrolytic communication with the electrolyte element;
  the multiple interior contacts are located in the sensor cavity.

2. The electrochemical sensor of claim 1, wherein:
at least one of the multiple electrodes is directly coupled to the lid element and at least one of the multiple interior contacts is directly coupled to the lid element.

3. The electrochemical sensor of claim 1, wherein:
the multiple electrodes comprise at least one first electrode and at least one second electrode;
the multiple interior contacts comprise at least one first interior contact electrically coupled to the at least one first electrode and comprise at least one second interior contact electrically coupled to the at least one second electrode;
the at least one first electrode and the at least one first interior contact are directly coupled to the lid element; and
the at least one second electrode and the at least one second interior contact are directly coupled to the base element.

4. The electrochemical sensor of claim 1, wherein:
the lid element comprises a barrier layer coupled to the substrate, the barrier layer comprising one or more barrier layer inlets at least partially aligned with one or more of the multiple electrodes.

5. The electrochemical sensor of claim 1, wherein:
the substrate material is at least partially porous.

6. The electrochemical sensor claim 1 wherein:
the substrate material comprises polytetrafluoroethylene.

7. The electrochemical sensor of claim 1 wherein:
the base element material comprises one or more ceramic materials.

8. The electrochemical sensor of claim 1, wherein:
the base element material comprises one or more polymer materials.

9. The electrochemical sensor of claim 1, wherein one of:
the multiple exterior contacts are arranged in a ball grid array or a land grid array; or
the multiple exterior contacts comprises multiple castellations; and
the multiple exterior contacts are configured to be electrically coupled with one or more electronic components.

10. The electrochemical sensor of claim 1, further comprising:
a sealing gasket;
wherein:
the lid element is coupled to the base element by the sealing gasket; and
the base element comprises a base perimeter portion comprising a groove configured to receive the sealing gasket.

11. The electrochemical sensor of claim 10 wherein:
the sealing gasket comprising at least one of fluorinated ethylene propylene, perfluoroether polytetrafluoroethylene, liquid polyimide, polyimide, epoxy, pressure sensitive adhesive (PSA), thermal set adhesive (TSA), or silicone adhesive.

12. The electrochemical sensor of claim 1, wherein:
the substrate comprises one or more substrate inlets;
the one or more substrate inlets comprises one or more membranes; and
the one or more substrate inlets at least partially overlap the one or more electrodes.

13. The electrochemical sensor of claim 1, wherein the substrate comprises glass or silicon.

14. The electrochemical sensor of claim 1, wherein the substrate comprises a thickness of greater than or equal to 0.1 microns to less than or equal to 0.25 microns and a pore diameter of greater than or equal to 0.1 microns to less than or equal to 5 microns.

15. The electrochemical sensor of claim 4, wherein:
the barrier layer comprises a thickness of greater than or equal to 0.001 millimeters to less than or equal to 0.127 millimeters; and
a barrier layer material of the barrier layer comprises polyimide.

16. The electrochemical sensor of claim 4, wherein at least one of the multiple electrodes is coupled to the barrier layer.

17. A method comprising:
coupling a lid element to a base element by anodic bonding or eutectic bonding thereby forming a sensor cavity defined by the base element and the lid element, wherein:
the lid element comprises a substrate comprising a substrate material;
the base element comprises a base element material
the sensor cavity houses an electrolyte element, wherein multiple electrodes are located in the sensor cavity in electrolytic communication with the electrolyte element; and
at least one of the lid element and the base element comprise multiple exterior contacts and multiple interior contacts, wherein:
the multiple interior contacts are located in the sensor cavity; and
multiple signal communication channels housing multiple signal communication lines extend through at least one of the lid element and the base element from the multiple exterior contacts to the multiple interior contacts.

18. The method of claim 17, wherein:
at least one of the multiple electrodes is directly coupled to the substrate of the lid element; and
at least one of the multiple interior contacts is directly coupled to the substrate.

19. The method of claim 18, wherein:
the multiple electrodes comprise at least one first electrode and at least one second electrode;
the at least one first electrode of the multiple electrodes is directly coupled to the substrate of the lid element; and
at least one second electrode of the multiple electrodes over the base element; and
the multiple interior contacts comprise at least one first interior contact and a least one second interior contact;
the at least one first interior contact of the multiple interior contacts is directly coupled to the substrate; and
the least one second interior contact of the multiple interior contacts is directly coupled to the base element.

20. The method of claim 17 wherein:
the lid element comprises a barrier layer and the method further comprises:
coupling the barrier layer to the substrate;
wherein:
the barrier layer comprises multiple inlets.

21. The method claim 17,
wherein a sealing gasket is positioned between the lid element to the base element.

22. The method of claim 17, wherein at least one of:
the substrate material is at least partially porous;
the substrate material comprises polytetrafluoroethylene; or
the base element material comprises one or more ceramic materials.

23. An electrochemical sensor comprising:
a lid element comprising a substrate, the substrate comprising a substrate material;
multiple electrodes;
one or more wicks;
multiple interior contacts electrically coupled to the multiple electrodes;
a base element coupled to the lid element thereby forming a sensor cavity defined by the base element and the lid element, the base element comprising a base element material;
multiple exterior contacts located at an exterior surface of the base element; and
multiple signal communication channels comprising multiple signal communication lines, wherein:
the multiple interior contacts are electrically coupled to the multiple exterior contacts by the multiple signal communication lines;
at least one of the multiple signal communication channels extends through the lid element or the base element from at least one of the multiple interior contacts to at least one of the multiple exterior contacts along a torturous path, and
at least one signal communication line of the multiple signal communication lines comprises a plurality of layers of conductive material stacked along the torturous path of the at least one of the multiple signal communication channels from the at least one of the multiple interior contacts to the at least one of the multiple exterior contacts; and
an electrolyte element located in the sensor cavity;
wherein:
the electrochemical sensor comprises a gas sensor;
the electrochemical sensor is configured such that when the lid element is coupled to the base element:
the multiple electrodes are located in the sensor cavity;
the multiple electrodes are in electrolytic communication with the electrolyte element;
the multiple interior contacts are located in the sensor cavity; and
the multiple interior contacts are electrically coupled to the multiple exterior contacts by the multiple signal communication lines;
the lid element comprises the multiple electrodes and the multiple interior contacts;
the lid element comprises a barrier layer coupled to the substrate, the barrier layer comprising multiple inlets;
the multiple inlets are at least partially aligned with the multiple electrodes;
the substrate material is at least partially porous and comprises a polymer material;
the base element material comprises a ceramic material; and
the multiple exterior contacts are configured to be electrically coupled with one or more electronic components.

* * * * *